United States Patent [19]
Jacobsen et al.

[11] Patent Number: 6,073,034
[45] Date of Patent: Jun. 6, 2000

[54] WIRELESS TELEPHONE DISPLAY SYSTEM

[75] Inventors: Jeffrey Jacobsen, Hollister, Calif.;
John C. C. Fan, Chestnut Hill, Mass.;
Stephen A. Pombo, Campbell, Calif.;
Matthew Zavracky, Plympton, Mass.;
Rodney Bumgardner, Cupertino,
Calif.; Alan Richard, Wrentham, Mass.

[73] Assignee: Kopin Corporation, Taunton, Mass.

[21] Appl. No.: 08/855,909

[22] Filed: May 14, 1997

Related U.S. Application Data

[63] Continuation of application No. 08/853,630, May 9, 1997, which is a continuation-in-part of application No. 08/838, 420, Apr. 7, 1997, which is a continuation-in-part of application No. 08/810,646, Mar. 3, 1997, which is a continuation-in-part of application No. 08/766,607, Dec. 13, 1996, which is a continuation-in-part of application No. 08/741, 671, Oct. 31, 1996.

[51] Int. Cl.[7] ..................................................... H04Q 7/32
[52] U.S. Cl. ........................ 455/566; 455/556; 455/557; 455/575; 455/90; 345/102; 345/103; 379/433; 379/428
[58] Field of Search .................................. 455/566, 556, 455/557, 575, 90, 425, 347, 346; 379/433, 428; 345/102, 103, 108, 87

[56] References Cited

U.S. PATENT DOCUMENTS

| 4,010,322 | 3/1977 | Nathanson .............................. 358/233 |
| 4,258,387 | 3/1981 | Lemelson et al. ....................... 358/85 |

(List continued on next page.)

FOREIGN PATENT DOCUMENTS

| 2123461 | 11/1994 | Canada . |
| 0 172 473 A2 | 2/1986 | European Pat. Off. . |
| 0 344 881 A2 | 12/1989 | European Pat. Off. . |
| 0 352 914 A2 | 1/1990 | European Pat. Off. . |
| 0 424 880 A2 | 5/1991 | European Pat. Off. . |
| 0 438 362 A1 | 7/1991 | European Pat. Off. . |
| 0 464 011 A1 | 1/1992 | European Pat. Off. . |
| 0 472 361 A2 | 2/1992 | European Pat. Off. . |
| 0 491 639 A1 | 6/1992 | European Pat. Off. . |
| 0 526 802 A2 | 2/1993 | European Pat. Off. . |
| 0 535 401 A1 | 4/1993 | European Pat. Off. . |
| 0 539 699 A2 | 5/1993 | European Pat. Off. . |
| 0 539 907 A3 | 5/1993 | European Pat. Off. . |
| 0 547 493 A1 | 6/1993 | European Pat. Off. . |
| 0 551 781 A1 | 7/1993 | European Pat. Off. . |
| 0 626 773 A1 | 11/1994 | European Pat. Off. . |
| 0 626 773 B1 | 11/1994 | European Pat. Off. . |

(List continued on next page.)

OTHER PUBLICATIONS

"Hand–held Videophone," *Popular Science* (Feb. 1992).
"VideoPhone price cut to $1,000," *USA Today* (Jan 2, 1993).
"SA620 Integrated Front–End," *Philips Electronics North America Corp.* (1993).
Kummerow, T., Meurer, W., "Bildtelefon—ein Kommunikationsdienst im ISDN ab 1991," *Telenorma Nachrichten, Telenorma Bosch Gruppe* 1989 HEft 93, pp. 52, 53, index and cover page.
Linder, Ben, "A whole lot smarter," *Telephony,* pp. 22, 23. 26, 28 and cover (May 19, 1997).

*Primary Examiner*—Wellington Chin
*Assistant Examiner*—Keith Ferguson
*Attorney, Agent, or Firm*—Hamilton, Brook, Smith & Reynolds, P.C.

[57] ABSTRACT

The invention relates to a microdisplay system that utilizes a small high resolution active matrix liquid crystal display with an illumination system and a magnifying optical system to provide a hand held communication display device. The system can employ an LED illumination system and cellular communication or processor circuits within a compact housing to provide communication devices such as pagers, telephones, televisions, and hand held computer or card reader devices with a compact high resolution data and/or video display.

20 Claims, 42 Drawing Sheets

U.S. PATENT DOCUMENTS

| | | | |
|---|---|---|---|
| 4,336,524 | 6/1982 | Levine | 340/311.1 |
| 4,573,766 | 3/1986 | Bournay, Jr. et al. | 350/345 |
| 4,630,895 | 12/1986 | Abdala, Jr. et al. | 350/345 |
| 4,636,866 | 1/1987 | Hattori | 358/236 |
| 4,695,129 | 9/1987 | Faessen | 350/96.25 |
| 4,704,740 | 11/1987 | McKee et al. | 455/348 |
| 4,814,876 | 3/1989 | Horio et al. | 358/160 |
| 4,837,817 | 6/1989 | Maemori | 358/224 |
| 4,856,045 | 8/1989 | Hoshina | 379/53 |
| 4,856,088 | 8/1989 | Oliwa et al. | 455/349 |
| 4,873,576 | 10/1989 | Hattori et al. | 358/224 |
| 4,916,441 | 4/1990 | Gombrich | 340/712 |
| 4,928,300 | 5/1990 | Ogawa et al. | 379/53 |
| 4,934,773 | 6/1990 | Becker | 350/6.6 |
| 4,959,642 | 9/1990 | Sharples | 340/716 |
| 4,977,456 | 12/1990 | Furuya | 358/213.13 |
| 5,003,300 | 3/1991 | Wells | 340/705 |
| 5,008,658 | 4/1991 | Russay et al. | 340/784 |
| 5,008,788 | 4/1991 | Palinkas | 362/231 |
| 5,023,931 | 6/1991 | Streck et al. | 455/21 |
| 5,042,918 | 8/1991 | Suzuki | 359/59 |
| 5,048,077 | 9/1991 | Wells et al. | 379/96 |
| 5,077,784 | 12/1991 | Fujita et al. | 379/53 |
| 5,079,627 | 1/1992 | Filo | 358/85 |
| 5,088,806 | 2/1992 | McCartney et al. | 359/84 |
| 5,106,179 | 4/1992 | Kamaya et al. | 351/158 |
| 5,111,498 | 5/1992 | Guichard et al. | 379/53 |
| 5,122,880 | 6/1992 | Nagano | 358/209 |
| 5,132,825 | 7/1992 | Miyadera | 359/85 |
| 5,138,312 | 8/1992 | Tsukamoto et al. | 340/825.44 |
| 5,162,828 | 11/1992 | Furness et al. | 353/122 |
| 5,164,833 | 11/1992 | Aoki | 358/224 |
| 5,164,980 | 11/1992 | Bush et al. | 379/53 |
| 5,185,712 | 2/1993 | Sato et al. | 358/224 |
| 5,189,632 | 2/1993 | Paajanen et al. | 364/705.05 |
| 5,206,749 | 4/1993 | Zavracky et al. | 359/59 |
| 5,220,366 | 6/1993 | King | 354/76 |
| 5,224,198 | 6/1993 | Jachimowicz et al. | 385/133 |
| 5,256,562 | 10/1993 | Vu et al. | 437/86 |
| 5,258,325 | 11/1993 | Spitzer et al. | 437/86 |
| 5,260,625 | 11/1993 | Holden et al. | 313/486 |
| 5,281,957 | 1/1994 | Schoolman | 345/8 |
| 5,300,788 | 4/1994 | Fan et al. | 257/13 |
| 5,300,976 | 4/1994 | Lim et al. | 354/219 |
| 5,305,244 | 4/1994 | Newman et al. | 364/708.1 |
| 5,311,206 | 5/1994 | Nelson | 345/89 |
| 5,317,236 | 5/1994 | Zavracky et al. | 315/169.3 |
| 5,321,416 | 6/1994 | Bassett et al. | 345/8 |
| 5,325,429 | 6/1994 | Kurgan | 379/429 |
| 5,335,276 | 8/1994 | Thompson et al. | 380/21 |
| 5,347,378 | 9/1994 | Handschy et al. | 359/53 |
| 5,347,400 | 9/1994 | Hunter | 359/815 |
| 5,362,671 | 11/1994 | Zavracky et al. | 437/81 |
| 5,371,493 | 12/1994 | Sharpe et al. | 340/825.34 |
| 5,376,979 | 12/1994 | Zavracky et al. | 353/122 |
| 5,381,179 | 1/1995 | Kashimura | 348/376 |
| 5,404,580 | 4/1995 | Simpson et al. | 455/89 |
| 5,412,396 | 5/1995 | Nelson | 345/89 |
| 5,422,656 | 6/1995 | Allard et al. | 345/173 |
| 5,444,557 | 8/1995 | Spitzer et al. | 359/59 |
| 5,467,215 | 11/1995 | Lebby et al. | 359/247 |
| 5,469,278 | 11/1995 | Takahara et al. | 359/51 |
| 5,483,285 | 1/1996 | Lim et al. | 348/341 |
| 5,485,318 | 1/1996 | Lebby et al. | 359/811 |
| 5,485,504 | 1/1996 | Ohnsorge | 379/58 |
| 5,486,708 | 1/1996 | Takahashi et al. | 257/59 |
| 5,491,507 | 2/1996 | Umezawa et al. | 379/433 |
| 5,515,424 | 5/1996 | Kenney | 379/96 |
| 5,528,285 | 6/1996 | Morikawa et al. | 348/14 |
| 5,541,640 | 7/1996 | Larson | 348/19 |
| 5,548,271 | 8/1996 | Tsuchiyama et al. | 340/311.1 |
| 5,549,747 | 8/1996 | Bozler et al. | 117/43 |
| 5,550,754 | 8/1996 | McNelley et al. | 364/514 A |
| 5,561,538 | 10/1996 | Kato et al | 359/40 |
| 5,584,070 | 12/1996 | Harris et al. | 455/346 |
| 5,585,948 | 12/1996 | Petera | 349/143 |
| 5,596,451 | 1/1997 | Handschy et al. | 359/633 |
| 5,608,553 | 3/1997 | Kim | 349/61 |
| 5,642,129 | 6/1997 | Zavracky et al. | 345/100 |
| 5,646,432 | 7/1997 | Iwaki et al. | 257/347 |
| 5,719,936 | 2/1998 | Hillenmayer | 379/433 |
| 5,746,493 | 5/1998 | Jonsson et al. | 455/566 |
| 5,797,089 | 8/1998 | Nguyen | 455/557 |
| 5,828,427 | 10/1998 | Faris | 349/5 |

FOREIGN PATENT DOCUMENTS

| | | |
|---|---|---|
| 0 631 289 A2 | 12/1994 | European Pat. Off. . |
| 0 631 289 A3 | 12/1994 | European Pat. Off. . |
| 0 689350 A2 | 12/1995 | European Pat. Off. . |
| 0 704 788 A2 | 4/1996 | European Pat. Off. . |
| 0 732 606 A2 | 9/1996 | European Pat. Off. . |
| 0 817 393 A2 | 1/1998 | European Pat. Off. . |
| 2612351 | 9/1988 | France . |
| 27 15 446 | 10/1978 | Germany . |
| 28 20 096 | 11/1979 | Germany . |
| 38 28 485 A1 | 3/1990 | Germany . |
| 92 00 683 U | 6/1992 | Germany . |
| 61-139177 | 6/1986 | Japan . |
| 9-26617 | 1/1987 | Japan . |
| 62-91045 | 4/1987 | Japan . |
| 63-151283 | 6/1988 | Japan . |
| 1-160286 | 6/1989 | Japan . |
| 2-218251 | 3/1990 | Japan . |
| 2-113656 | 4/1990 | Japan . |
| 2-196570 | 8/1990 | Japan . |
| 3-53785 | 3/1991 | Japan . |
| 3-105383 | 5/1991 | Japan . |
| 3-136487 | 6/1991 | Japan . |
| 5-14550 | 1/1993 | Japan . |
| 5-252523 | 9/1993 | Japan . |
| 6-123852 | 5/1994 | Japan . |
| 7-177398 | 7/1995 | Japan . |
| 7-235892 | 9/1995 | Japan . |
| 8-76078 | 3/1996 | Japan . |
| 8-102877 | 4/1996 | Japan . |
| 8-95027 | 4/1996 | Japan . |
| 8-114783 | 5/1996 | Japan . |
| 8-129157 | 5/1996 | Japan . |
| 8-149346 | 6/1996 | Japan . |
| 8-149485 | 6/1996 | Japan . |
| 8-154190 | 6/1996 | Japan . |
| 8-248499 | 9/1996 | Japan . |
| 8-340546 | 12/1996 | Japan . |
| 9-55872 | 2/1997 | Japan . |
| 2 242 335 | 9/1991 | United Kingdom . |
| 92/12453 | 7/1992 | WIPO . |
| 93/01583 | 1/1993 | WIPO . |
| 93/16550 | 8/1993 | WIPO . |
| 93/18428 | 9/1993 | WIPO . |
| 93/23783 | 11/1993 | WIPO . |
| 94/01958 | 1/1994 | WIPO . |
| 94/09398 | 4/1994 | WIPO . |
| 94/11775 | 5/1994 | WIPO . |
| 94/14152 | 6/1994 | WIPO . |
| 95/11473 | 4/1995 | WIPO . |
| 95/25983 | 9/1995 | WIPO . |
| 95/26110 | 9/1995 | WIPO . |
| 96/19794 | 6/1996 | WIPO . |
| 96/21173 | 7/1996 | WIPO . |
| 96/21205 | 7/1996 | WIPO . |
| 96/24197 | 8/1996 | WIPO . |
| 96/35288 | 11/1996 | WIPO . |
| 97/01240 | 1/1997 | WIPO . |

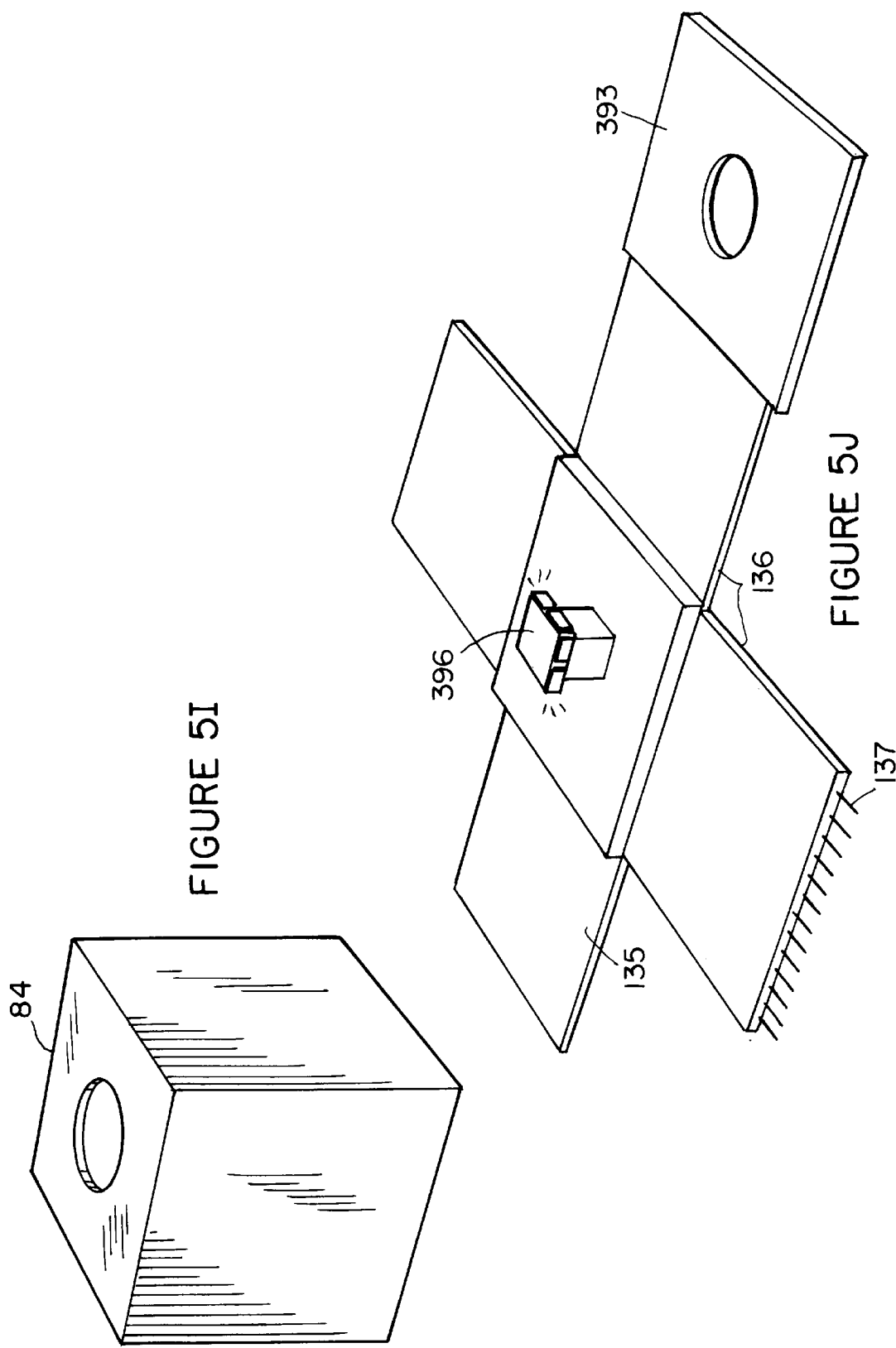

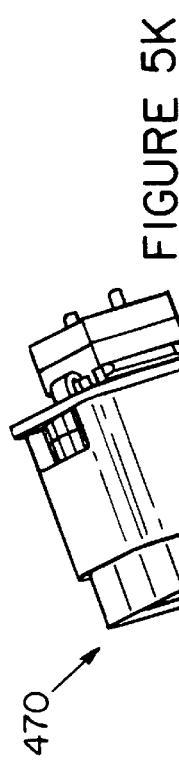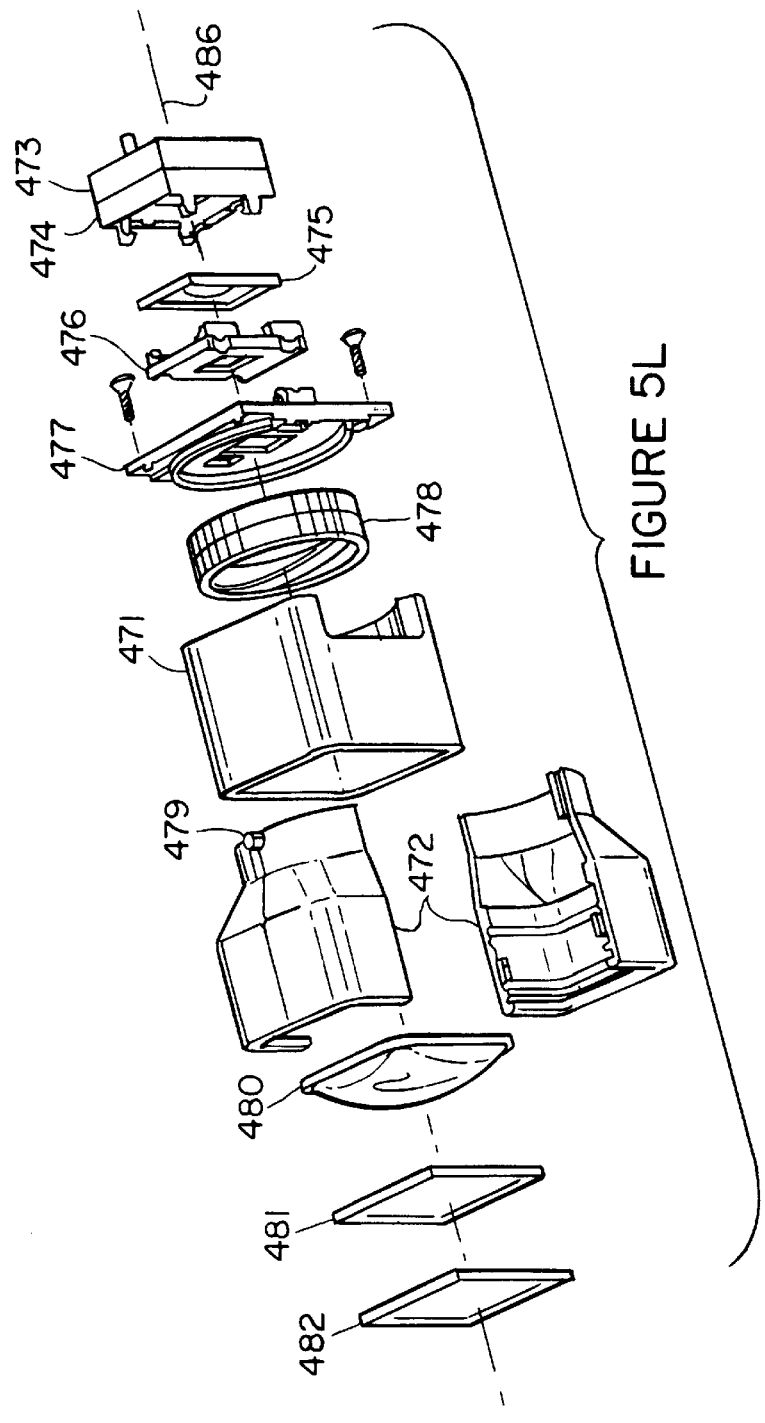

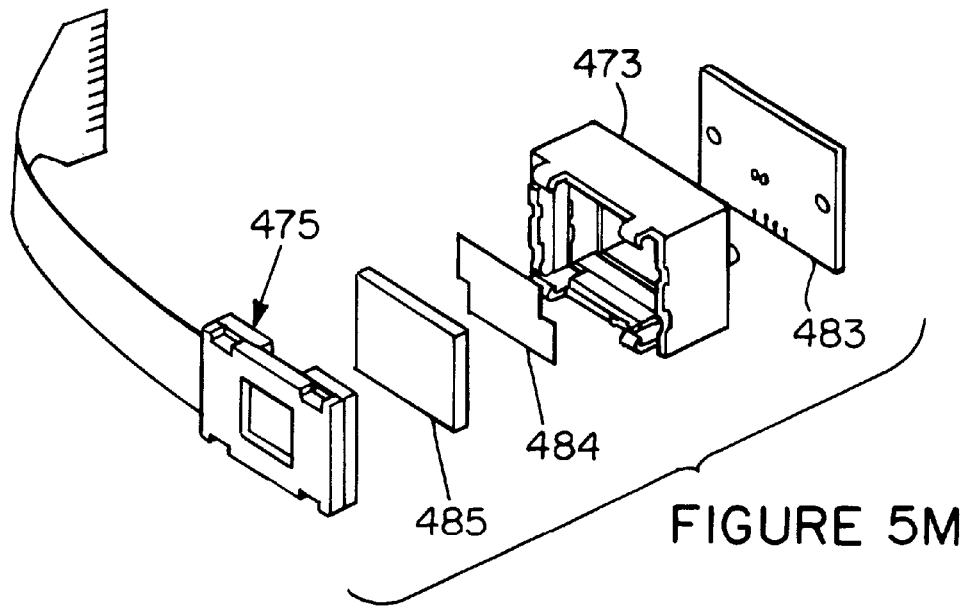
FIGURE 5M
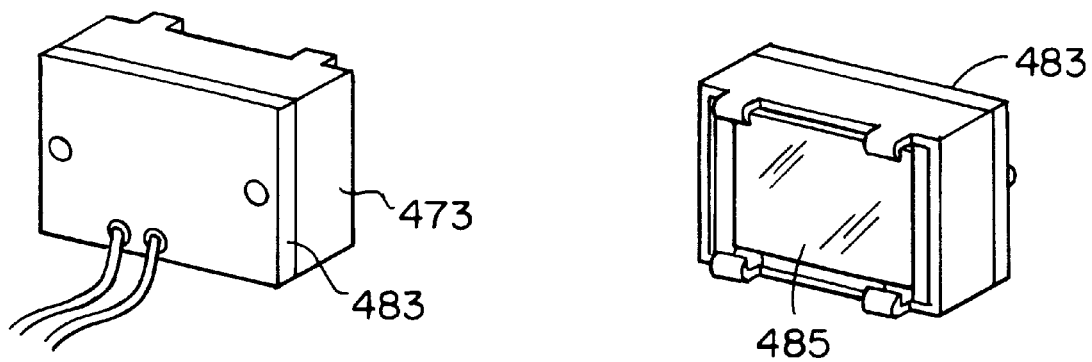
FIGURE 5N
FIGURE 5O

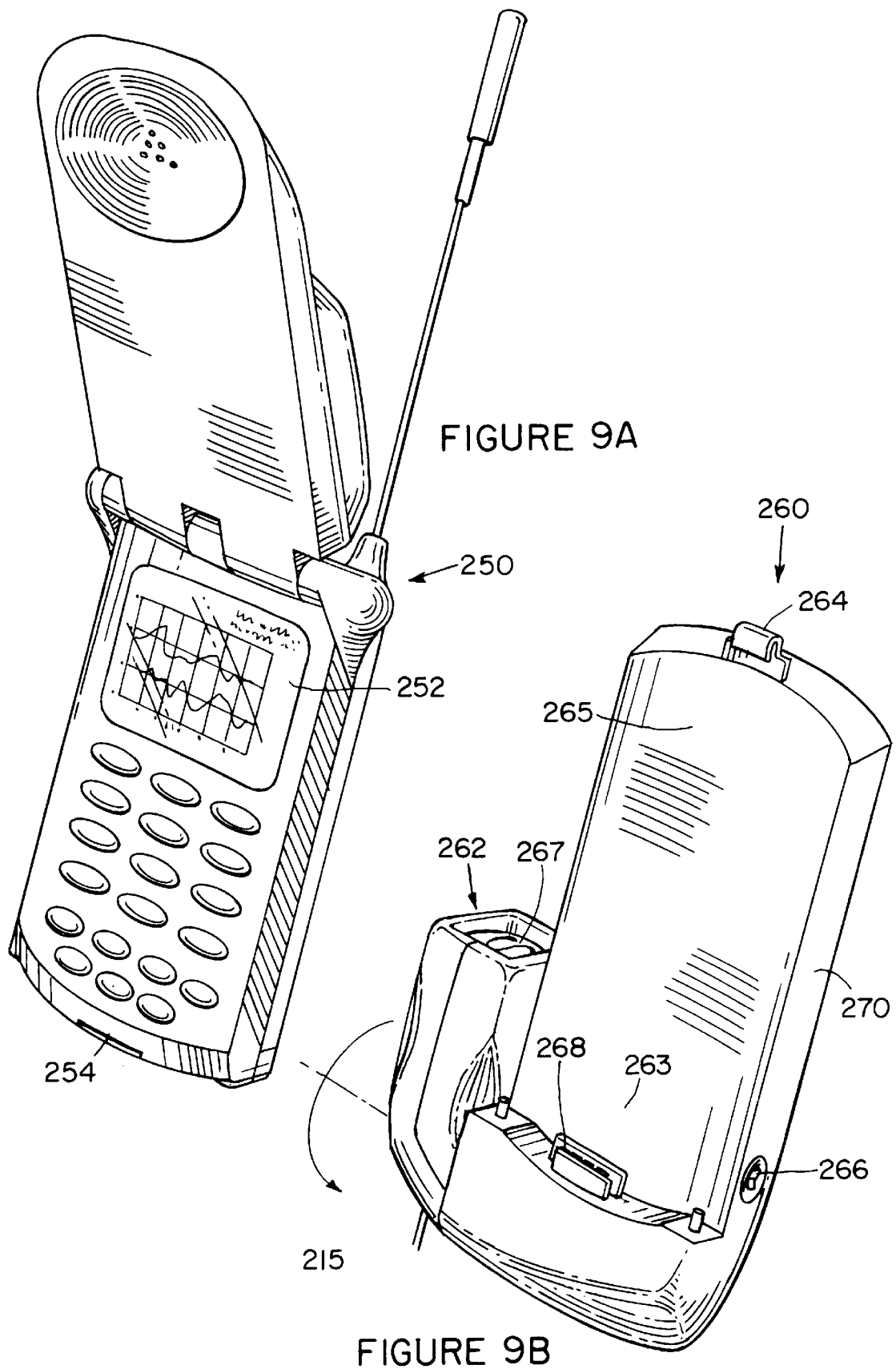

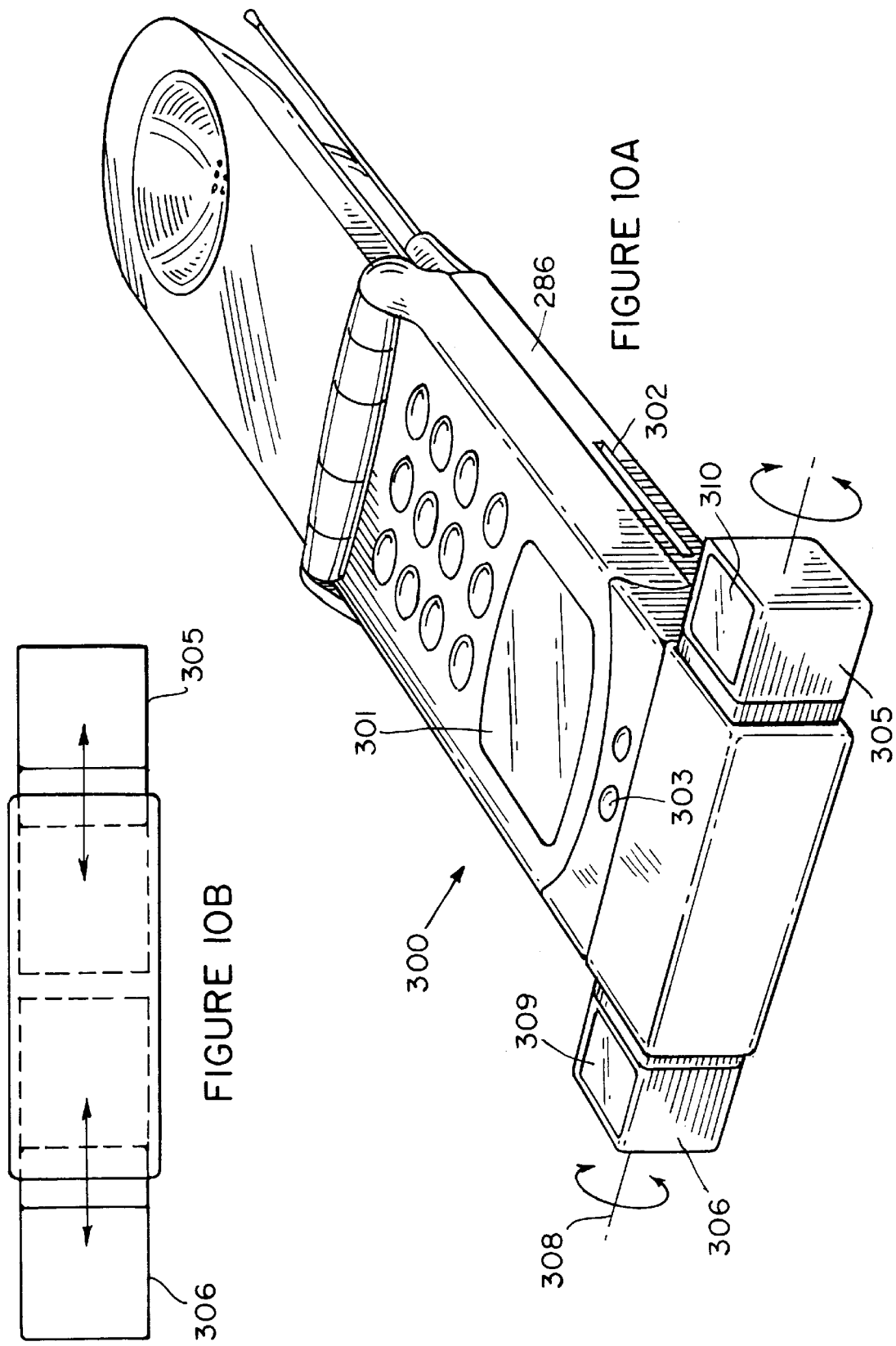

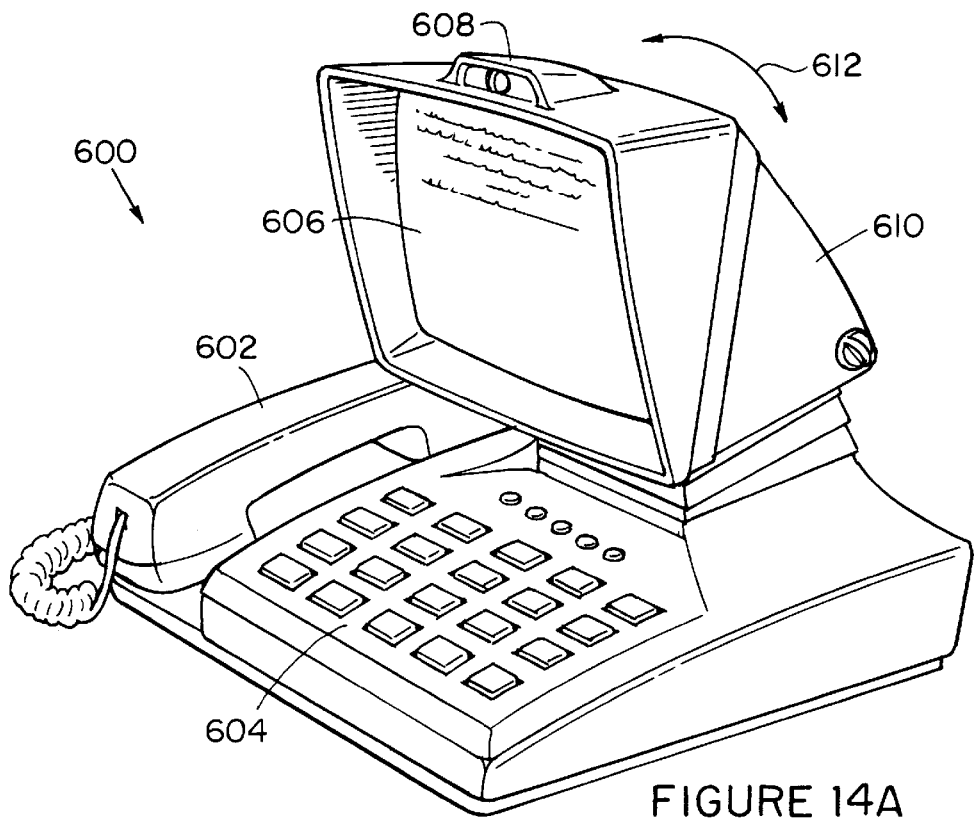
FIGURE 14A
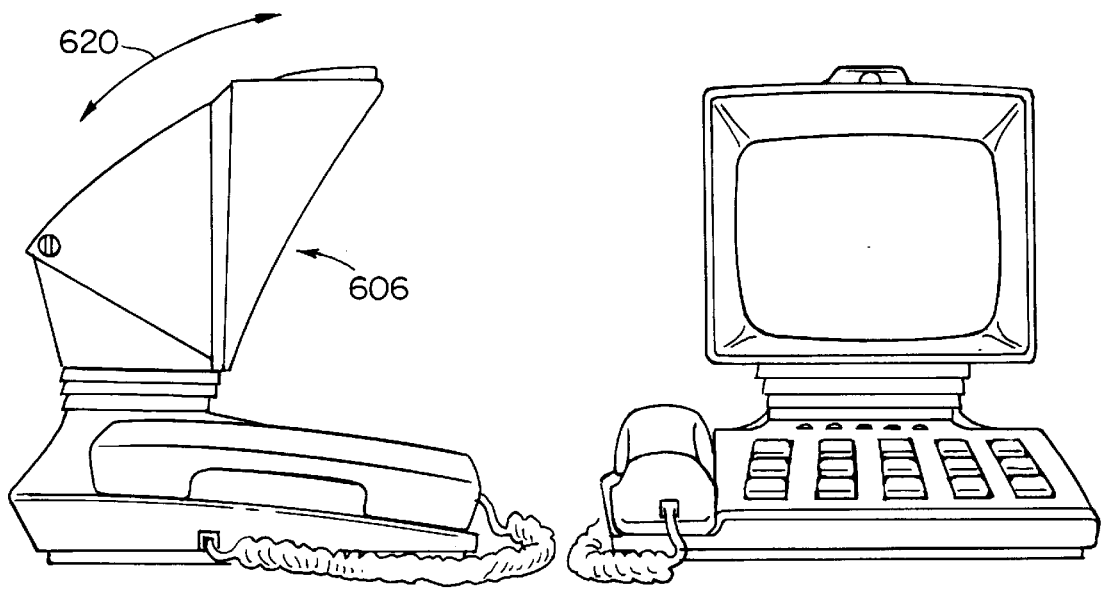
FIGURE 14B
FIGURE 14C

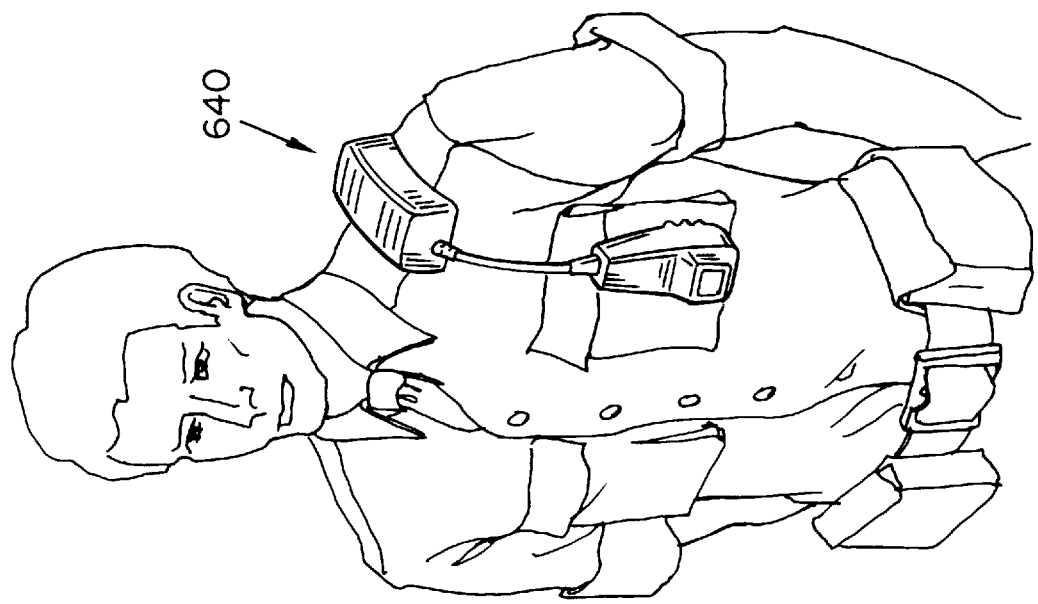
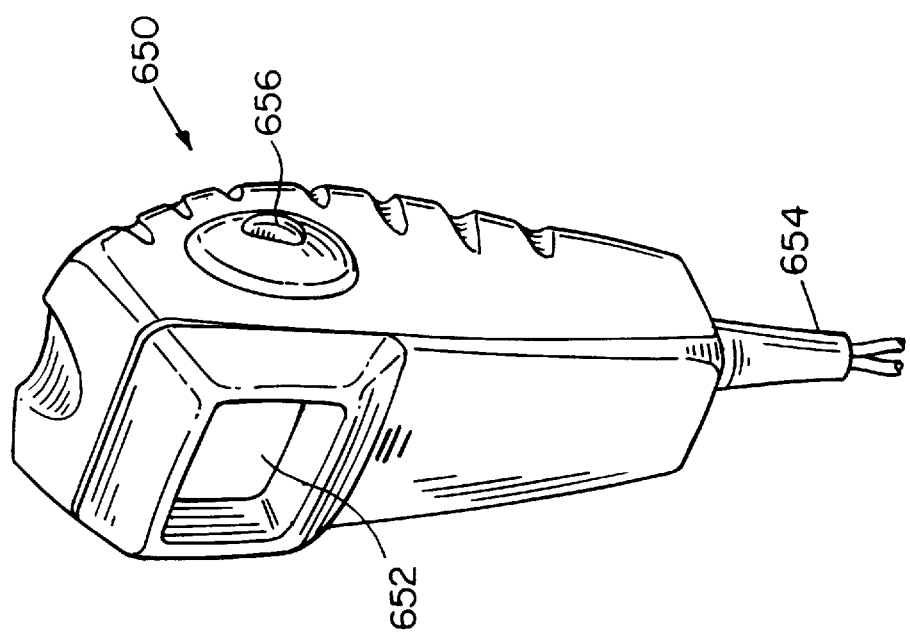
FIGURE 16B
FIGURE 16A

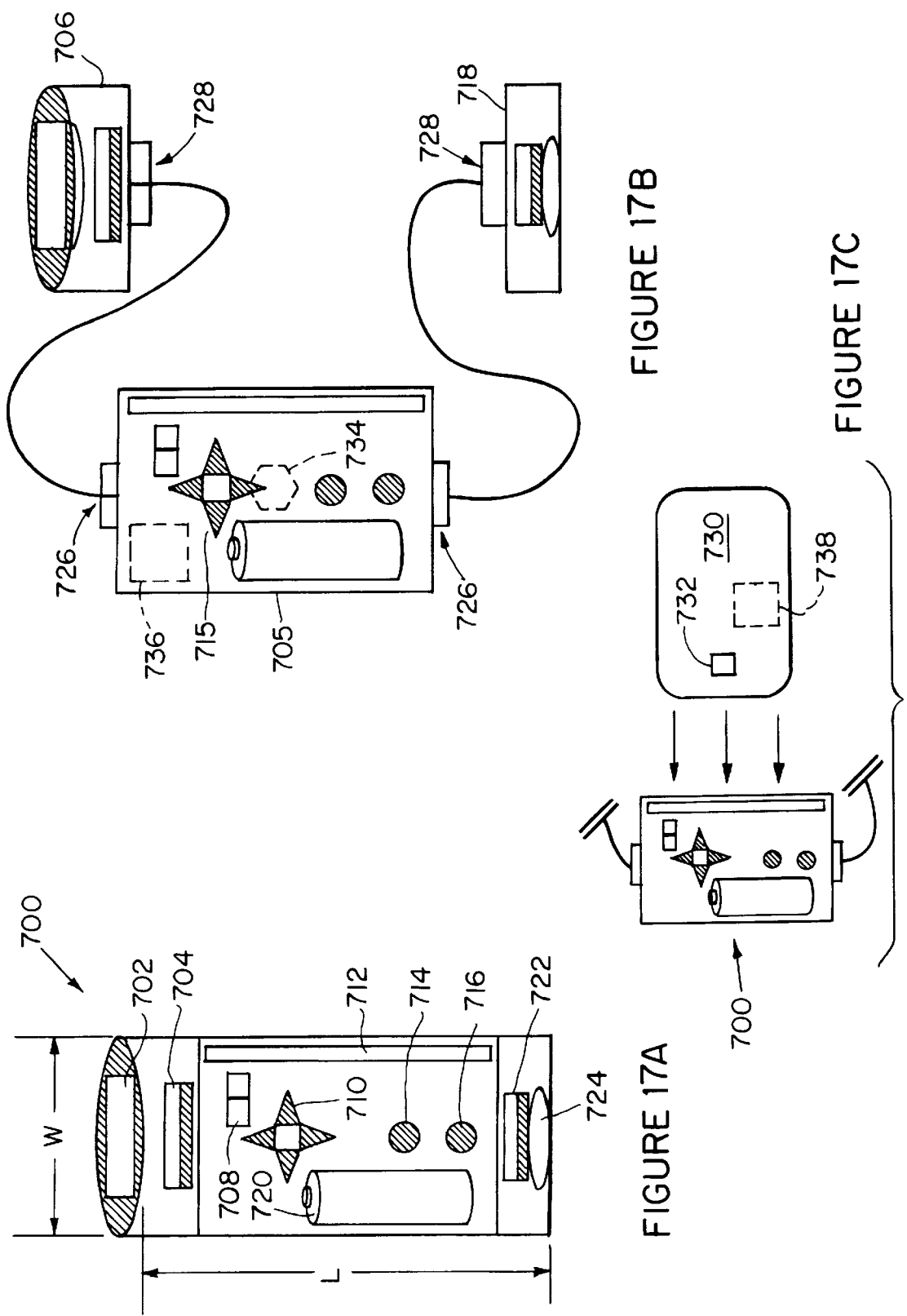

WIRELESS TELEPHONE DISPLAY SYSTEM

RELATED APPLICATIONS

This is a continuation application of U.S. Ser. No. 08/853,630, filed on May 9, 1997 pending of Jacobsen, et. al. which is a continuation-in-part application of U.S. Ser. No. 08/838,420, filed on Apr. 7, 1997 pending of Jacobsen, et. al. which is a continuation-in-part application of U.S. Ser. No. 08/810,646 filed on Mar. 3, 1997, pending which is a Continuation-in-Part application of U.S. Ser. No. 08/766,607 filed on Dec. 13, 1996 pending which is a continuation-in-part application of U.S. Ser. No. 08/741,671 pending filed on Oct. 31, 1996, the entire contents of the above applications being incorporated herein by reference.

BACKGROUND OF THE INVENTION

Flat-panel displays are being developed which utilize liquid crystals or electroluminescent materials to produce high quality images. These displays are expected to high quality images. These displays are expected to supplant cathode ray tube (CRT) technology and provide a more highly defined television picture or computer monitor image. The most promising route to large scale high quality liquid crystal displays (LCDs), for example, is the active-matrix approach in which thin-film transistors (TFTs) are co-located with LCD pixels. The primary advantage of the active matrix approach using TFTs is the elimination of cross-talk between pixels, and the excellent grey scale that can be attained with TFT-compatible LCDs.

Flat panel displays employing LCDs generally include five different layers: a white light source, a first polarizing filter that is mounted on one side of a circuit panel on which the TFTs are arrayed to form pixels, a filter plate containing at least three primary colors arranged into pixels, and finally a second polarizing filter. A volume between the circuit panel and the filter plate is filled with a liquid crystal material. This material will allow transmission of light in the material when an electric field is applied across the material between the circuit panel and a ground affixed to the filter plate. Thus, when a particular pixel of the display is turned on by the TFTs, the liquid crystal material rotates polarized light being transmitted through the material so that the light will pass through the second polarizing filter.

The primary approach to TFT formation over the large areas required for flat panel displays has involved the use of amorphous silicon, which has previously been developed for large-area photovoltaic devices. Although the TFT approach has proven to be feasible, the use of amorphous silicon compromises certain aspects of the panel performance. For example, amorphous silicon TFTs lack the frequency response needed for high performance displays due to the low electron mobility inherent in amorphous material. Thus the use of amorphous silicon limits display speed, and is also unsuitable for the fast logic needed to drive the display.

As the display resolution increases, the required clock rate to drive the pixels also increases. In addition, the advent of colored displays places additional speed requirements on the display panel. To produce a sequential color display, the display panel is triple scanned, once for each primary color. For example, to produce color frames at 20 Hz, the active matrix must be driven at a frequency of 60 Hz. In brighter ambient light conditions, the active matrix may need to be driven at 1830 Hz to produce a 60 Hz color image. At over 60 Hz, visible flicker is reduced.

Owing to the limitations of amorphous silicon, other alternative materials include polycrystalline silicon, or laser recrystallized silicon. These materials are limited as they use silicon that is already on glass, which generally restricts further circuit processing to low temperatures.

Integrated circuits for displays, such as, the above referred color sequential display, are becoming more and more complex. For example, the color sequential display is designed for displaying High Definition Television (HDTV) formats requiring a 1280-by-1024 pixel array with a pixel pitch, or the distance between lines connecting adjacent columns or rows of pixel electrodes, being in the range of 15–55 microns, and fabricated on a single five-inch wafer.

SUMMARY OF THE INVENTION

In accordance with the invention, the cost and complexity of high resolution displays is significantly reduced by fabricating multiple integrated displays of reduced size on a single wafer and then dicing the wafer to produce a plurality of display devices.

The displays are then assembled with appropriate magnifying optics to form a portable display system of low cost and reduced size. Included in the optics is a magnification system which compensates for the small image size by magnifying and projecting the image at an appropriate distance for viewing.

In preferred embodiments, the microdisplay, because of its small size and weight, can be used as a hand-held communication system such as a pager, a wireless mobile telephone, or alternatively, as a head-mounted display or a card reader display system. The display can provide a visual display suitable for data, graphics or video and accommodate standard television or high definition television signals. The system can optionally include circuitry for cellular reception and transmission of facsimile communications, can be voice activated, can include a mouse operated function, provide Internet access, and can have a keyboard or touch pad for numeric or alphabetic entry. The system can have, such as in a card reader display system, a housing with a port or aperture to receive a card, and a card reader for reading information from the card and displaying the information on the microdisplay. The telephone or hand-held unit can be equipped with a camera or solid state imaging sensor so that images can be generated and transmitted to a remote location and/or viewed on the display. Also the telephone user can call to access a particular computer at a remote location, present the computer screen on the microdisplay, access specific files in the computer memory and download data from the file into a memory within the telephone or a modular memory and display unit connected to the telephone. The telephone can be connected to a local computer or display and the data from the file can be loaded into the local memory.

In a preferred embodiment of the invention, a light emitting diode (LED) device is used to illuminate the display. For transmission displays the LED device operates as a back light and can include a diffuser. An LED device can also be used as a light source for a reflective display in another preferred embodiment of the invention. The displays are preferably liquid crystal displays using a nematic liquid crystal material. Consequently, controlling the time domain is not necessary to obtain grey scale.

For the purposes of this application, a micro display is defined as a display having at least 75,000 pixel electrodes and an active area of less than 160 mm$^2$, where the active area of the display is the area of the active matrix circuit that generates an image, including all of the pixel electrodes but not including the driver electronics and the border area for bonding and sealing of the liquid crystal display. For example, the array can be at least 320×240, 640×480 or higher. A preferred embodiment of the micro display has an active area of 100 mm² or less, and is preferably in the range between 5 mm² and 80 mm². The pixel pitch for these displays is in the range of 5–30 microns and preferably in the range between 5 and 18 microns. By utilizing pixel pitches of less than 18 microns smaller high resolution displays are now possible.

For displays of this size and resolution to be read by a user at distances of less than 10 inches (25.4 cm) there are specific lighting and magnification requirements. For a 0.25 inch (6.35 mm) diagonal display, for example, the LED device preferably includes a plurality of LEDS coupled to a diffuser. The lens used to magnify the display image has a field of view in the range of 10–60 degrees, and preferably at least about 16 degrees–22 degrees, an ERD in the range of about 25 mm–100 mm and an object distance of between about 1.5 and 5 feet (152.4 cm). A color field sequentially operated LED back light system can use a plurality of LEDS with a two or four sided reflector assembly to concentrate the light through the liquid crystal display. A preferred embodiment can use at least two LEDs, or as many as six or more of each color, to provide the desired brightness level. Alternatively the LEDs can be arranged around the periphery of a transmissive display and directed down into a conical reflector that directs the backlighting through the display in concentrated form.

The backlight, the display and the viewing lens can be aligned along a single axis within a small housing volume that is less than 20 cm³, and preferably less than 12 cm³. The system weighs less than 10 grams, preferably in the range between 5 and 8 grams. The system can be incorporated into battery operated personal communication devices without substantial alteration of their form factor and weight requirements.

The display can be operated using a color sequential system as described in U.S. patent application Ser. No. 08/216,817, "Color Sequential Display Panels" filed on Mar. 23, 1994, the entire contents of which is incorporated herein by reference, discloses an active matrix display in which the control electronics is integrated with the active matrix circuitry using single crystal silicon technology. The control electronics provides compressed video information to produce a color image for data, a still image or a video image such as a television image on the display.

The micro displays described herein can be used in head mounted displays and portable communications systems, including color sequential systems as described in greeter detail in U.S. application Ser. No. 08/410,124 filed on Mar. 23, 1995, the entire contents of which is incorporated herein by reference. Further details regarding the drive electronics suitable for a micro display can be found in U.S. Ser. No. 08/106,416 filed on Aug. 13, 1993, the entire contents of which is incorporated herein by reference. A preferred embodiment, of the display control circuit utilizes an "under scanning" feature in which selected pixels are rapidly turned on and off to enhance edge definition and emulate a higher resolution display. The display control circuit can also utilize a panning capability so that a small portion of a displayed image can be selected, by mouse operation for example, and presented using the entire micro display image area thereby allowing the user to perceive smaller displayed features. This can also be used to view selected portions of a high resolution image, such as a portion of a 640×480 image on a 320×240 micro display.

BRIEF DESCRIPTION OF THE DRAWINGS

The above and other objects and features of the invention will be better understood and appreciated by those skilled in the art in view of the description of the preferred embodiments given below in conjunction with the accompanying drawings, in which:

FIG. 4Ba is a partial cross section rear view of a preferred embodiment of a pager with integrated camera in accordance with the invention.

FIGS. 5E–5O illustrate additional preferred embodiments of a backlighting system in accordance with the invention.

FIGS. 9A–9J are illustrations of further preferred embodiments of a telephone micro display system in accordance with the invention.

FIGS. 10A and 10B illustrate another preferred embodiment of a telephone micro display system.

FIGS. 14A–14C illustrates the use of a micro display rear projection system for a telephone video conferencing station.

FIGS. 16A–16B illustrate a body worn, hand operated display system in accordance with the invention.

FIGS. 17A–17C illustrate the use of a micro display in a card reader system in accordance with another preferred embodiment of the invention.

DETAILED DESCRIPTION OF THE INVENTION

High Resolution Active Matrix Microdisplay

Figure 1:
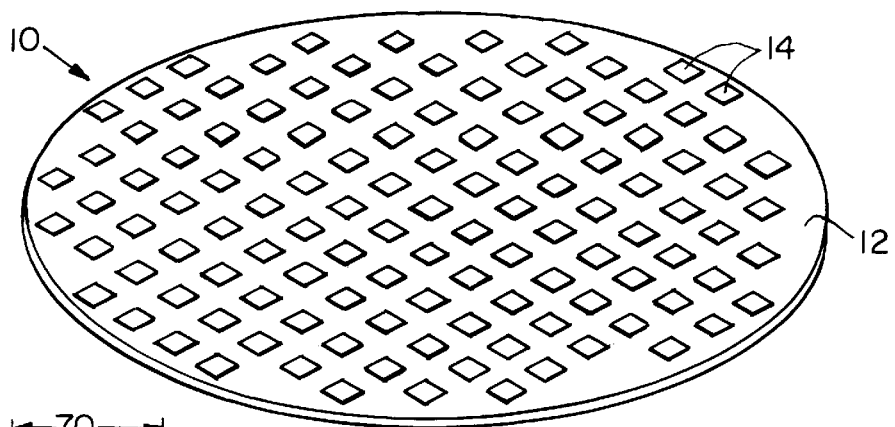
FIG. 1 is a perspective view of a single wafer having a plurality of display devices formed thereon in accordance with the invention.

A preferred embodiment of the invention utilizes a process of making a plurality of flat panel displays 10 in which a large number of active matrix arrays 14 are fabricated on a single wafer 12 as illustrated in connection with FIG. 1. The number of displays fabricated on a single wafer depends upon the size of the wafer and the size of each display. A preferred embodiment of the invention, for example, uses a high resolution display having an imaging area of the display with a diagonal of 0.5 inches (12.7 mm) or less. For a four inch wafer, forty separate displays can be fabricated on a single four inch wafer. Where each display has a diagonal of about 0.25 inches (6.35 mm), 80 displays can be fabricated on a single wafer, over 120 displays can be fabricated on a five inch wafer, and 400 displays can be fabricated on an 8 inch wafer.

By fabricating a large number of small high resolution displays on a single wafer the manufacturing yield can be substantially increased and the cost per display can be substantially reduced.

To obtain monochrome resolutions of at least 75,000 pixels (e.g. a 320×240 array) suitable for displaying an NTSC television signal on a 0.25 inch diagonal display the pixel electrodes are preferably on the order of about 15 microns in width or less. To obtain a monochrome resolution of at least 300,000 pixels (e.g. 640×480 array) on a 0.25 inch diagonal display the pixel electrodes preferably have a width of about 8–10 microns.

These small high resolution displays require magnification such that when held in a user's hand within the range of 0.5 inches to 10 inches of the user's eye, a clear image is provided.

Referring now to FIG. 2, an integrated circuit active matrix display die is shown schematically which has been diced from a single wafer along with selected number of replicated circuits. Incorporated into the circuit 100 are scanner circuits 42a, 42b, 42c, 42d, along with pixie driven circuits 44a, 44b, 44c, 44d, select scanner circuits 46a, 46b and a display matrix circuit 90.

Further details regarding the fabrication of each die on a wafer can use the methods described in U.S. Pat. No. 5,256,562, the contents of which incorporated herein its entirety by reference.

By fabricating a selected number of circuits 100 on a single wafer, the circuit yield from a single wafer is greatly enhanced at the expense of reduced display area. However, this area disadvantage is overcome by magnifying and projecting the display image as will be described herein.

A video signal bus 35-1 through 35-16 carries analog video signals from digital to analog amplifiers (not shown) to column drivers 44a–d. Because signal interference and signal loss can occur as the analog video signal cross each signal line in the signal bus 35, the channels of video signals are arranged to reduce interference. As illustrated, there are four column drivers 44a–44d, two column drivers 44a,44b at the top of the active matrix circuit 90 and two column drivers 44c,44d at the bottom of the active matrix circuit region 90. Each channel is allocated to one of the column drivers 44 such that each column driver 44 receives video from four channels. The top column drivers 44a,44b receive video from the channels that drive the odd-numbered pixel columns and the bottom column drivers 44c,44d receive video from the channels that drive the even-numbered columns. As shown, no video signal has to cross the path of more than one other video signal.

The illustrated arrangement of column drivers is particularly suited for edge-to-center and center-to-edge video writing, although the data can also be written from left-to-right or right-to-left. It should be understood that more or less than four column drivers 44 can be employed in preferred embodiments of the invention. For applications having resolutions of 320×240 or 640×480 it is desirable to use single column and row drivers to drive the display. For high speed, high definition displays more can be used to improve performance.

The data scanners 42a–d are responsive to a pixel data signal 142 and a pixel clock signal 143 from a control signal generator (not shown). The data scanners 42a–d can use a shift register array to store data for each scan. An odd shift register array can be used to store data to odd column pixels and an even shift register array can be used to store data to even column pixels. As illustrated, there are left and right odd data scanners 42a,42b and left and right even data scanners 42c,42d.

The column drivers 44 selected by the data scanner 42 transmit video data to a selected column of C pixels in the active matrix circuit 90. The select scanner 46 controlled by a control signal generator determines by control lines which pixels accept this column data.

To reduce signal loss across the active matrix region 90, the select lines are driven from both sides by select scanners 46a and b. As viewed in FIG. 2A, a left select scanner 46a and right select scanner 46b are connected to the select data line 146 and the select clock line 147. A third enabling line 148 can also be used for specific applications. The left select scanner 46a provides a select line signal at the end of the select line nearest the lowest-valued pixel column ($C_1$) and right select scanner 46b provides a select line signal at the end of the select line nearest the highest-valued pixel column ($C_N$). Thus, an identical select line signal is supplied at both ends of the select line.

Although static shift registers can be used, the shift registers of the data scanner 42 and the select scanners 46 are preferably implemented as dynamic shift registers. The dynamic shift registers rely on capacitor storage without leakage. However, dynamic shift registers are susceptible to leakage, especially when they are exposed to light. Hence, light shields are needed to protect the scanners 42a–42d,46 from exposure to light. Similarly, light shields are also used to protect the transmission gates 44 and pixel columns $C_1$–$C_N$.

For further information regarding the input signals to the circuit 100, reference is made to the above-cited U.S. patents and applications.

Figure 2A:
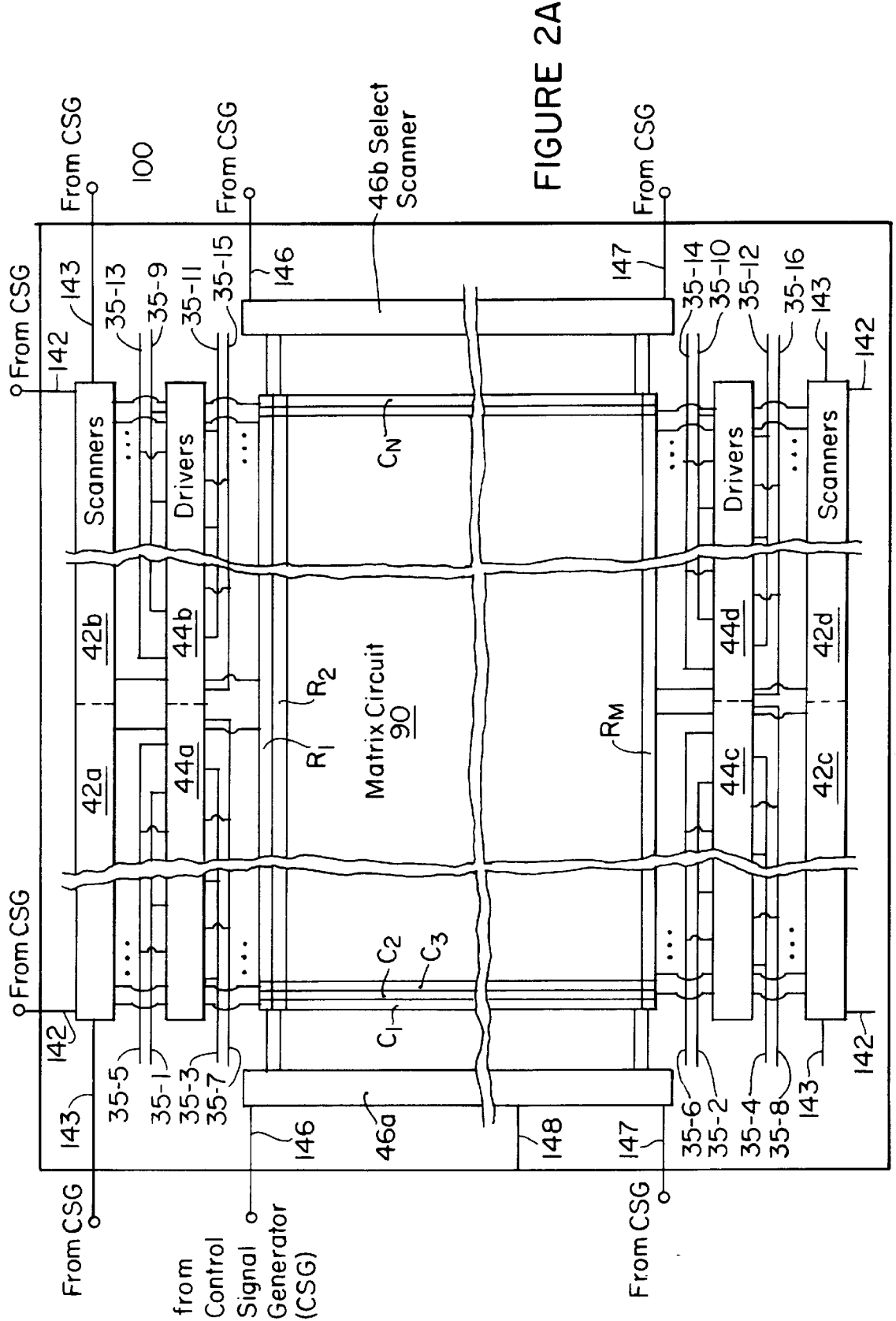
FIG. 2A is a schematic illustration of a die for an integrated active matrix panel display which includes optional control signal circuitry therein.

In a preferred embodiment of the invention, the panel drive circuitry of FIG. 2A is fabricated as an integrated circuit along with the active matrix circuit 90. The integrated circuitry is preferably fabricated in single crystal silicon having a silicon-on-insulator (SOI) structure using the fabrication and transfer procedures described previously in the aforementioned U.S. Pat. No. 5,256,562. By fabricating the row and column drive circuitry 42a–42d, 44a–44d, 46a, 46b as well as the scanners in single crystal material along with the active matrix circuit 90, the size of the display panel is not constrained by the connecting pins for the various discrete components. The integrated fabrication also increases the operating speed of the display relative to displays constructed from discrete components. Furthermore, the drive circuitry can be optimized to increase display performance. For example, it is easier to construct a small 1280 H×1024 V display panel with dual select scanners through integrated fabrication than it is using discrete components.

The pixel electrodes in a preferred embodiment are between 60 and 250 microns square. Consequently, a 1280 H×1024 V active matrix with the control system can be fabricated such that there are at least 40 such integrated circuits on a five inch wafer, for example.

Figure 2B:
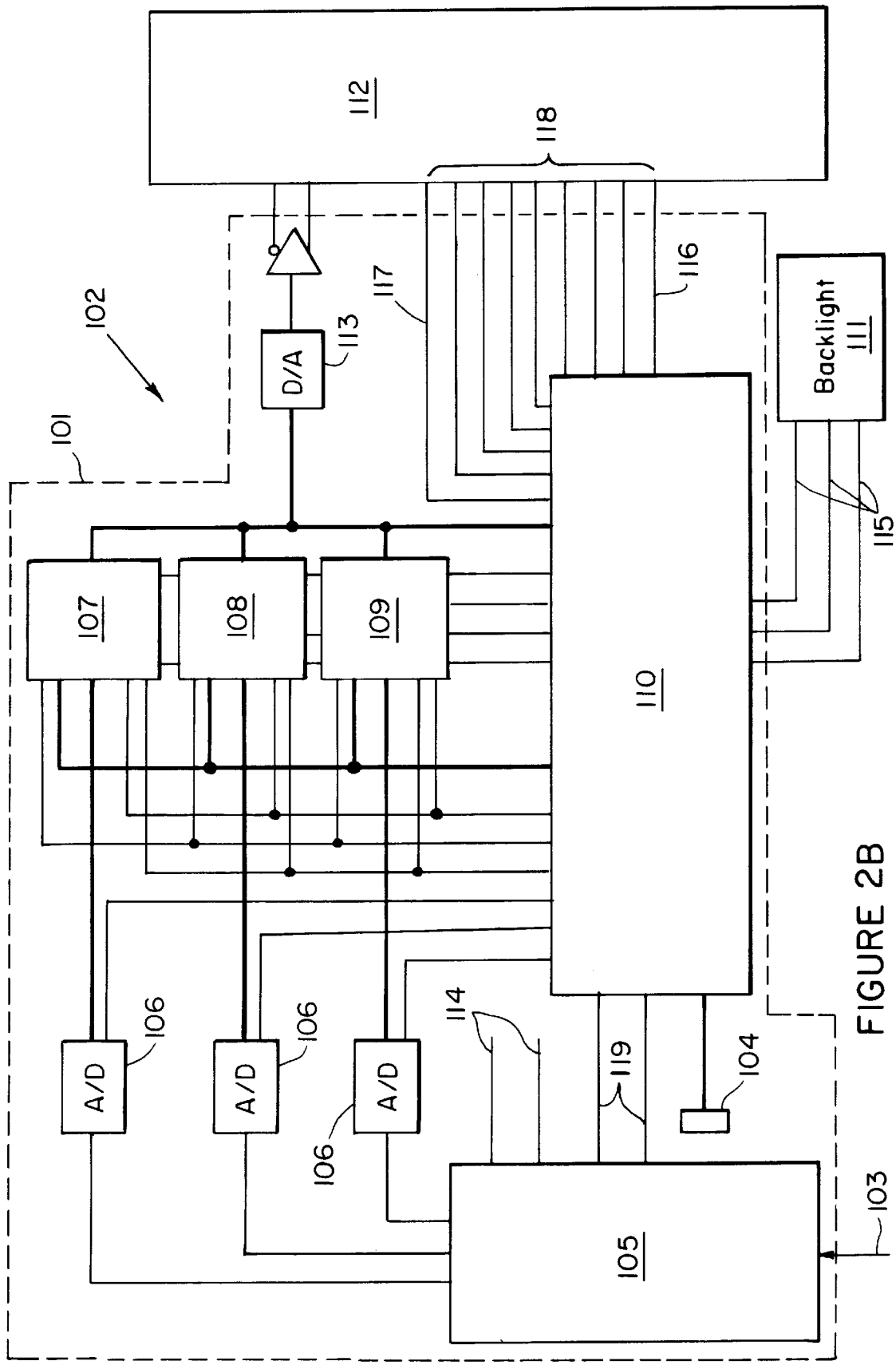
FIGS. 2B and 2C illustrate preferred embodiments of display control circuits in accordance with the invention.

A preferred embodiment of a display control circuit for a color sequential micro display is illustrated in connection with FIG. 2B. The display control circuit 102 receives an analog composite signal 103 such as a television or VCR video signal at converter 105. Converter 105 can be a commercially available chip, such as the Sony CXA1585, which separates the signal 103 into red, green and blue components. The three analog color components are converted into digital signals by three respective analog to digital (A/D) converters 106. The three color digital signals are stored in red 107, green 108, and blue 109 memory circuits. Circuits 107, 108 and 109 can be DRAY frame buffers that are connected to the timing circuit 110. Timing circuit 110 can be connected to the telephone processor 104 by an interface bus and receives horizontal and vertical synchronization signals along lines 119 from converter 105. Circuit 110 controls the sequential flow of each color frame onto the display by sending video data from each memory 107, 108, 109 onto the display and coordinating actuation of the back light 111 along lines 115 for each primary color. Lines 114 provide control of hue and contrast of the resulting image. Lines 116, 117 and 118 are used to control the row and column driver circuits within display circuit 112. Lines 116 and 117 control horizontal shift and vertical shift of the data as it is read onto the display and allow the user to invert the image on the display. This can be useful for the telephone user who may select one hand to hold the telephone during use and simply press a button on the housing so that the image is inverted for presentation to the eye of the user when electing to hold the telephone speaker in the other hand adjacent to the user's ear.

Lines 118 control vertical and horizontal pulse, vertical and horizontal clock, even and odd row enable signals and the horizontal multiplying pulse signal. Digital to analog converters 106, 113, memories 107, 108, 109, connecter 105 and control circuit 110 can be mounted on a common circuit board with display 112, or they can be split onto separate circuit boards or integrated circuits within the telephone housing or the docking element housing described in greater detail below depending on the geometry and operational requirements of the specific embodiment.

Figure 2C:
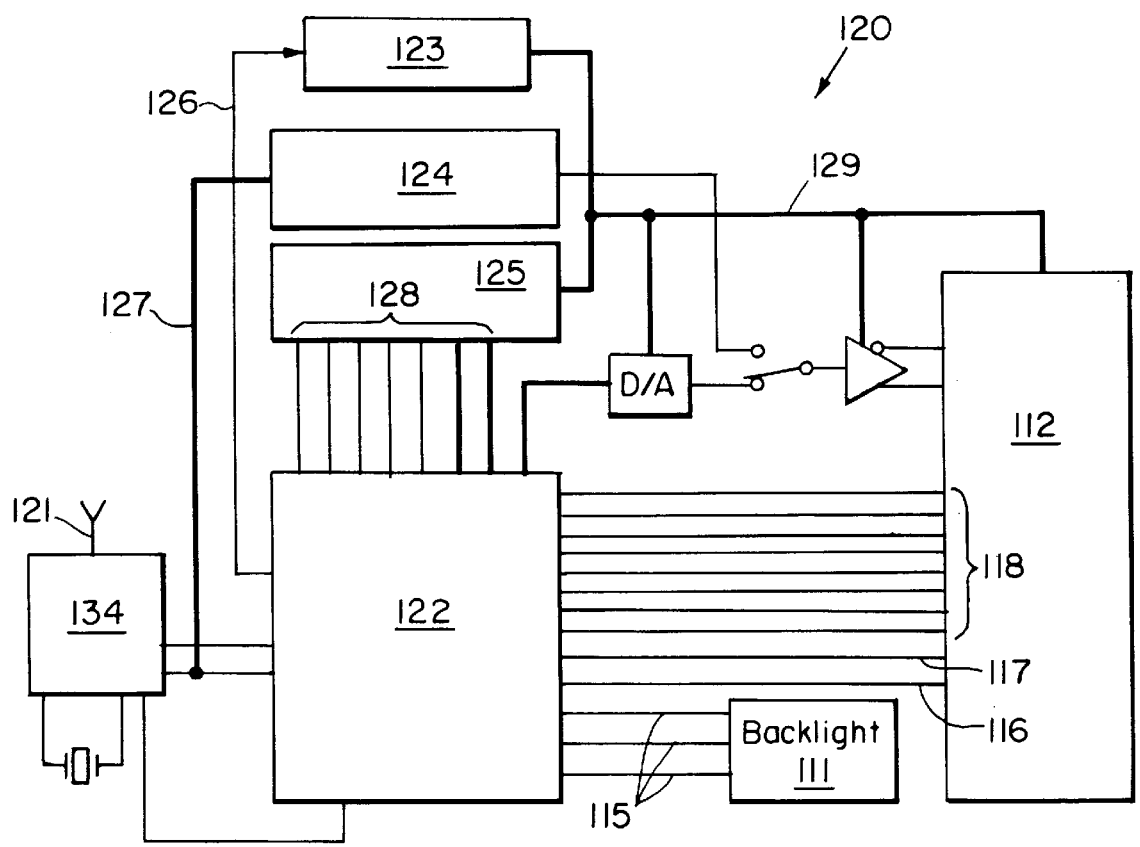

Another preferred embodiment of a display control circuit is illustrated in connection with FIG. 2C. In this embodiment, a digital circuit 120 is used to control color sequential display operation. The processor 104 receives serial digital image data at 121 and sends display data to memory 124. An optional additional flash memory circuit 125 can also be included to store graphics data where that is in addition to text stored at 124. Timing control circuit 122 receives clock and digital control signals from processor 104 and transmits control signals to the back light 111 and display 112 along lines 115, 116, 117, and 118, respectively. Lines 128 direct ready, reset, write enable, output enable, color enable, address and data signals to memory to control deliver of image frames to the display 112.

Power management circuit 123 receives control signals along line 126 from circuit 122 to lower power consumption of the circuit 120. Circuit 123 is used to control power during display operation. This capability arises from the use of a transferred thin film active matrix circuit described previously which has an ability to store charge between vertical synchronization pulses. This storage capacity enables lower power consumption of the display and back light at less than 0.2 Watts. Thus, after a frame of data is written on the display, power is lowered until the next frame is written. This lengthens battery cycle time of portable communication devices as described herein.

Figure 2D:
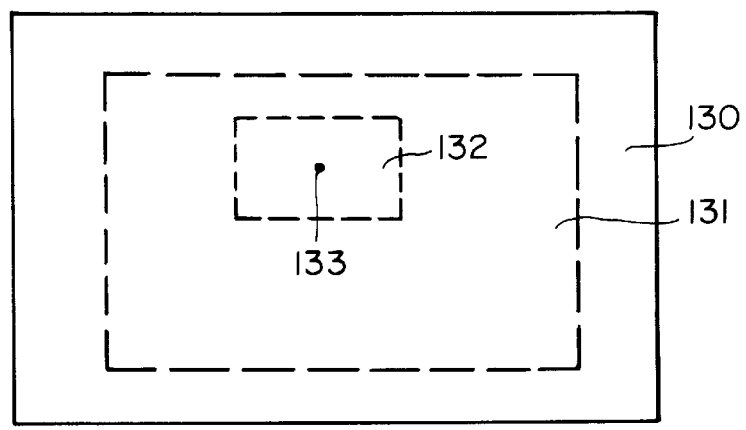
FIG. 2D illustrates a method for selectively displaying an image on a display in accordance with the invention.

FIG. 2D illustrates a method of displaying information on the display in which large amounts of information are contained in each image. For such high information images it may be desirable to enlarge a selectable portion of that image on the display. For example, the full image 130 has a region 131 in which a cursor 133 can be positioned. The user can position the cursor using a mouse or button control element anywhere within region 131 and identify a subregion 132. The user selects the image of subregion for display on the full display area.

A preferred embodiment in the form of a stand-alone video display device 20 featuring a liquid crystal display incorporating the actual matrix display circuit 100 will now be described in connection with the exploded views of FIGS. 3A and 3B.

Figure 3A:
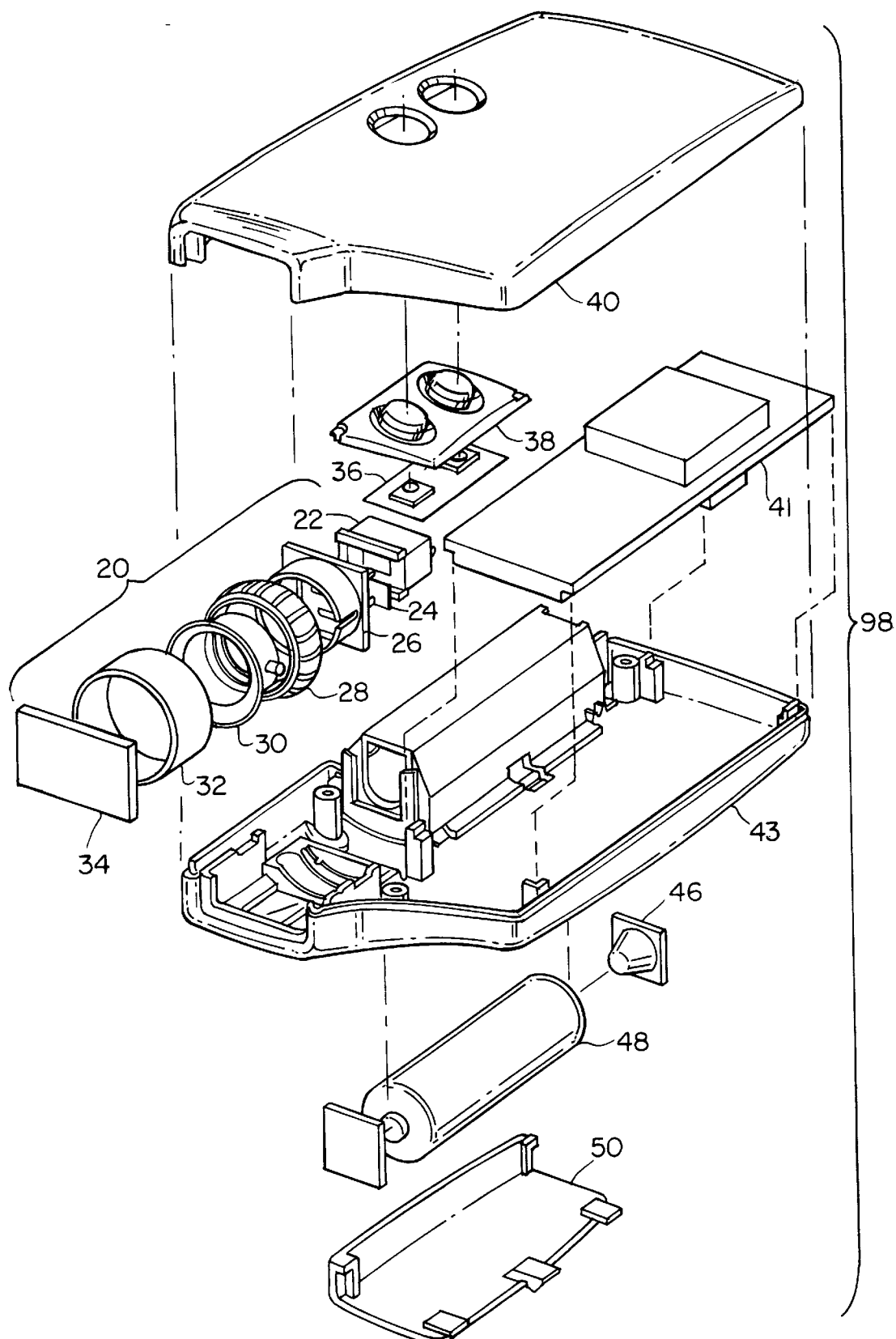
FIGS. 3A and 3B are exploded views of a video display device and pager in accordance with a preferred embodiment of the invention.
Figure 3B:
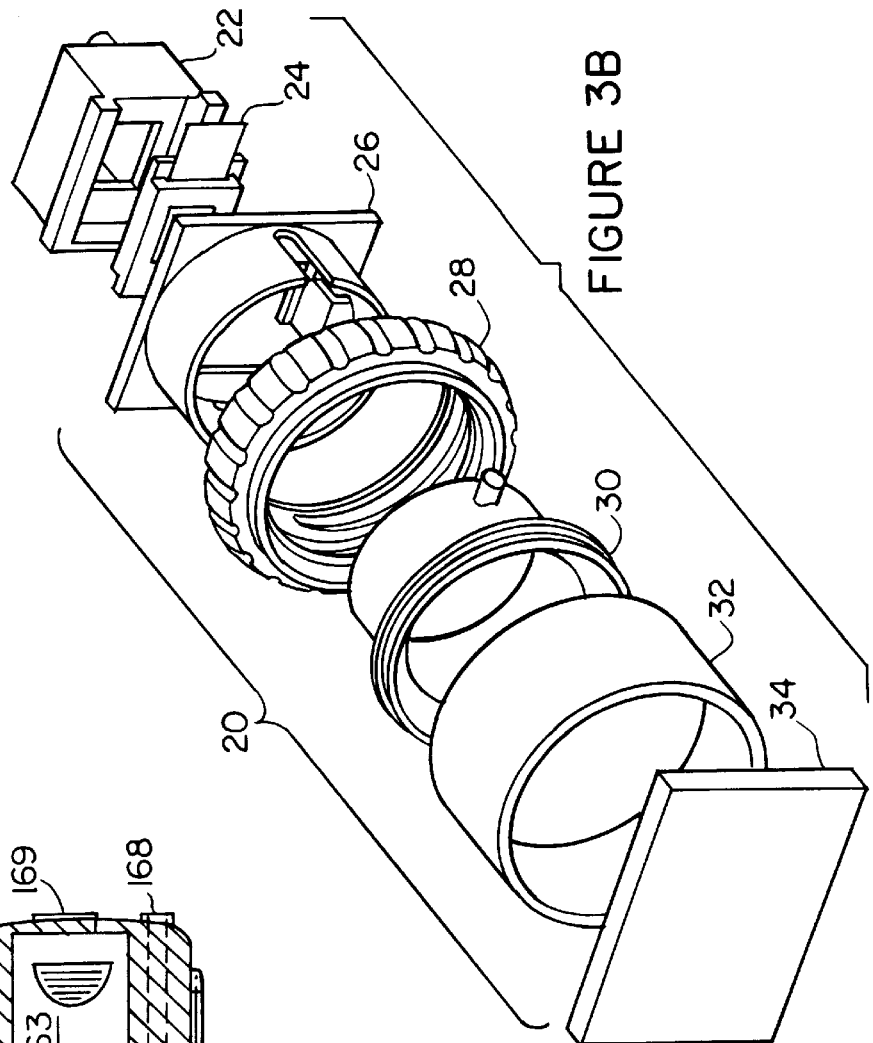

In FIG. 3A, a portable imaging device such as a paper is illustrated having a housing including a top 40 and a bottom 44 with a door 50 for access to a battery 48. The battery 48 provides power to the circuit board 42, the display 24 and the back light 22. The pager can be operated by controls 38 or push buttons accessible through one of the housing surfaces that actuate display functions. An optical system 20 is positioned within the housing and includes a back light 22, preferably an LED back light, a transmission liquid crystal display 24, a focusing mechanism including a knob 28 that the user rotates to move the tunnel 30 relative to the optic slide 26, a lens assembly 32, and a cover glass 34.

Preferred embodiment of hand held display devices are illustrated in connection with FIGS. 4A–4K. FIG. 4A is a perspective view of a preferred embodiment of a pager system 150 having two display viewing areas 152 and 154 within a housing 155. Viewing area 152 has a lens through which the user views a micro display as described previously. A second flat panel display without magnification is viewed by the user at 154. The second display is a simple low resolution numeric and/or alphabetic display to read telephone numbers or scrolled numbers or messages. The micro display magnification can be adjusted at switch 158. The displays are operated by switches 156, 157. As seen in the rear view of FIG. 4B, the rear surface 162 of housing 155 is thicker in that portion containing the micro display and the battery. In the alternative embodiment illustrated in FIG. 4Ba, the rear panel 162 is removed to expose the cavity 159 for the battery and the rear of the display assembly 161. Also shown in this embodiment is a cover 163 which slides to cover or expose a camera including an image sensor 166 and lens 167. The digital imaging sensor 166 can take images electronically stored within a memory within th pager that can be sent by wireless transmitter to a personal computer, a telephone as described herein, or web browser. The images can also be loaded by wire through port 169 onto a personal computer, or alternatively, can be loaded onto a smart card or flash memory card that can be inserted into one or more card slots 168. The port 169 can also be connected directly to a keyboard or touchpad as described herein. The sideview of the housing 155 shown in FIG. 4C illustrates a clip 160 that is used to fasten the device to the clothing of the user. The clip 160 is attached to the bottom surface 164 of the housing 155 as shown in FIG. 4D.

Figure 4E:
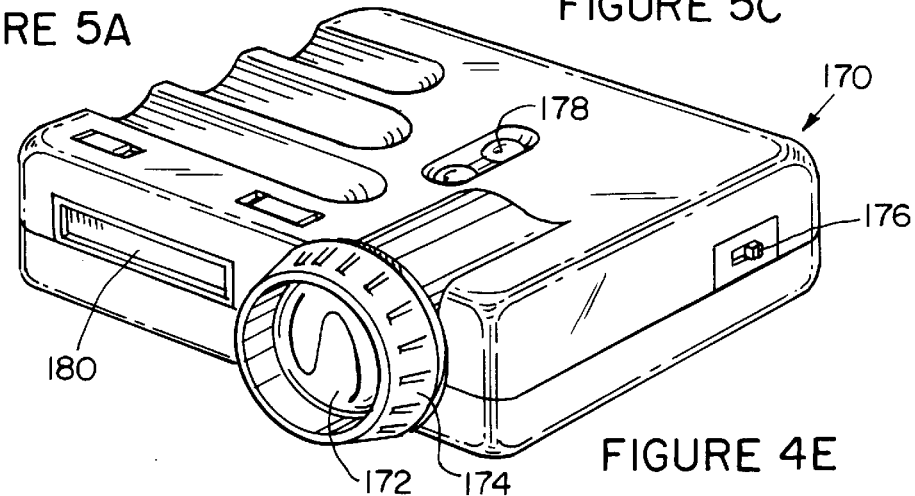
FIGS. 4A–4K are exterior views of hand-held imaging devices in accordance with the invention.
Figure 4B:
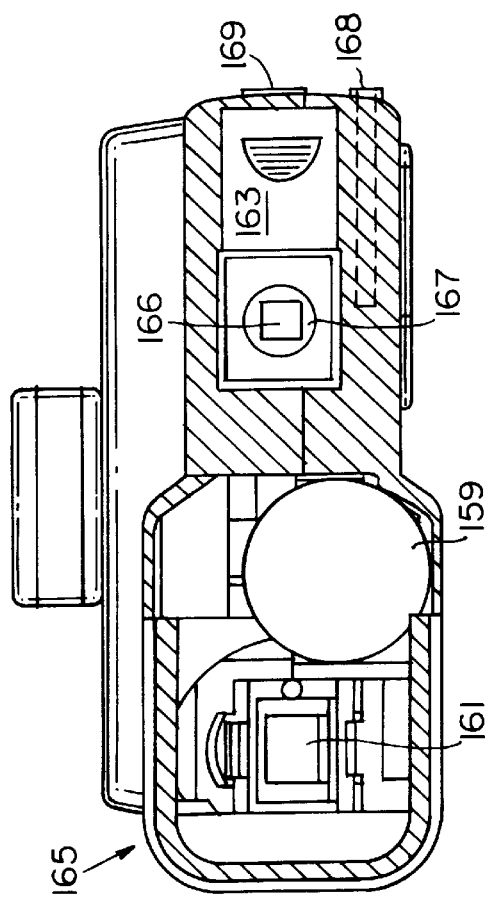
Figure 4A:
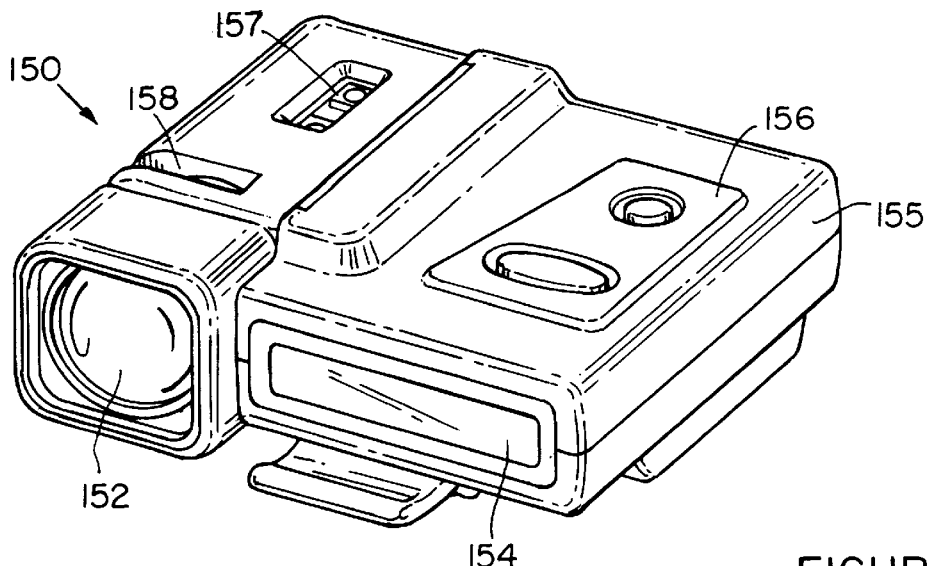
Figure 4C:
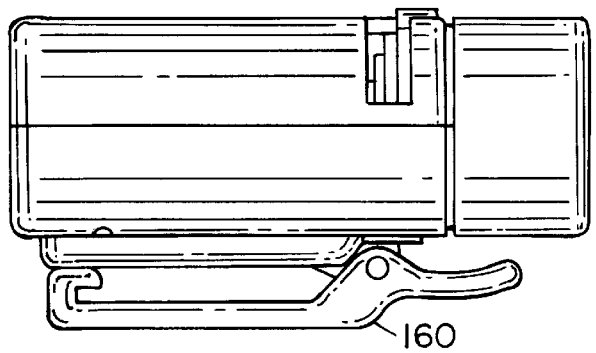
Figure 4B:
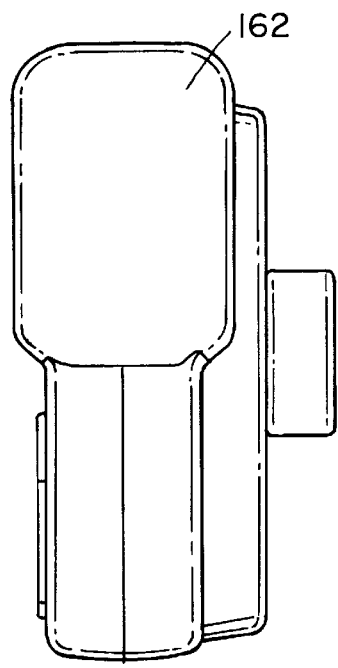
Figure 4D:
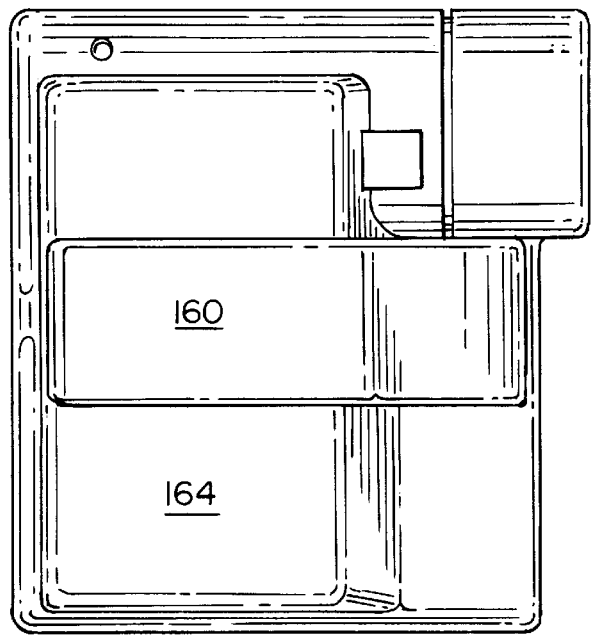
Figure 4G:
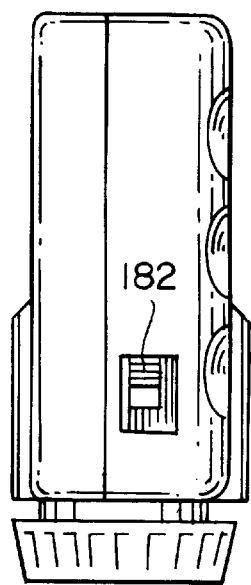
Figure 4F:
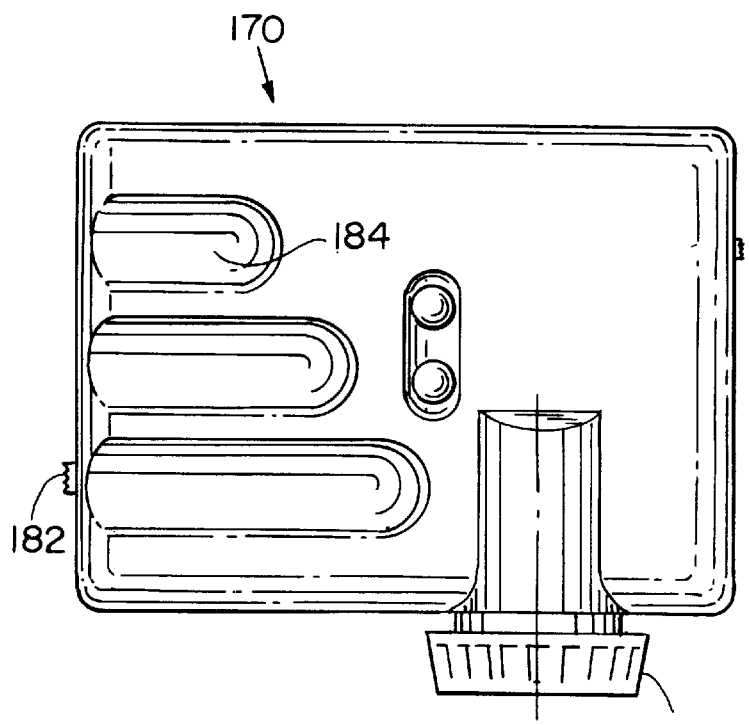

Another preferred embodiment of a hand-held viewing device 170 is illustrated in the perspective view of FIG. 4E. A first display is seen through lens 172 with magnification being adjusted by knob 174. A second display 180 as described above is positioned on the same side of the device 170 as the lens 172 for ease of viewing. The displays are operated by switch 176 and buttons or control elements 178. A top view is illustrated in FIG. 4F showing ridges 184 that accommodate the fingers of the user and the second display switch 182, which is shown more clearly in the side view of FIG. 46.

Figure 4H:
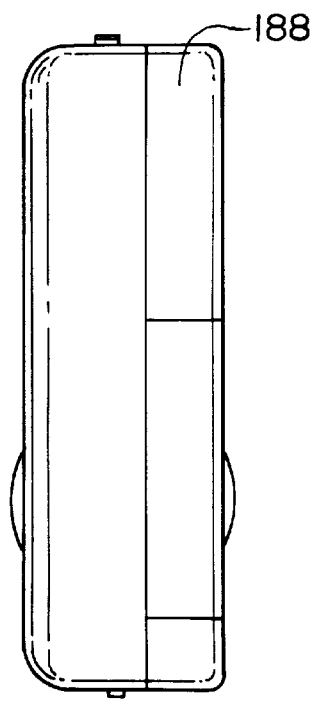
Figure 4I:
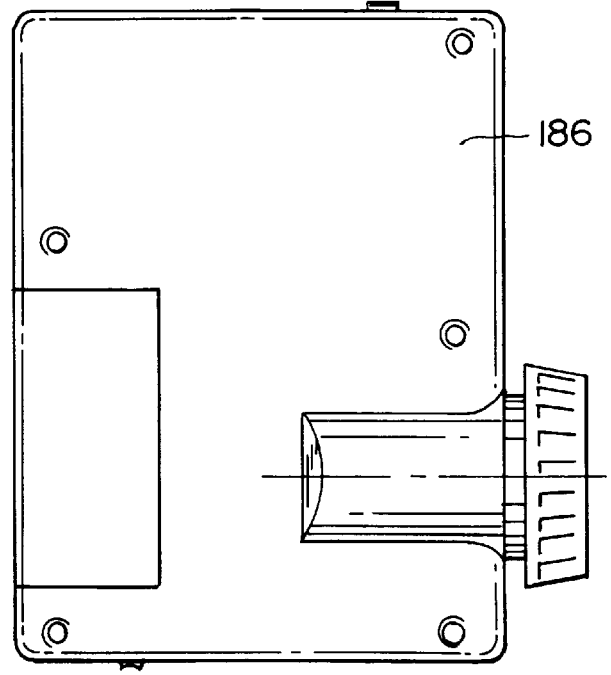
Figure 4J:
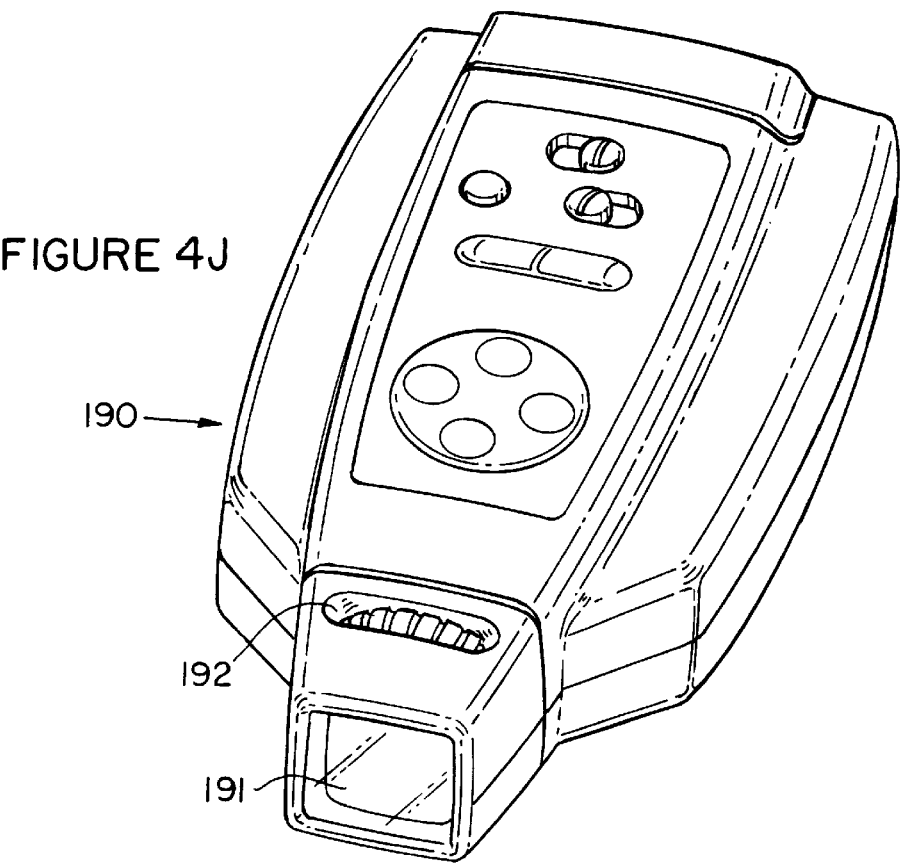
Figure 4K:
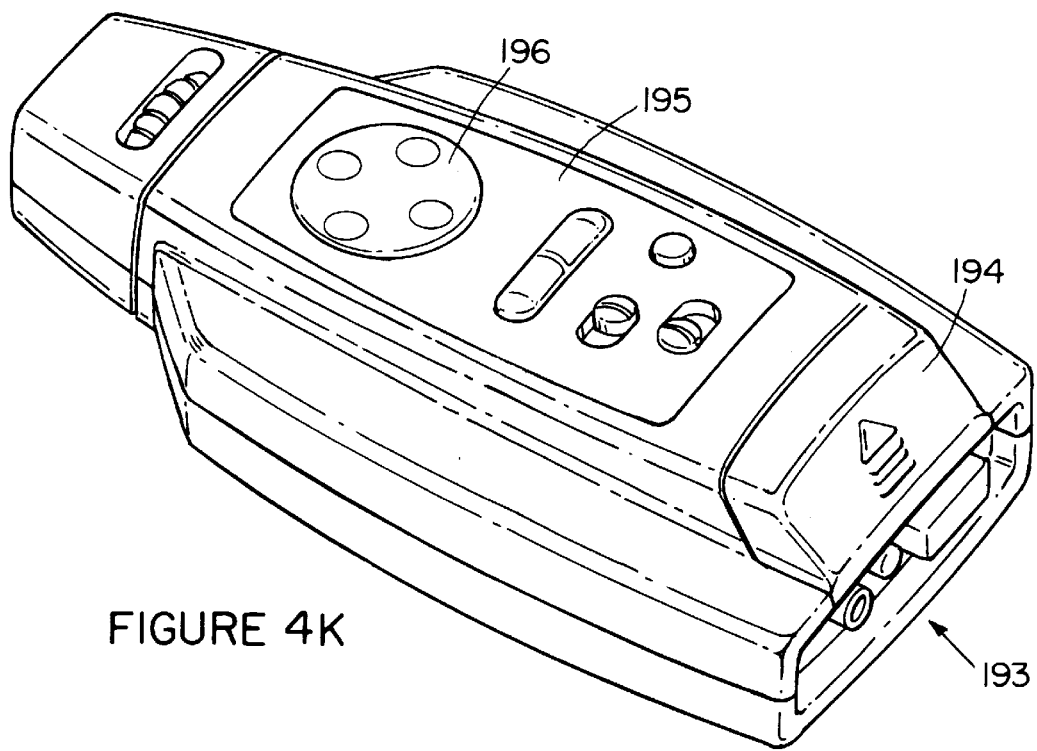

Rear and bottom views of device 170 show rear 188 and bottom 186 sides in FIGS. 4H and 4I, respectively.

Figure 5A:
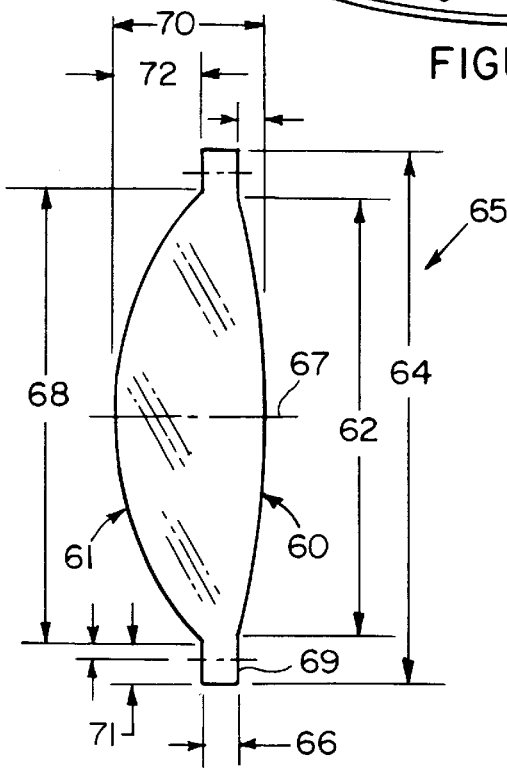
FIG. 5A is a side view of a lens suitable for magnifying a micro display in accordance with the invention.

A lens 65 suitable for magnifying the image of a micro display for viewing by a user is illustrated in the example of FIG. 5A.

For a 0.25 inch diagonal micro display, the outer diameter 64 of the lens can be about 30.4 mm, the thickness 70 of the lens at the optical axis 67 can be about 8 mm, the inner surface 60 that receives light from the display has a curved diameter of about 21.6 mm, and the viewing surface 61 has a diameter of 68 of about 22.4. The peripheral edge 69 used to hold the lens in the assembly can have a thickness 66 of about 2 mm and a radius 71 of about 4 mm. The lens 65 can be made of glass or a plastic material such as acrylic. This particular example of such a lens has a 16 degree field of view and an ERD of 25. The lens assembly can include an automatic focusing system, or a lens system that collapses in size when not in use.

Another preferred embodiment for providing a color display can use a diffraction optical system such as those described in application U.S. Ser. No. 08/565,058 filed on Nov. 30, 1995, the entire contents of which is incorporated herein by reference.

Figure 5B:
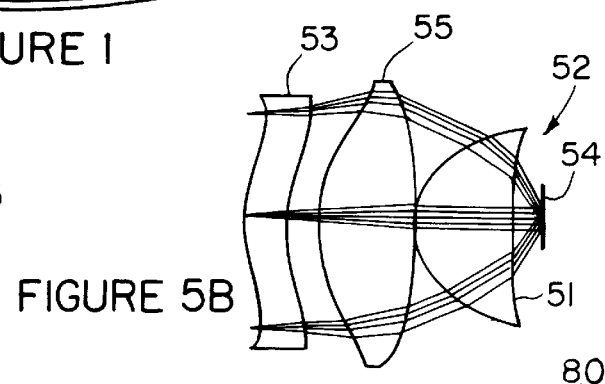
FIG. 5B is a side view of a multi element lens providing an increased field of view.

Another preferred embodiment of a 1.25 inch diameter lens system 52 with a larger field of view is illustrated in FIG. 5B. Three lens elements 51, 53 and 55 enlarge the image on the display 54.

Figure 5C:
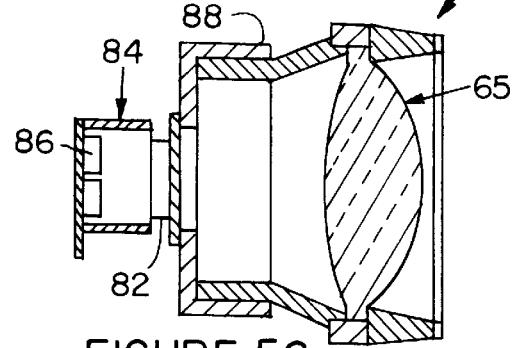
FIG. 5C is a cross-sectional view of a display assembly with a fixed lens.

The lens 65 of FIG. 5A can be used in the alternative display assembly of 80 of FIG. 5C. In this embodiment, the display 82 is positioned between the back light housing 84, containing LED 86, and the lens housing 88 that holds the lens 65 in a fixed position relative to the display 82.

Figure 5D:
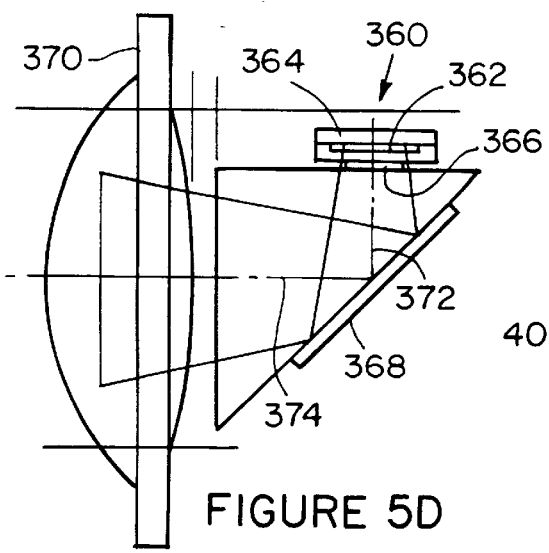
FIG. 5D is a schematic view of an LED backlighting system for a liquid crystal display in accordance with the invention.

A micro display system 360 utilizing a folded optical path is illustrated in connection with FIG. 5D. In this embodiment, an LED array 362, or other light source, illuminates the display within housing 364. The display 366 directs an image along a first optical path 372 that is reflected by mirror 368 along a second other path 374 through the lens 370 as described previously.

Figure 5F:
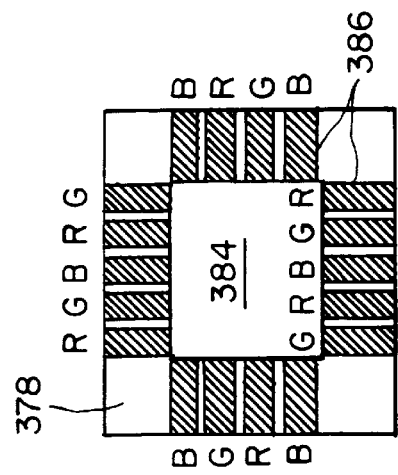
Figure 5G:
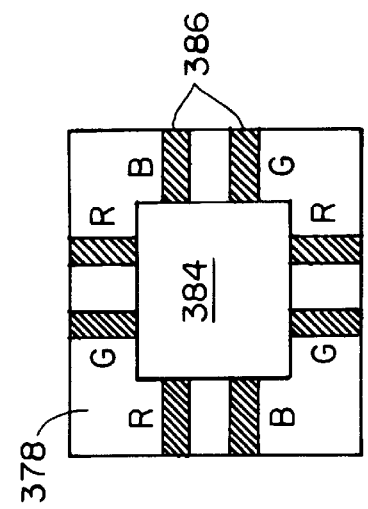
Figure 5E:
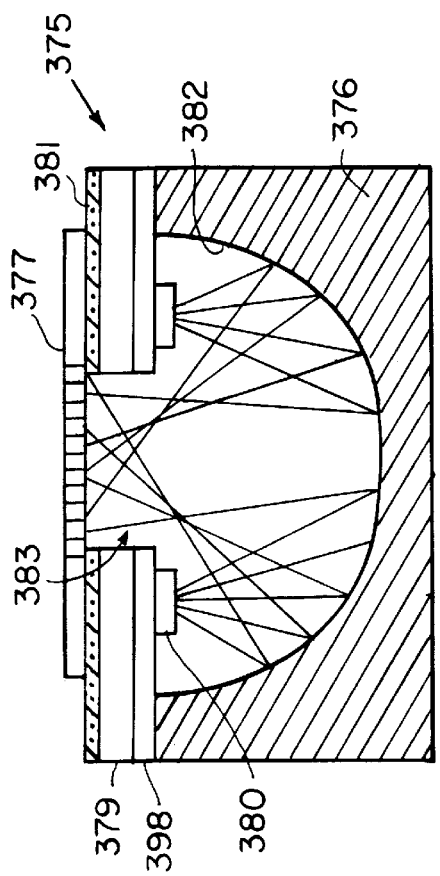

Another preferred embodiment of the back light system is illustrated in FIGS. 5E–5G. The back light 375 includes a reflective bowl 376 with an inner concave surface 382 that reflects light emitted by the LEDs 380 onto the active matrix region of display 377. The LEDs 380 are mounted on a circuit board 378 that is electrically connected to the timing circuit described previously. The system 375 can also include a heat sink 379 for applications requiring thermal isolation of the display circuit from the back light circuit. The element 379 can be a silicon carbide, silicon, or aluminum nickel plate or wafer. The element 379 can be a silicon carbide, silicon, or aluminum nickel plate or wafer. The element 379 can be insulated from the display 377 with layer 381 such as an adhesive. The circuit board 378, element 379 and optional layer 381 have openings that are aligned to provide an aperture 383.

A preferred embodiment of printed circuit board 378 on which the LEDs are mounted is shown in FIG. 5F. In this embodiment 18 blue, green and red LEDs 386 are positioned around opening 384. Another preferred embodiment utilizing 8 LEDs 386 is illustrated in FIG. 5G. Fewer LEDs allow the circuit to operate at lower power. Additionally, for color sequential operation, where frame rates are relatively high, the LEDs are driven at higher rates to increase brightness.

Figure 5H:
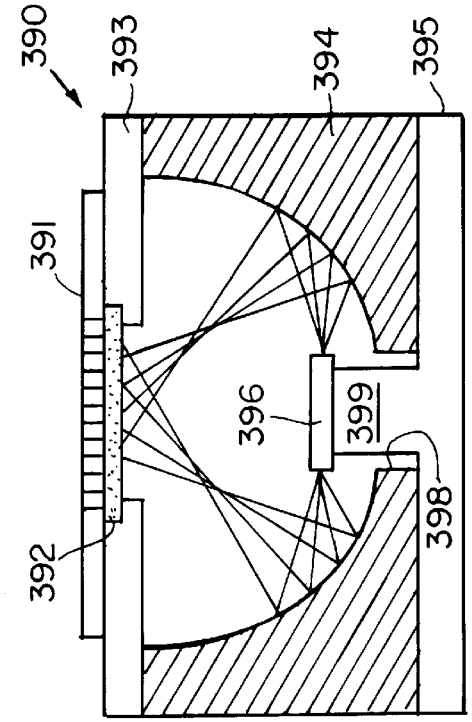

Another preferred embodiment of a back light is illustrated by the system 390 of FIG. 5H. In the embodiment the circuit board 395 on which the LEDs 396 are mounted is positioned underneath the reflective bowl 394 with the LEDs 396 mounted on a post 399 extending through opening 398. Light is diffusely reflected by bowl through diffuser 392 onto display 391.

FIG. 5I illustrates a back light housing 84 with an aperture on one side through which light exits the housing and is directed through the display. The housing has a base and sides 135 in the folded opened view of FIG. 5J. The display is mounted onto plate 393. The display 391 can be connected to external connectors 137 by flexible circuit boards 136 which wrap around the sides of the bowl. The back light housing preferably has a volume of less than 0.5 cubic inches. The display module has a volume of less than 2 cubic inches and preferably less than 20 cm$^3$.

A system having a volume less than 15 cm$^3$ is illustrated in connection with FIGS. 5K–5O. FIG. 5K is a perspective view of an assembled display module 470. The exploded view of FIG. 5L shows the elements of system 470 in detail. The back light reflector is positioned in back light housing 473 which can be adhered directly onto the display 475 with an epoxy adhesive or with an optional clip 474. The display is held by a display holder 476 which can also serve to define the visual border for the active area of the display as seen by the user through transparent window 482. The holder 476 is attached to holding panel 477 which retains ring 478 within the proximal end of housing element 471. The ring can be manually or electrically actuated to rotate and thereby translate optics holder 472 along the optical axis 486. A pin 479 can be used to couple the holder 472 to internal helical thread of ring 478. The lens 480, an optional second lens within the distal end of holder 472, a color correction element 481 and window 482 can all be held within holder 472 which moves relative to the display to focus the image thereon.

Figure 13A:
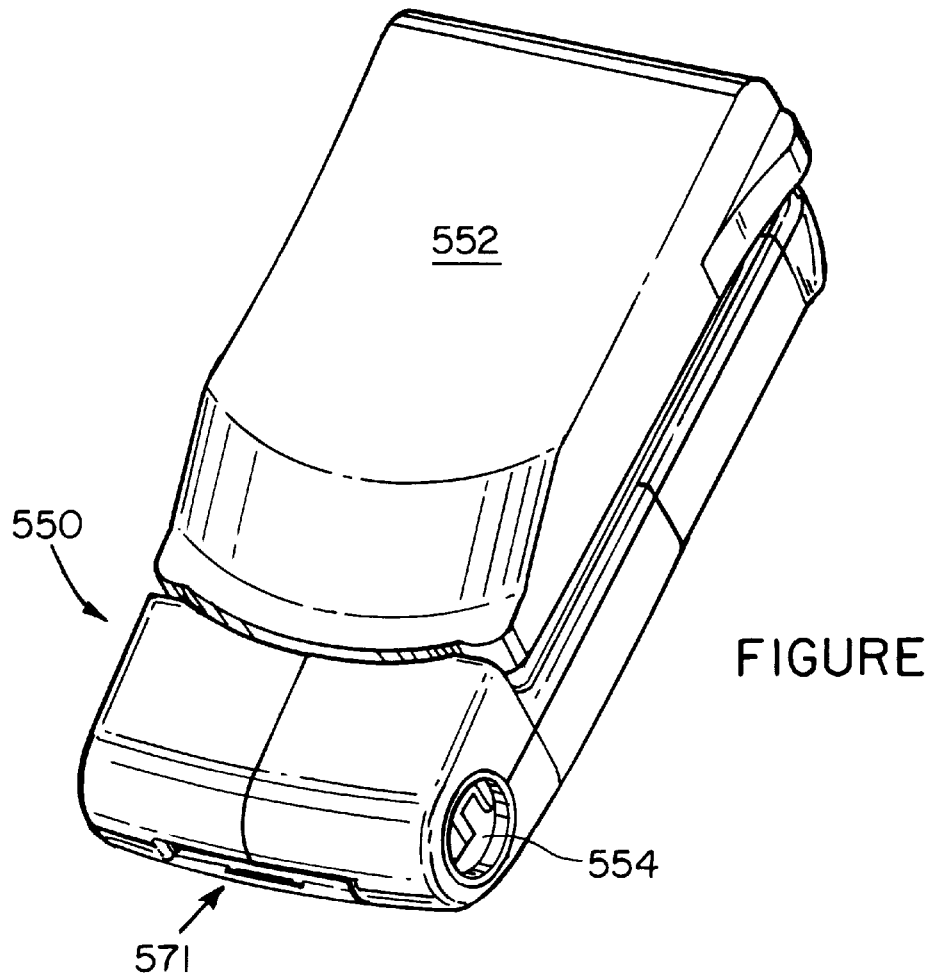
FIGS. 13A–13K illustrate other preferred embodiments of the invention including a display docking system for a cellular telephone.
Figure 13B:
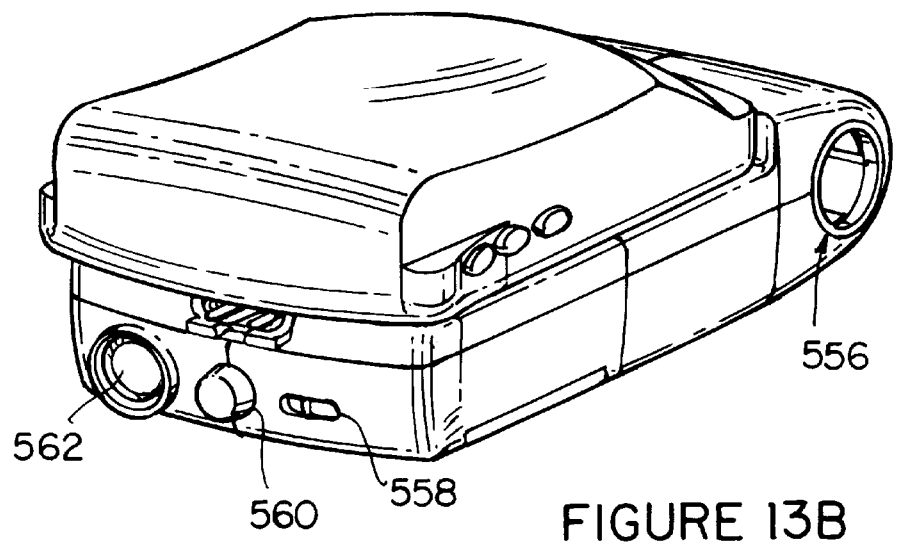
Figure 13C:
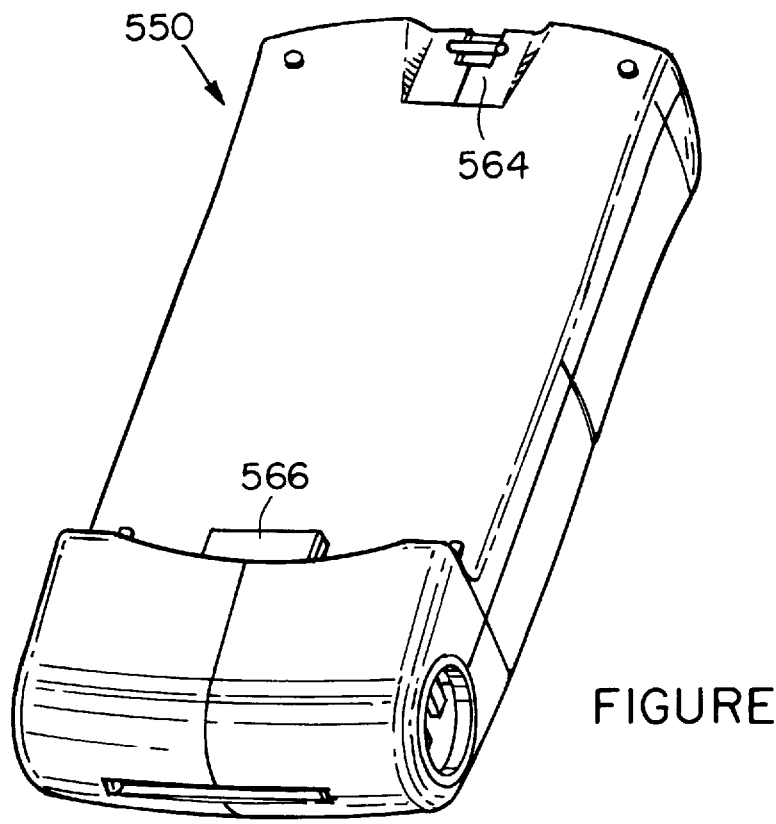
Figure 13D:
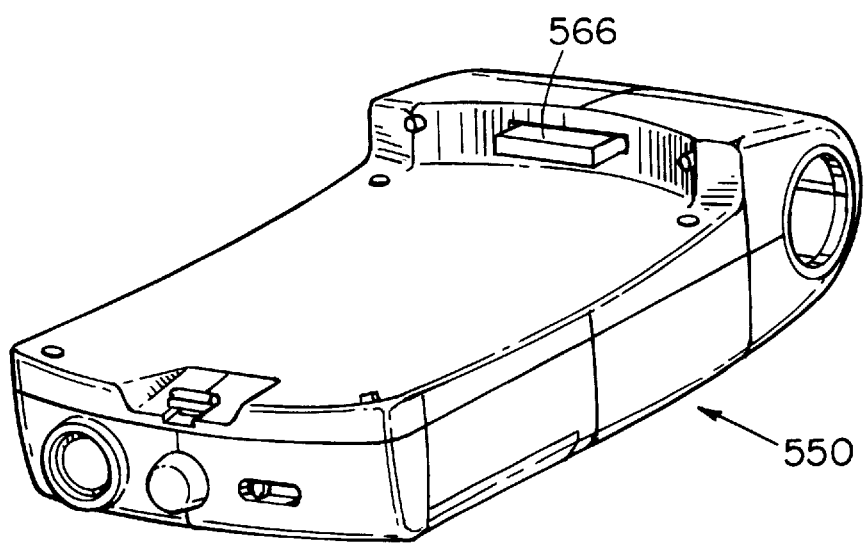
Figure 13E:
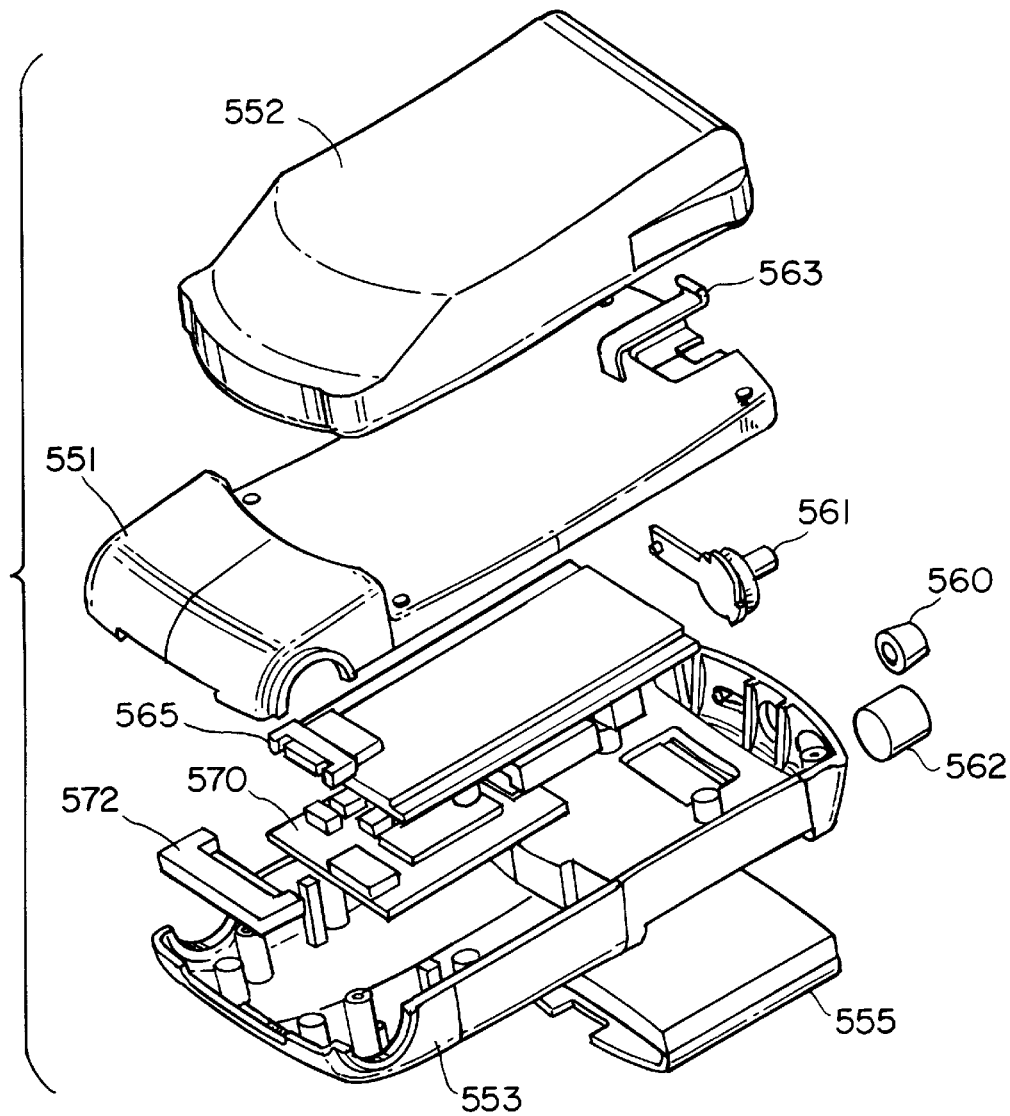
Figure 13F:
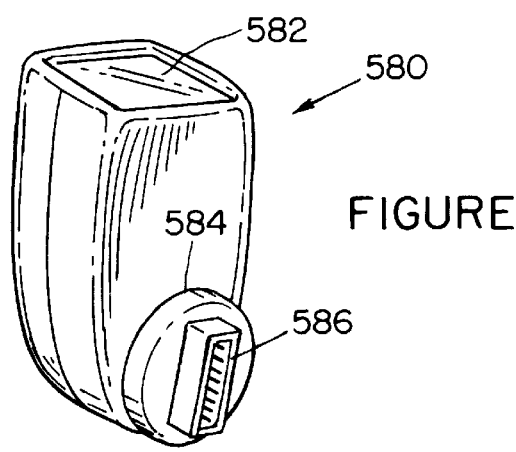

Element 470 fits snugly within an external housing such as that shown in FIG. 13F, or within the other device housings as described herein.

An exploded view of a preferred embodiment of the back light relative to the display 475 is shown in FIG. 5M. The display circuit and LED back light are mounted on circuit board 483. Preferably, two or three LEDs are used to provide two or three colors, respectively. Between the back light housing 473 and the display 475, a brightness enhancement film 484, such as the "BEF" film available from 3M Corporation can optionally be used along with a diffuser 485. As seen in FIGS. 5N and 5O, the circuit board 483 mounted on a first side of housing 473 and the back light active area is defined by the diffuser 485 on a second side of the housing 473.

Lighting System For Reflective Liquid Crystal Display

Figure 6:
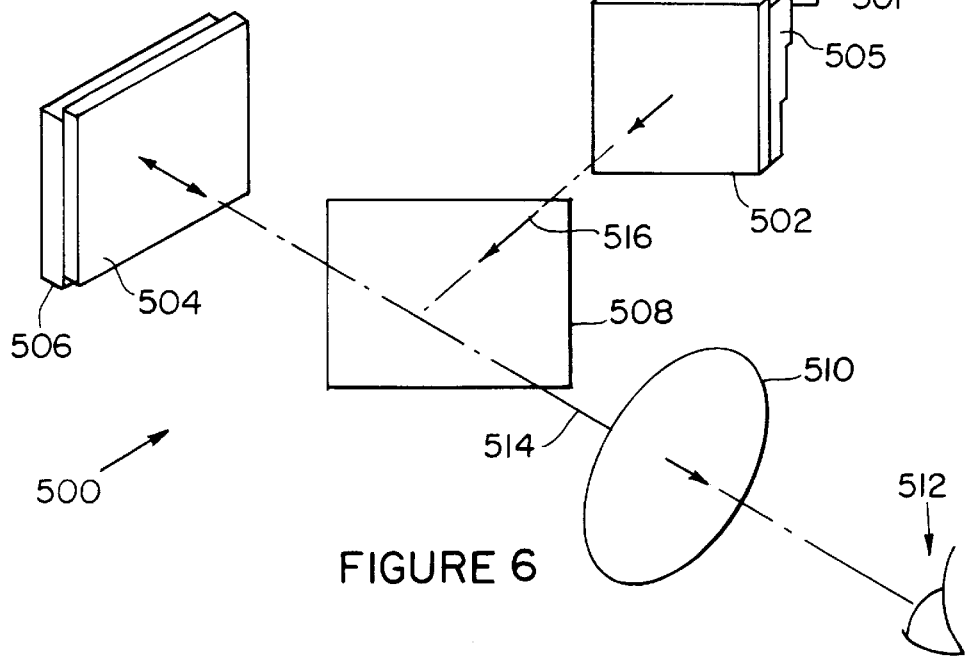
FIG. 6 is an optical diagram of a lighting system for a reflective liquid crystal display.

The details of a lighting system 102 for a reflective micro, display of the invention will now be described in connection with FIG. 6. Illumination for a reflective LCD system 500 based upon the active matrix circuit described heretofore in connection with FIG. 2 is provided by an array of Light Emitting Diodes (LED(s)) 501 disposed adjacent light-diffuser 505 which uniformly transmits the source LED light to a linear polarizer 502.

The linear polarized light 516 from polarizer 502 is passed to a polarizing beamsplitter or prism 508 which is reflected by beam beamsplitter 508 and is incident on specularly reflective LCD 506 to provide the requisite illumination. The light incident on LCD 506 is selectively reflected to generate an image that is rotated by ¼ wave plate 504 so that it is transmitted through splitter 508 and through lens 510 to the observer 512.

Figure 7A:
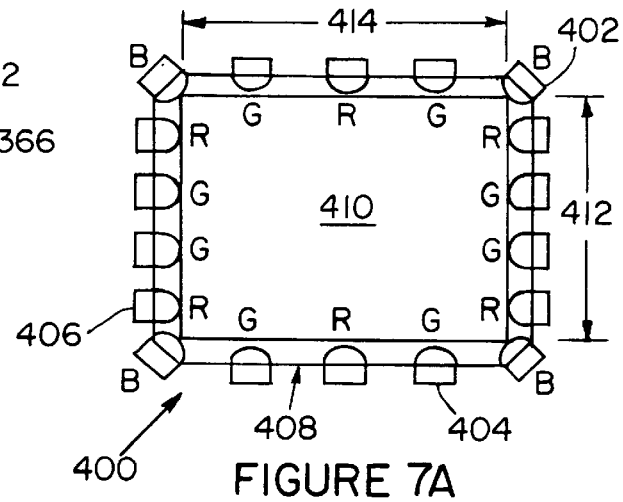
FIGS. 7A–7G illustrate preferred LED backlighting systems for a transmission type display.
Figure 7B:
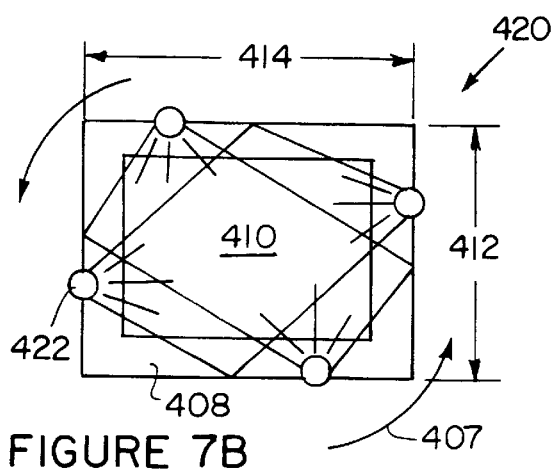
Figure 7C:
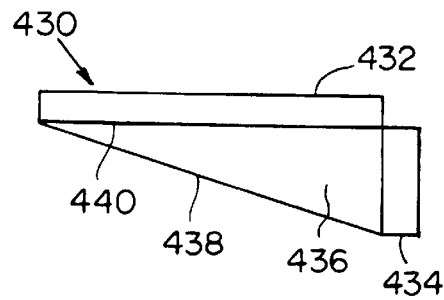

Shown in FIGS. 7A–7C are preferred embodiments of an LED backlighting system utilizing a diffuser for a transmission display in accordance with the invention. In a first embodiment of an LED illumination system 400 shown in FIG. 7A, blue (B)402, green (G)404, and red (R)406 LEDs are optically coupled to a flat diffuser element 408 around the periphery of an illumination area of 410 that is positioned adjacent the display active or viewing area. For a display having a diagonal of 6.35 mm, the side of 412 of the viewing area 410 can be about 3.81 mm in size, and the length 414 of the viewing area can be about 5.08 mm. The diffuser 408 can be a plastic material such as acrylic and the back of the diffuser can be coated with a reflective material to improve light output of the device.

In another embodiment of an LED display illumination system 420 as shown in FIG. 7B, the LED's 422 are coupled in pattern to the edge of the diffuser 408. The LEDs 422 are actuated in sequence 407 to provide color sequential operation with fewer LEDs.

In the system 430 of FIG. 7C, the display 432 is coupled to an angled diffuser 436 at interface 440. The linear array of LEDs 434 are coupled at one end of the diffuser and a reflective back surface 438 is designed to evenly distribute light as it is directed through the interface.

Figure 7D:
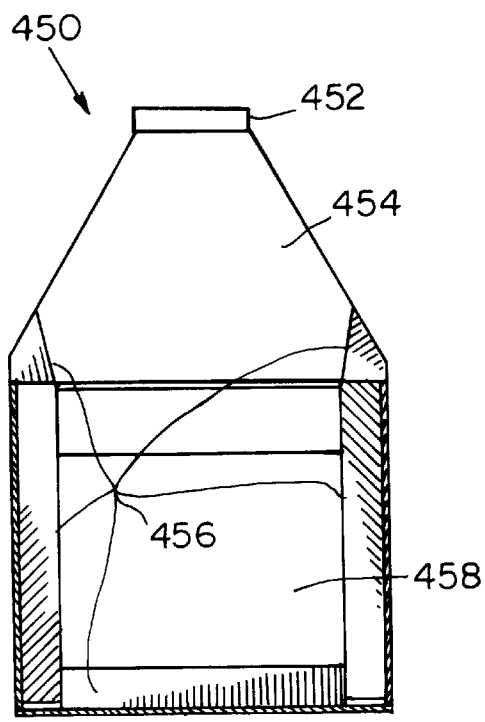
Figure 7E:
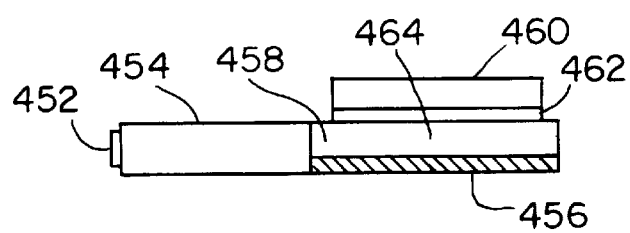

An enlarged top view of a diffuser and light pipe system 450 for back light illumination of a display is illustrated in FIG. 7D. The light source 452 such as three light emitting diodes is coupled to an expanding light pipe 454. The light pipe 454 directs the light into the side of a reflecting element or diffuser 458, as illustrated in FIG. 7E. A BEF film referenced above can be used between the light pipe 454 and element and reflective element 458. The sides and bottoms of the elements can be beveled at 456 to further reduce the volume occupied by this portion of the optical system. A reflective surface or mirror 464 serves to reflect light towards diffuser 462 and through the display 460.

Figure 7G:
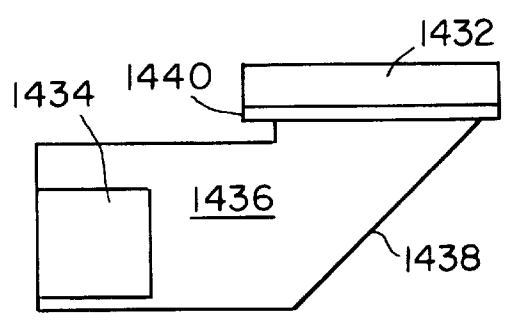
Figure 7F:
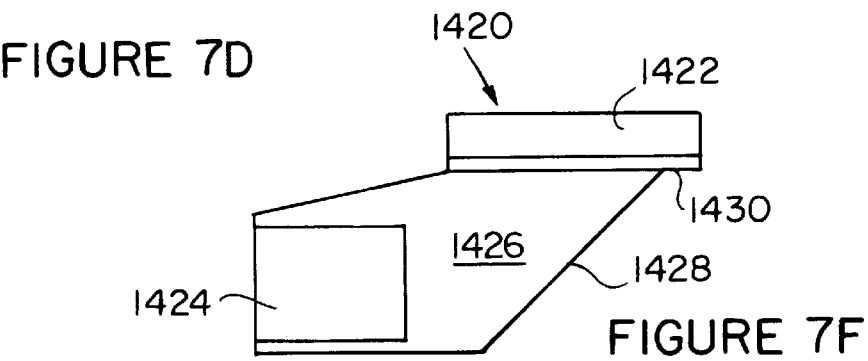

In another embodiment of an LED display illumination system 1420 as shown in FIG. 7F, the display 1422 is coupled to an angled diffuser 1426 at interface 1430. The linear array of LEDs are inserted into slot 1424 to couple light into one end of the diffuser and a reflective back surface 1428 is designed to evenly distribute light as it is directed through the interface. The increase thickness and shortness of the body of the angled diffuser 1426 increases the coupling efficiency of the element 1426 to display and thus increases the foot-lamberts (fL) of light produced per amount of power.

In another embodiment of an LED display illumination system as shown in FIG. 7G, the display 1432 is coupled to an angled diffuser 1436 at interface 1440. The linear array of LEDs are inserted at slot 1434 at one end of the diffuser and a reflective back surface 1438 is designed to evenly distribute light as it is directed through the interface. Similarly to the previous embodiment, the increased thickness and shortness of the body of the angled diffuser 1436 increases the coupling efficiency of the backlight system.

Figure 8:
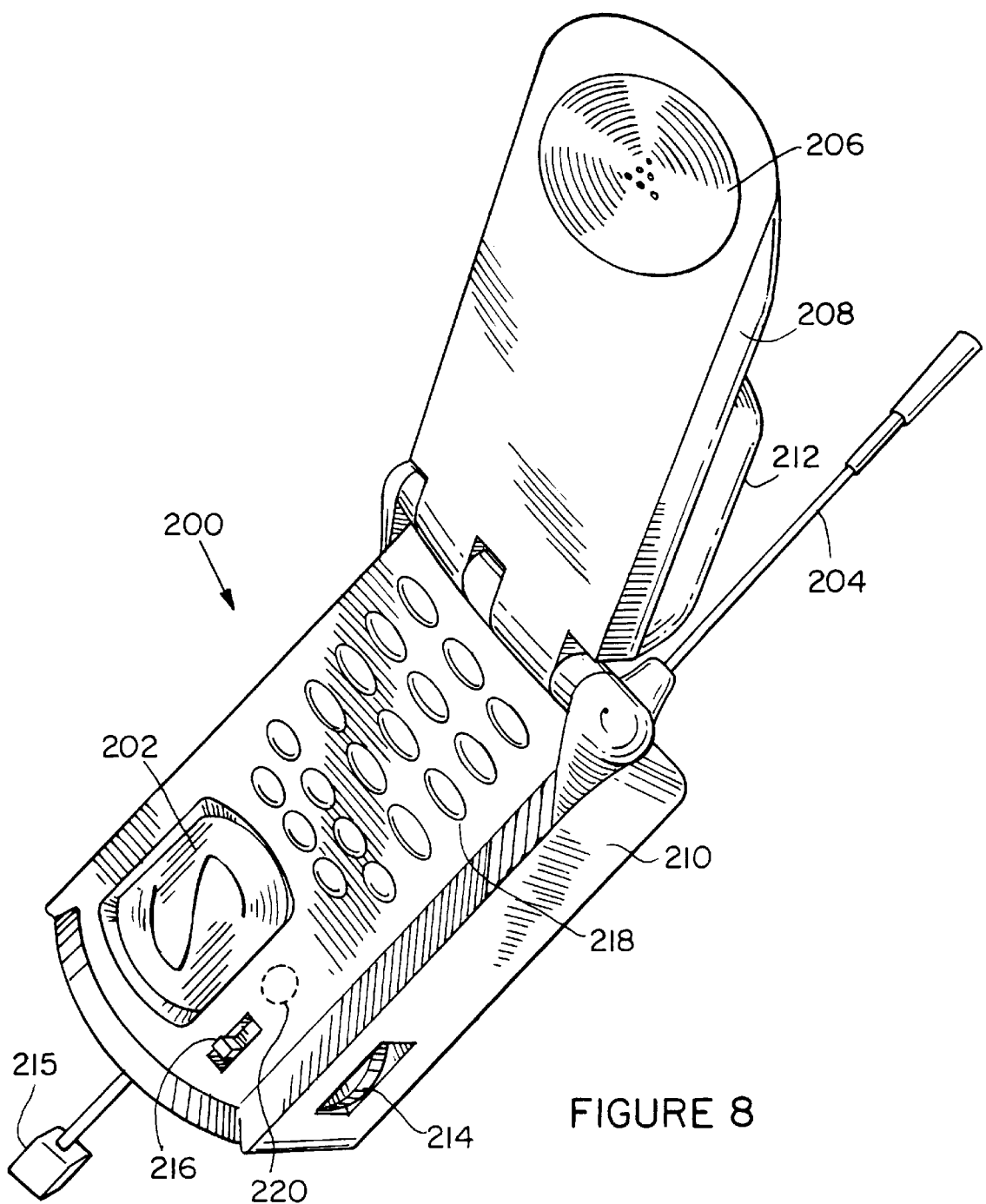
FIG. 8 is a perspective view of a preferred embodiment mobile telephone having a display device in accordance with the invention.

Illustrated in connection with FIG. 8 is a cellular telephone 200 having a magnified micro display in accordance with the invention. The display can be included in a base portion 210 of a "flip-phone" along with keypad 218 and microphone 220. The speaker 206, or the display or a second display as well as additional circuitry can be included in second portion 208 that rotates relative to the base 210. An antenna 204 can telescope out of the base for improved wireless reception. A battery is housed at 212. A lens 202 can be viewed by the user while holding the speaker to his or her ear thus enabling both viewing and voice transmission at the same time. The display can be turned on or off at switch 216 to save battery life when the display is not in use. The magnification can be adjusted at knob 214.

Additionally, a small camera 215 such as a charge coupled device (CCD) or other solid state imaging sensor can be mounted on a telescoping element to provide an imaging or video-conferencing capability. The camera can be pivoted so that the user can point and hold the camera in any selected direction. The image generated can be seen on the display and/or transmitted to a remote location, selected buttons or touch pad keys 218 can be used as a mouse control for the display.

Figure 8B:
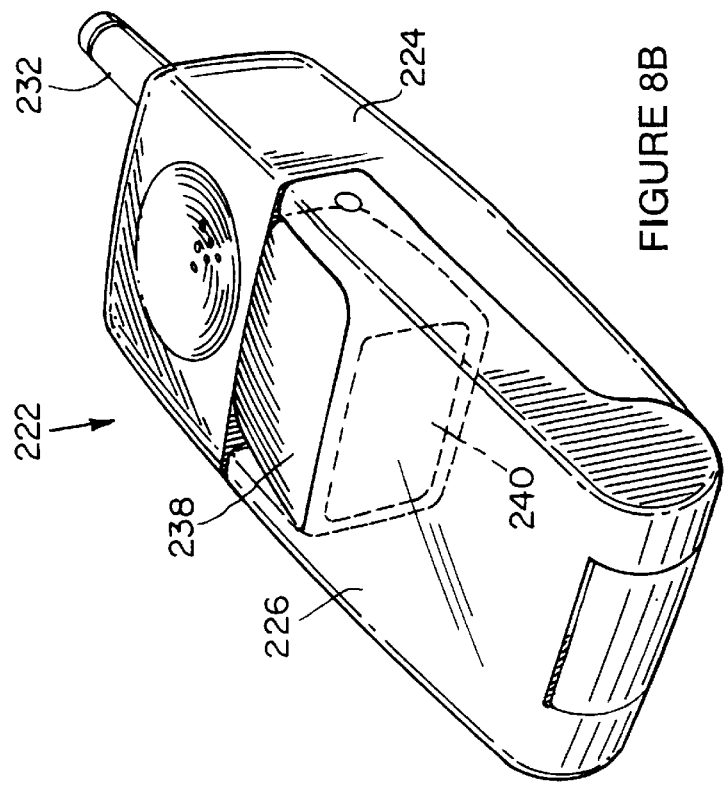
FIGS. 8A–8B illustrate an alternative embodiment of a mobile telephone having a display device in accordance with the invention.
Figure 8A:
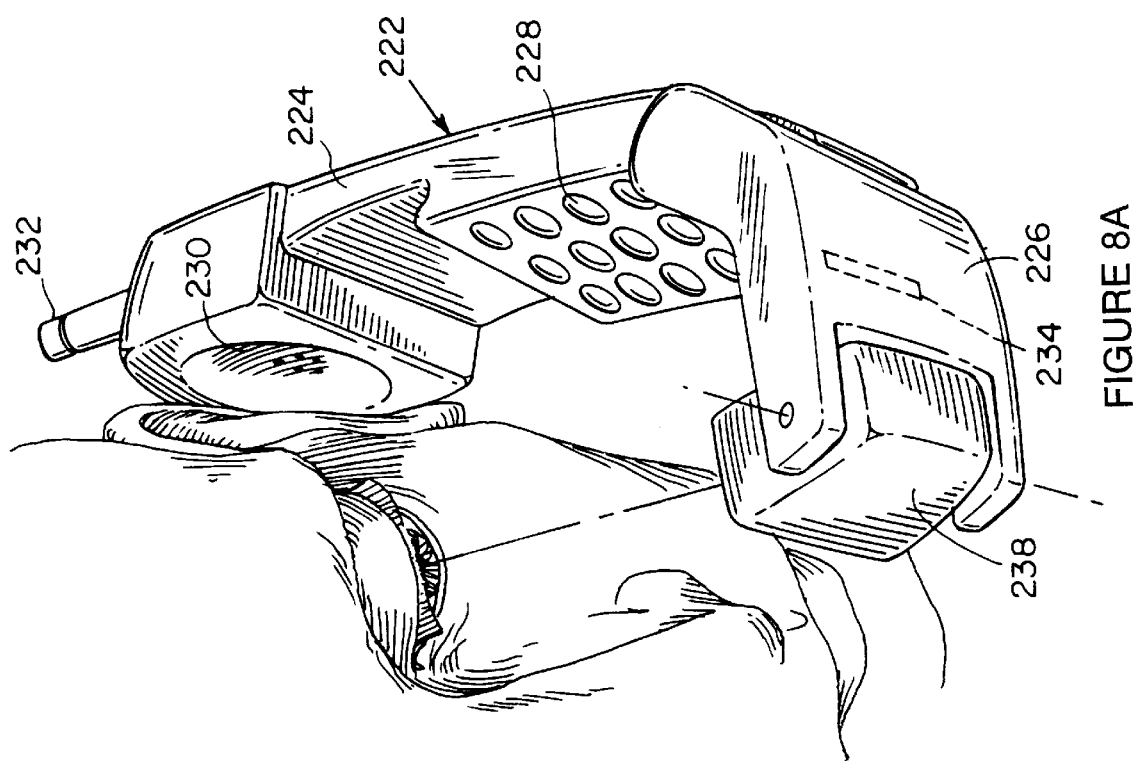

Referring to FIGS. 8A and 8B, an alternative embodiment of a cellular telephone 222 having a magnified micro display in accordance with the invention is shown in open and closed perspective views respectively. The cellular "flip-phone" 222 has a base portion 224 and a flip portion 226. The base portion 224 has a keypad 228 a speaker 230, and an antenna 232. The base portion 224 may include an alphanumeric display for seeing the telephone number as it is being entered. The flip portion 226 pivots from the base portion 224 and includes a microphone 234, shown in hidden line in FIG. 8A. The micro display is located in a module 238 which rotates relative to the flip portion 226. The module or pod 238 is flush with the flip portion 226 when in a stored position, such that the viewing port 240 is protected by the flip portion 226, as seen in FIG. 8B. When the "flip-phone" 222 is in use, the pod 238 is rotated generally 90 degrees from the stored closed position, such that a viewing port 240 is exposed. and in the user's line of sight. The flip portion 226 spaces the micro display the proper distance from the base portion 224 to facility viewing.

Figure 8C:
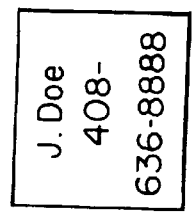
FIGS. 8C–8F illustrate the changing of the resolution of the display from high resolutions to low resolutions.
Figure 8D:
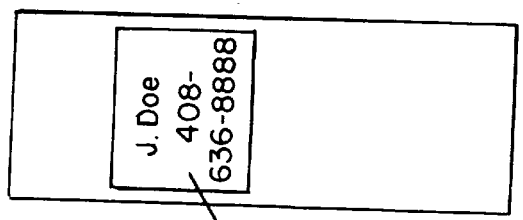
Figure 8E:
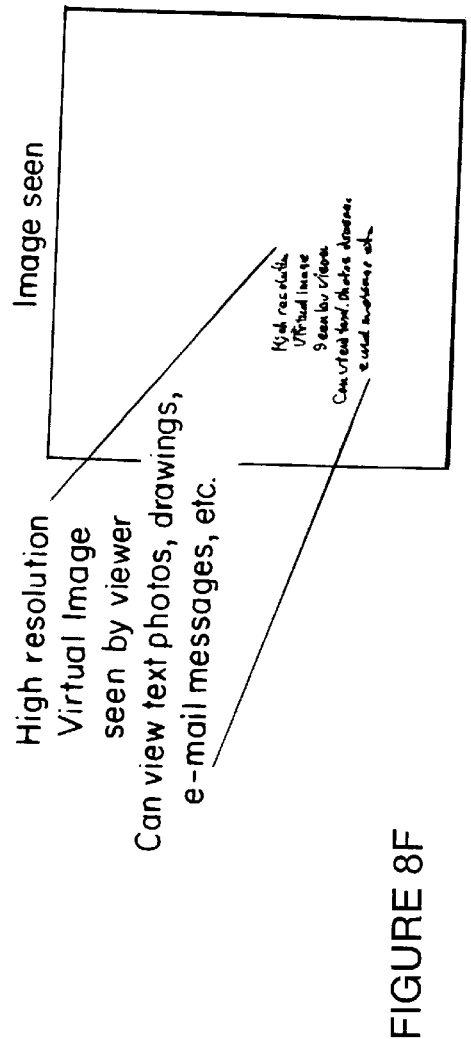
Figure 8F:
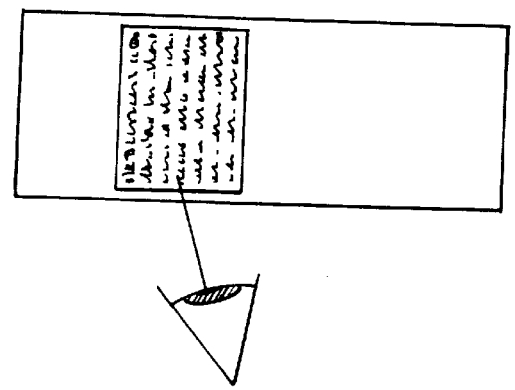

Alternatively to the base portion 224 having an alphanumeric display, the telephone 222 can have software which can vary the image size on the micro display. The software can create low resolution image with large characters, such as illustrated in FIG. 8C. This resolution is primarily used when the micro display is viewed from 6 to 18 inches. When the user is inputting the telephone number on the keypad 228, the user's eye is typically that distance from the micro display as represented in FIG. 8D. The software can create high resolution small characters, and typically does, such as represented in FIG. 8E. This resolution is primarily implemented when the user's eye is 1 to 6 inches from the micro display, as represented in FIG. 8F, such as when the user is speaking on the phone. The software can automatically switch after the telephone number is dialed or a button can be pushed.

Alternatively, the display can be formed in a modular component that snaps onto the base portion of a standard telephone and couples to a display circuit port in the base section of the telephone. This is illustrated in the preferred embodiments of FIGS. 9A–9J.

Figures 9C, 9D:
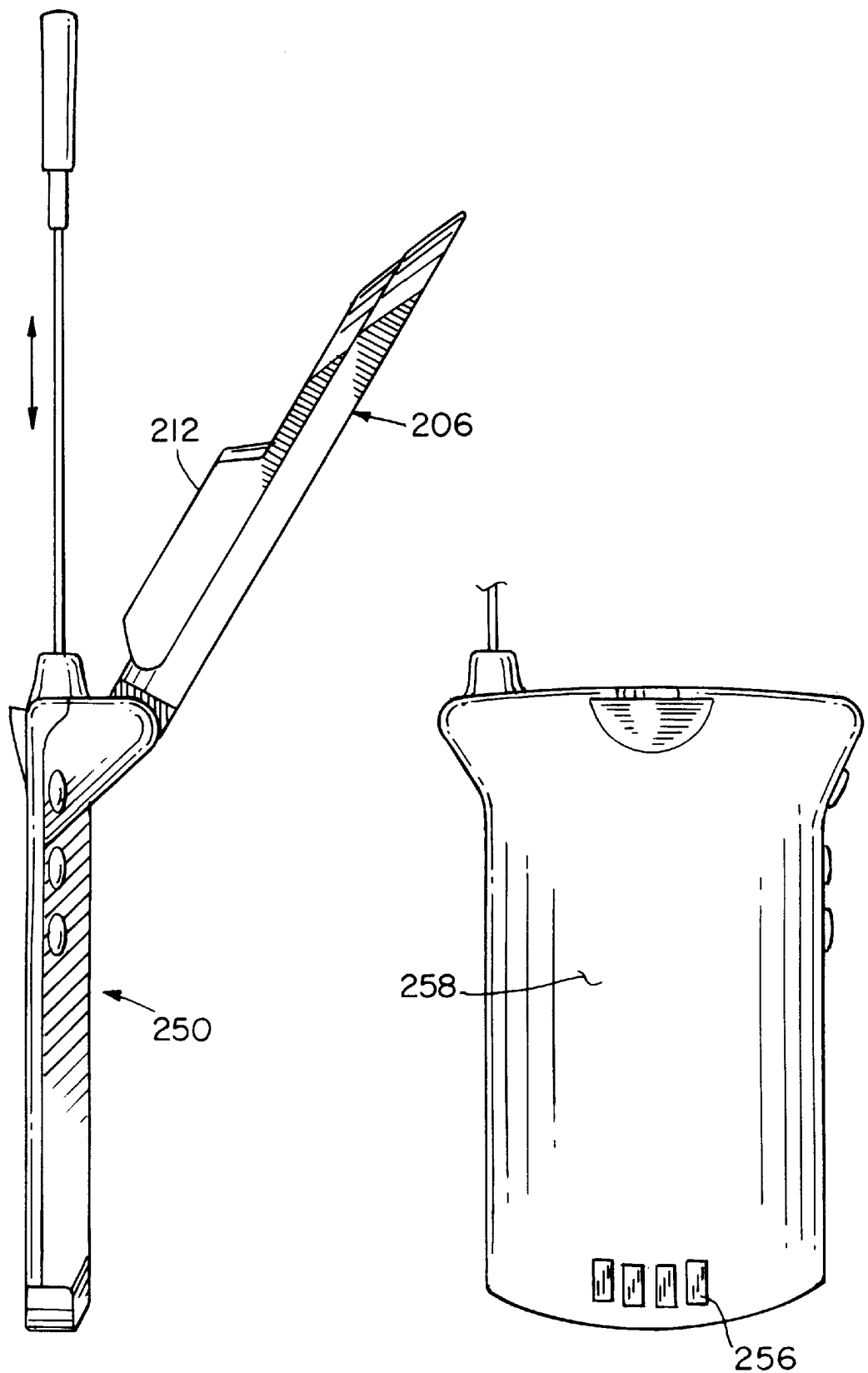

FIG. 9A shows a telephone 250 having standard features such as a display 252 and a port 254 for external communications. The modular display unit 260 shown in FIG. 9B is configured to dock with the telephone 250 wherein the connector 268 is inserted into port 254 and latch 264 connects to the top of the base section of telephone 250 thereby connecting the micro display within display sub-housing 262 to the receiver within the telephone 250. The subhousing 262 pivots relative to main housing 270 to allow viewing of the display through lens 267 during use of the telephone 250. In this embodiment, telescoping camera 215 can extend from subhousing 262. Base 270 includes a second battery, drive electronics for the LED backlit LCD display on activation switch 266. FIG. 9C is a sideview of telephone 250 showing the battery housing 250 on the opposite side from the speaker 206. Back panel 258 is shown in the rear view of FIG. 9D along with second battery contacts 256 exposed thereon. When the telephone 250 is docked in unit 260, the surface 258 abuts surface 265 and connectors 264 are positioned against contacts 256 such that the telephone can be powered by the second battery in housing 270.

Figure 9E:
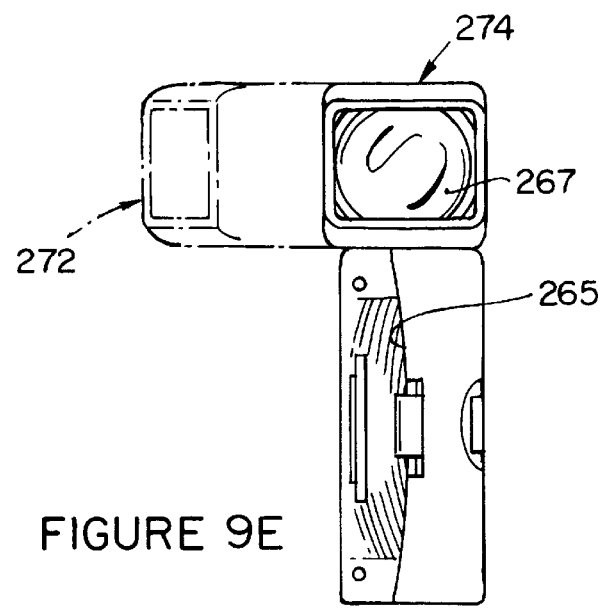
Figure 9F:
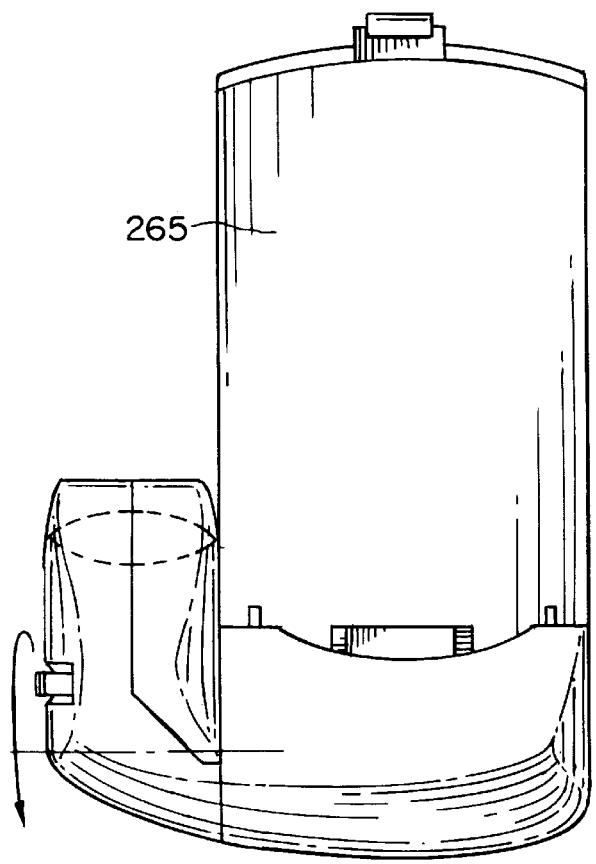
Figure 9G:
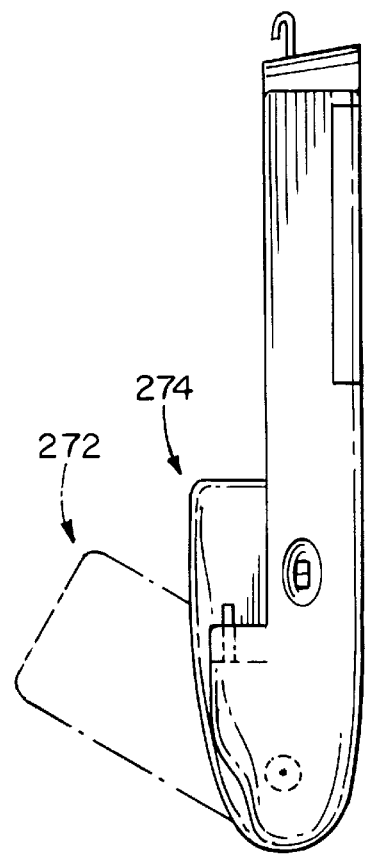
Figure 9H:
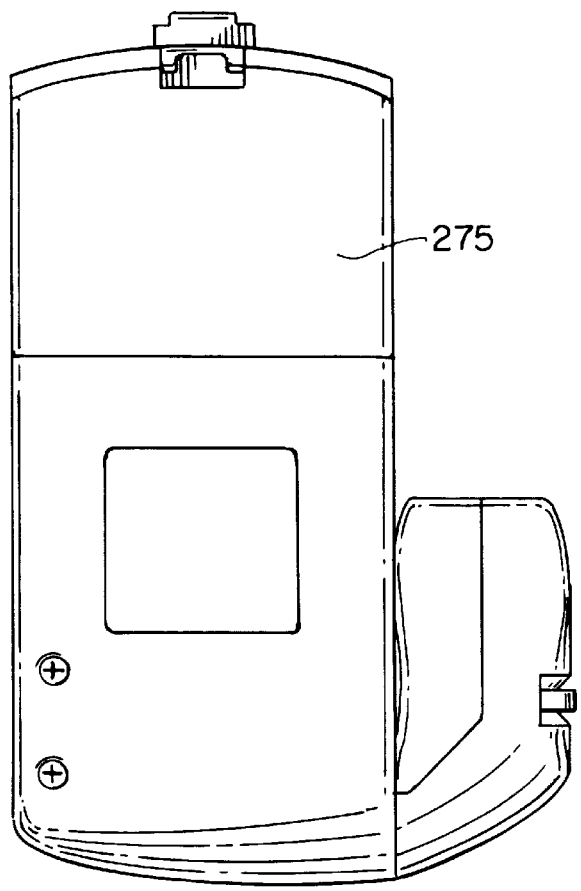
Figure 9I:
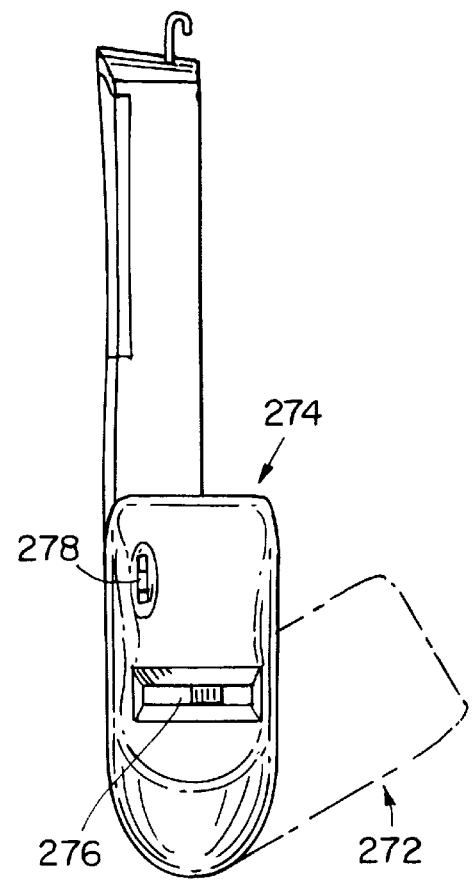

FIGS. 9E, 9F and 9G illustrate top front and side views of unit 260 where the subhousing is shown in both its storage position 274 and its viewing position 272. FIGS. 9H and 9I show back and second side views of unit 260 and illustrate battery access panel 275, focus know 276 and control buttons 278 that are exposed on the side of housing 270 when the sub-housing 262 is rotated to the viewing position 272.

Figure 9J:
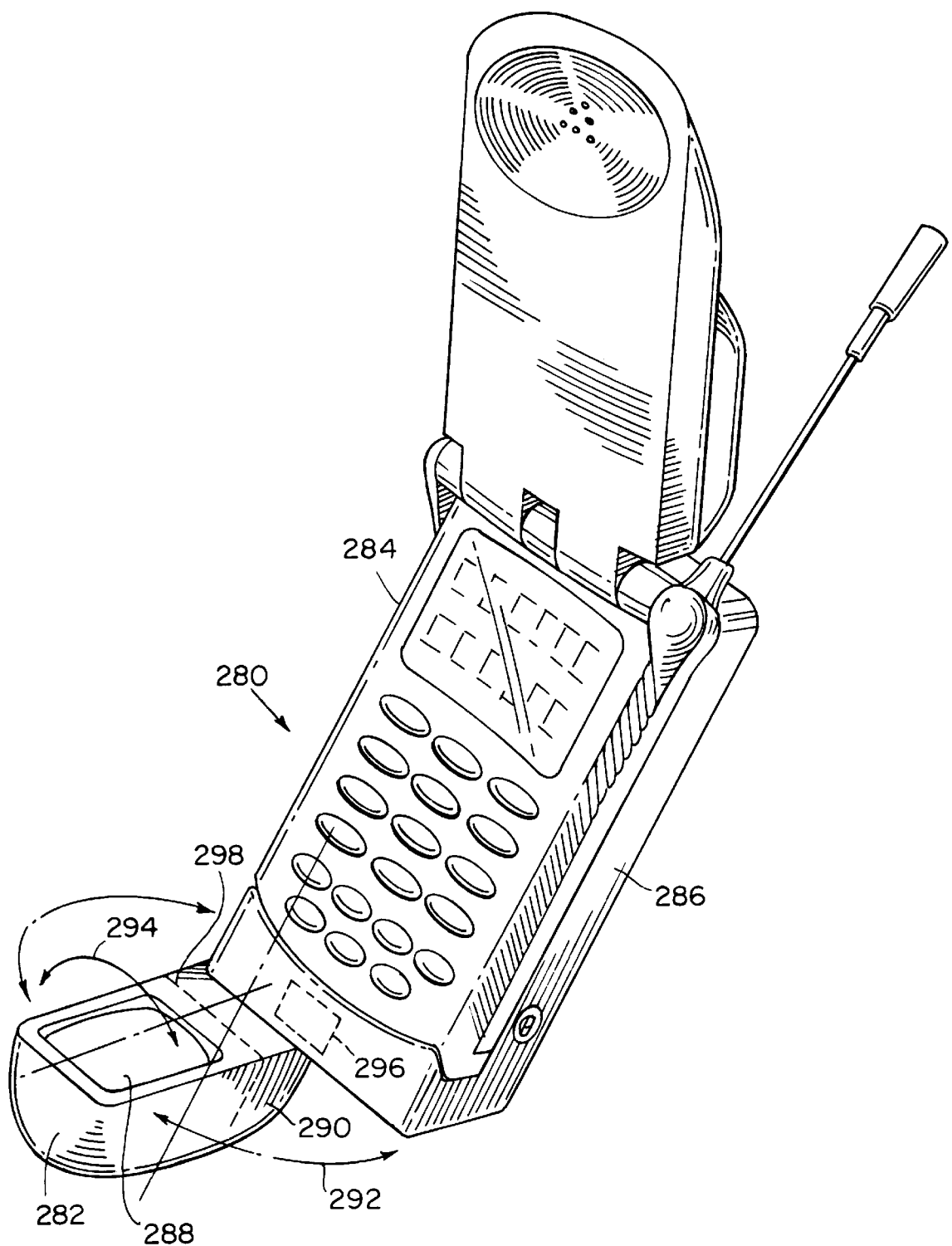

In the embodiment 280 shown in FIG. 9J the telephone 284 is shown docked with housing 286. However in this embodiment, the display is mounted withing a pivoting unit 282. The user can swing unit 282 along arc 292 to expose viewing lens 288. The user can also swing the display around a second orthogonal axis 294 at joint 298 so that the display rotates into a variety of viewing positions relative to hinge section 290.

FIGS. 10A and 10B illustrate another docking system for a portable telephone. The element 286 of system 300 includes mouse controls 303 that can be positioned on the front or rear of the element. The telephone, which can incorporate a touchpad 301, nests within the docking element 286 and is electrically connected to the element through a connecting port as described previously. Part of the base section houses a display module 306 having a display window 309 and can optionally also include a CCD or CMOS camera 310 in module 305. The modules 305, 306 can be manually or electrically actuated to move between a cavity within the base element and an operating position outside of the base section. Each module 305, 306 can rotate around axis 308 when in the operating position for easy repositioning by the use. The display can be used as a view finder for the camera. The base section can optionally rotate around the longitudinal axis of the base section for left or right handed use.

The docking element 286 can also include a PCMCIA card slot 302 and a touchpad on the rear panel adjacent the docking element battery. Slot can receive an image data card on which data can be stored or retrieved. The slot and associated circuitry can thus receive a smart card that can be used to charge or pay for phone calls or information on the card can be shown on the display or transmitted. Slot 302 as described herein can also be included in a wireless telephone with an integrated display as shown in FIG. 8.

Figure 11:
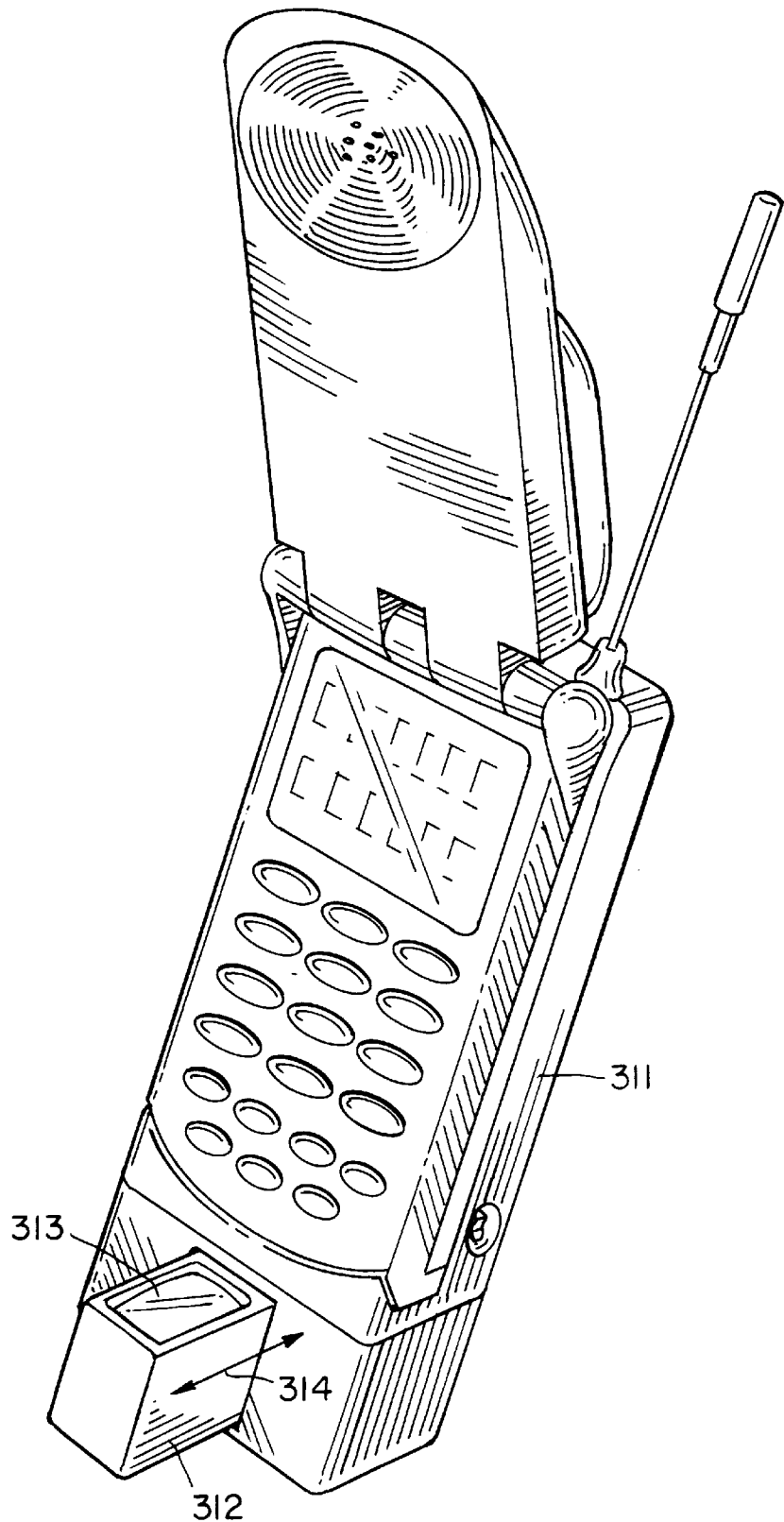
FIG. 11 illustrates another preferred embodiment of a telephone micro display system in accordance with the invention.

FIG. 11 illustrates another preferred embodiment of a docking element 311 in which the display module 312 can be moved along axis 314 between a position within the base section to an operating position outside the docking element housing. The image viewed through lens 313 can be inverted for left or right handed use.

Figure 12B:
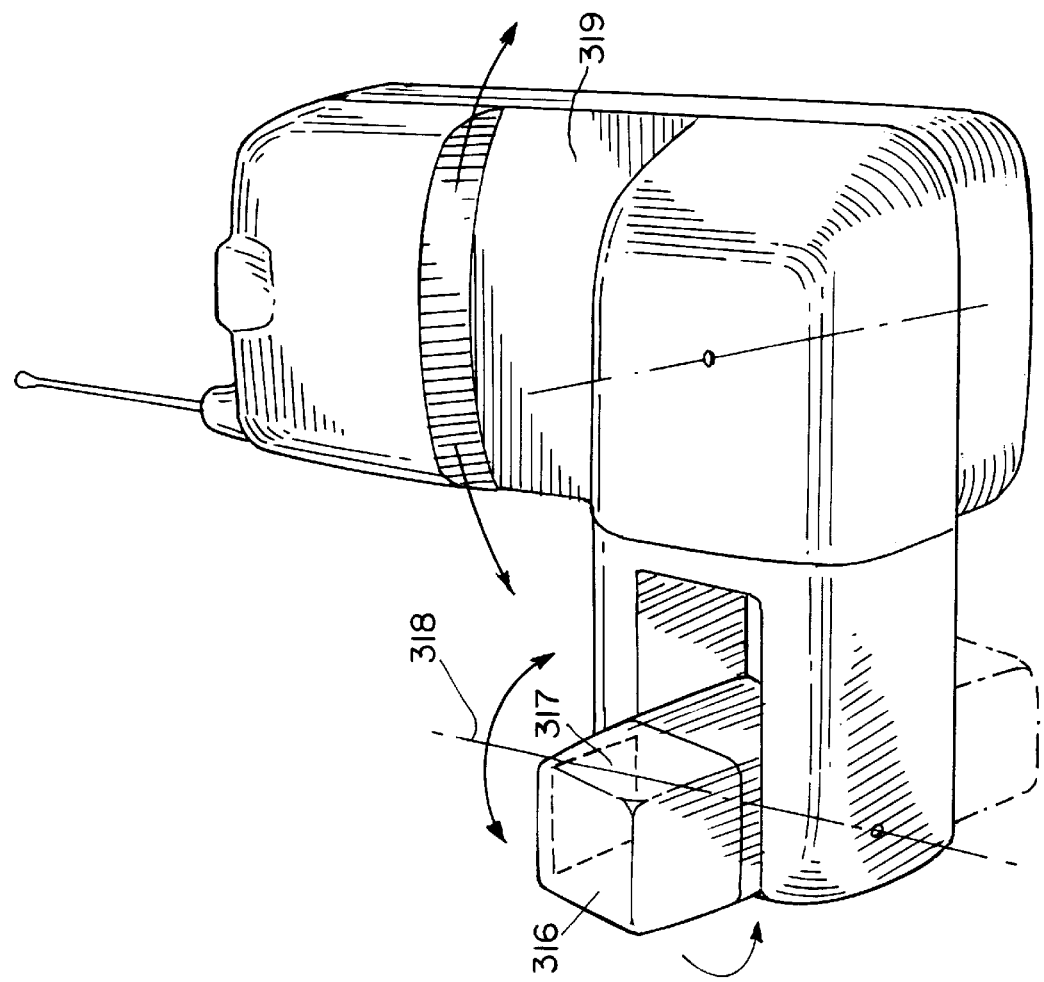
FIGS. 12A and 12B illustrate rear views of another preferred embodiment of a telephone micro display.
Figure 12A:
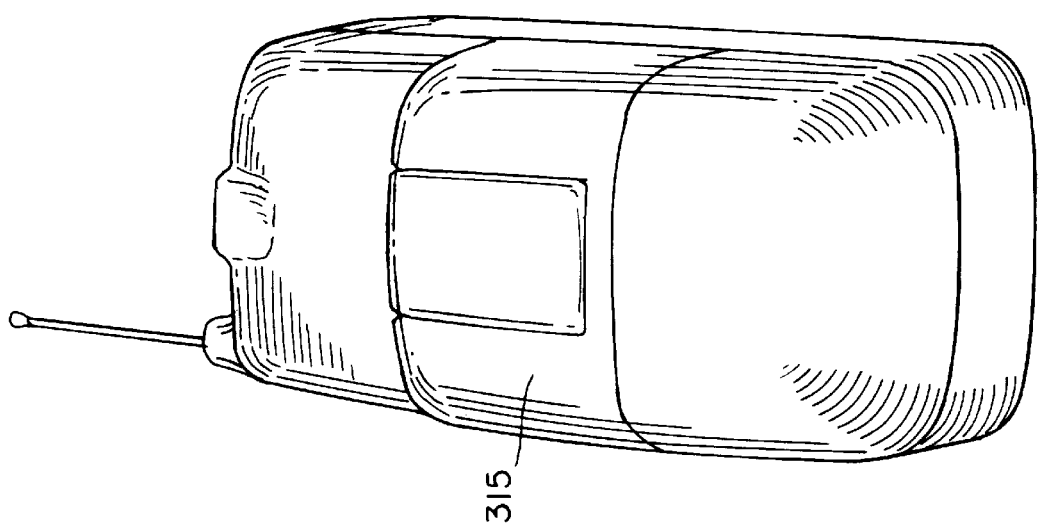

Another preferred embodiment of the docking element is illustrated in FIGS. 12A and 12B. The element 315 has a rotating portion on the back of the telephone and includes a display module 316 which rotates around a second axis 318 to expose the viewing port 317. The module 316 can rotate around a third axis for positioning by the user.

Another preferred embodiment of the docking element is illustrated in connection with FIGS. 13A–13F. In this embodiment a cellular phone 552 docks with a docking element 550. Docking system 550 has a two display module ports 554 and 556. Either port 554 or 556 can receive the display module 580 that is illustrated in FIG. 13F. FIG. 13A illustrates port 554 on a first side of system 550 and docking port connector access 571. FIG. 13B shows a second port 556 on a second side of the docking system as well as a joystick element 560, a mouse button 558 and an external mouse port 562.

FIGS. 13C and 13D show the docking element 550 without the phone 552. These illustrate the phone docking connector 566 and the phone retention clip slot 564.

FIG. 13E shows an exploded view with the housing 550 having top 551 and bottom 553. The housing contains the joystick 561, the phone port connector 565, circuit board 570, docking port connector 572 clip 563.

The display module housing 580 has a connector 586 that electrically connects the display circuit to the circuit board 570. A circular element 584 connects to each port 554, 556 and permits the housing 580 to rotate relative to system 550 so that the viewing window 582 can be positioned by the user.

Figure 13G:
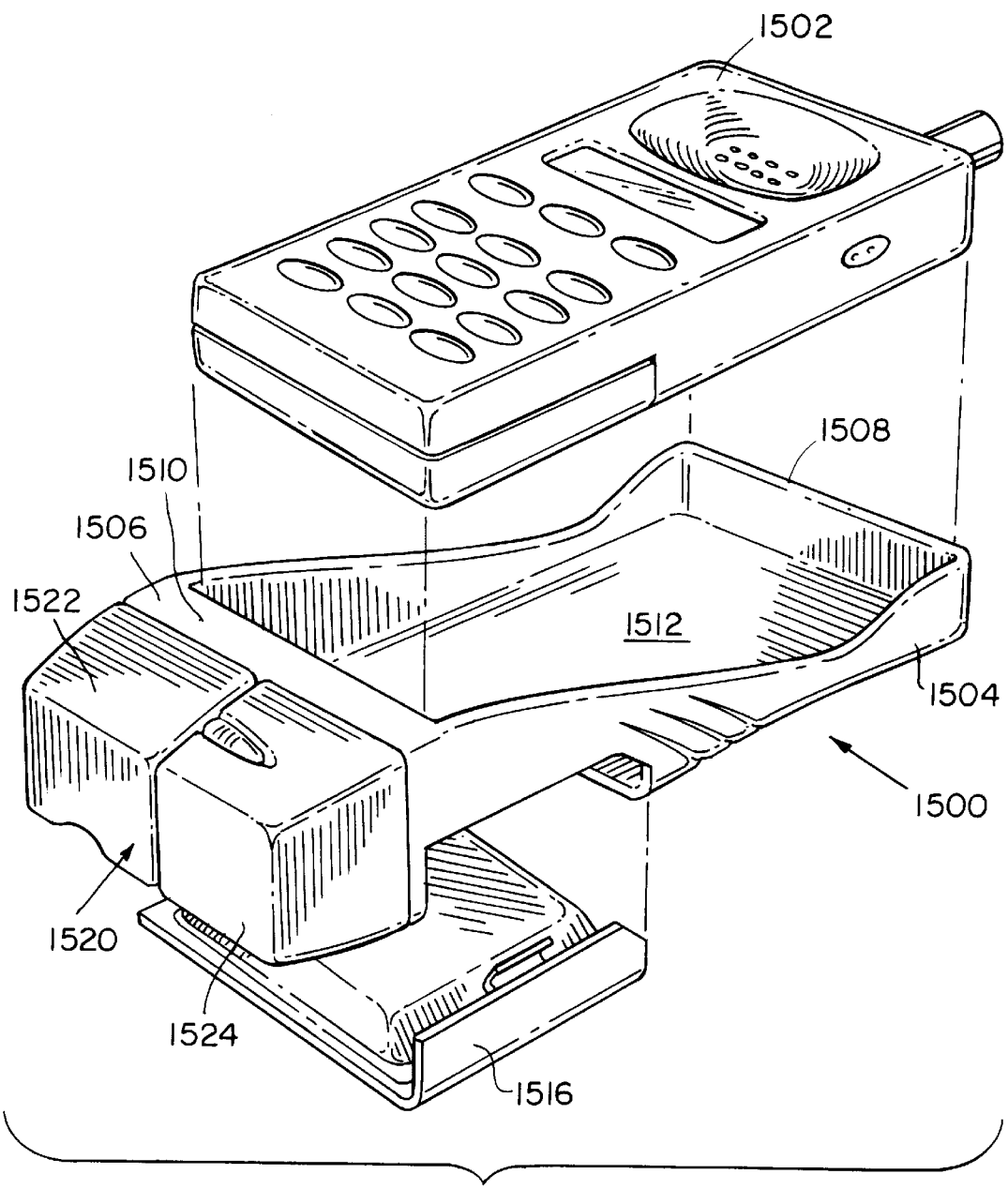
Figure 13H:
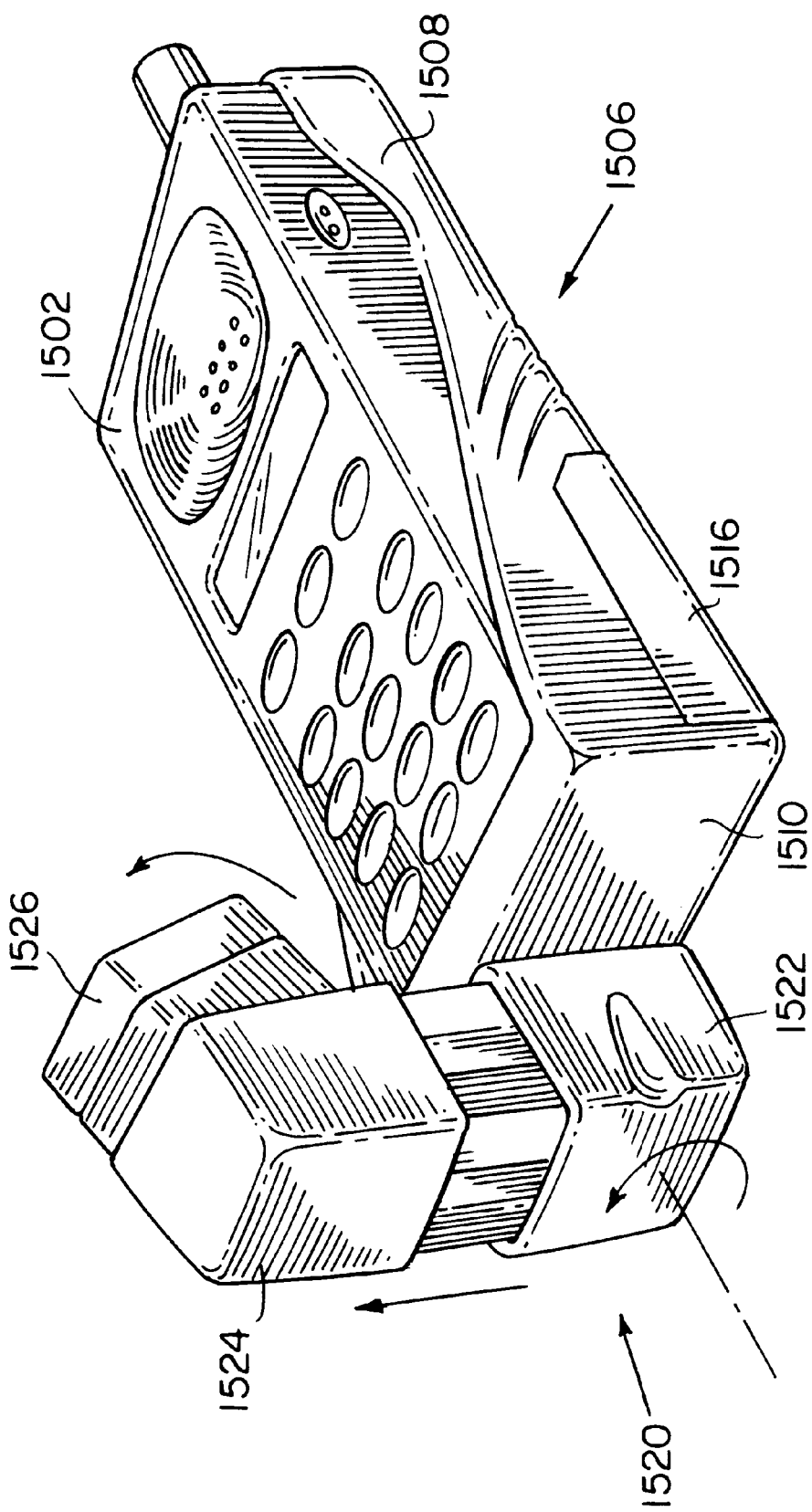
Figure 13I:
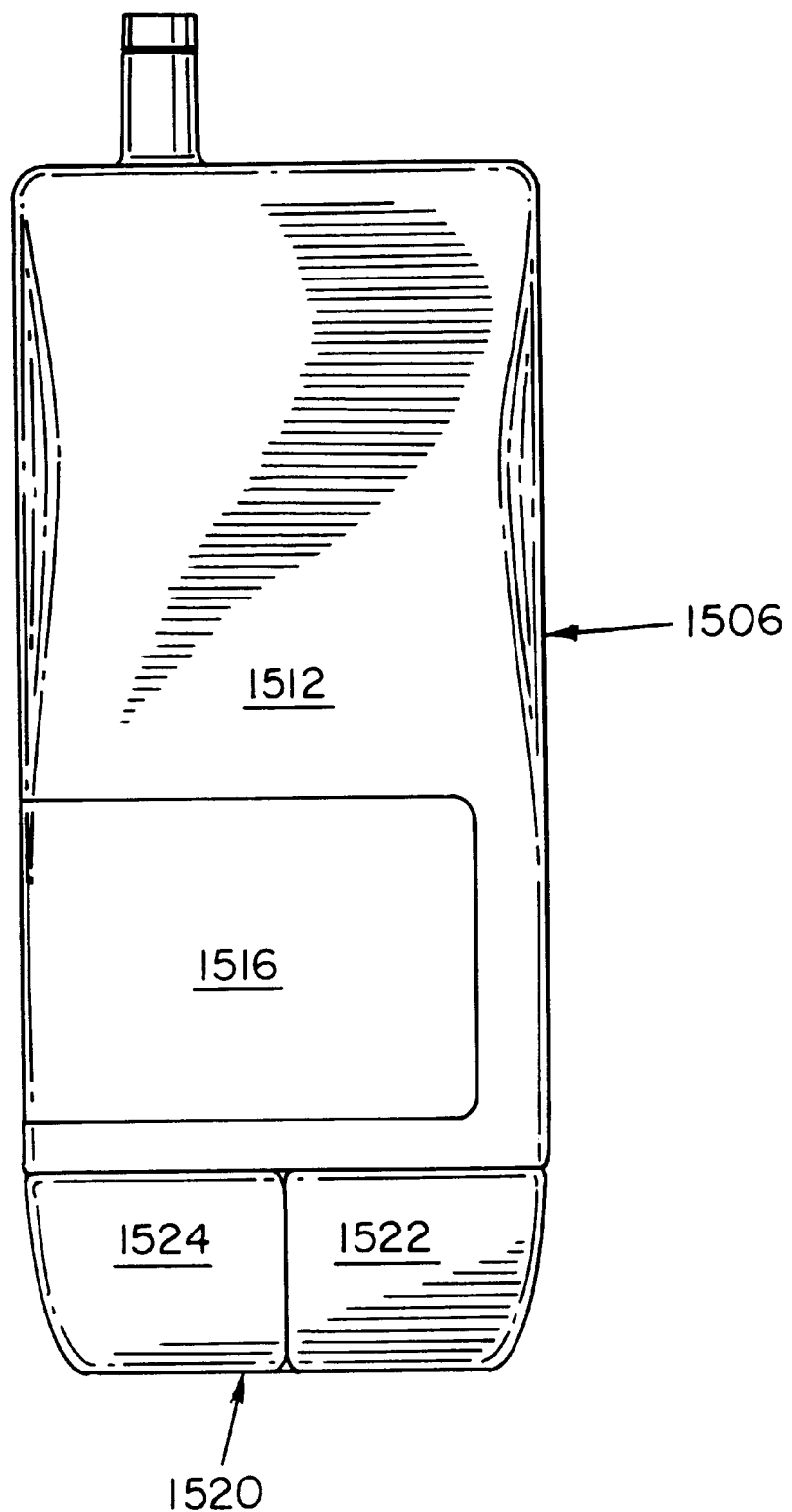

An alternative display docking system 1500 is shown if FIGS. 13G–13I. A cradle 1504 in a docking element or station 1506 receives the cellular phone 1502. The cradle 1504 is formed by a pair of side rails and a top rail 1554, in addition to the base 1510 and the bottom 1512. The docking station 1506 is adapted to receive a battery 1516 as best seen in FIGS. 13G and 13I. The battery 1516, which is received on the bottom of the docking station 1506 1552, is capable of powering both the docking station 1506 and the cellular phone 1502.

Still referring to FIGS. 13G–13I, the docking system 1500 has a display subhousing 1520 which pivots relative to the base 1510 of the docking station 1506. The display subhousing 1520 has a foot pivot portion 1522 that rotates relative to the base 1510 of the docking station 1506 and an arm 1524. The arm 1524 extends laterally from the foot pivot portion 1522 in the operating position, as seen in FIG. 13H. The arm 1524 has a viewing housing 1526 with a lens, which moves outward, therein spacing the lens from the micro display located in the arm 1524.

Figure 13J:
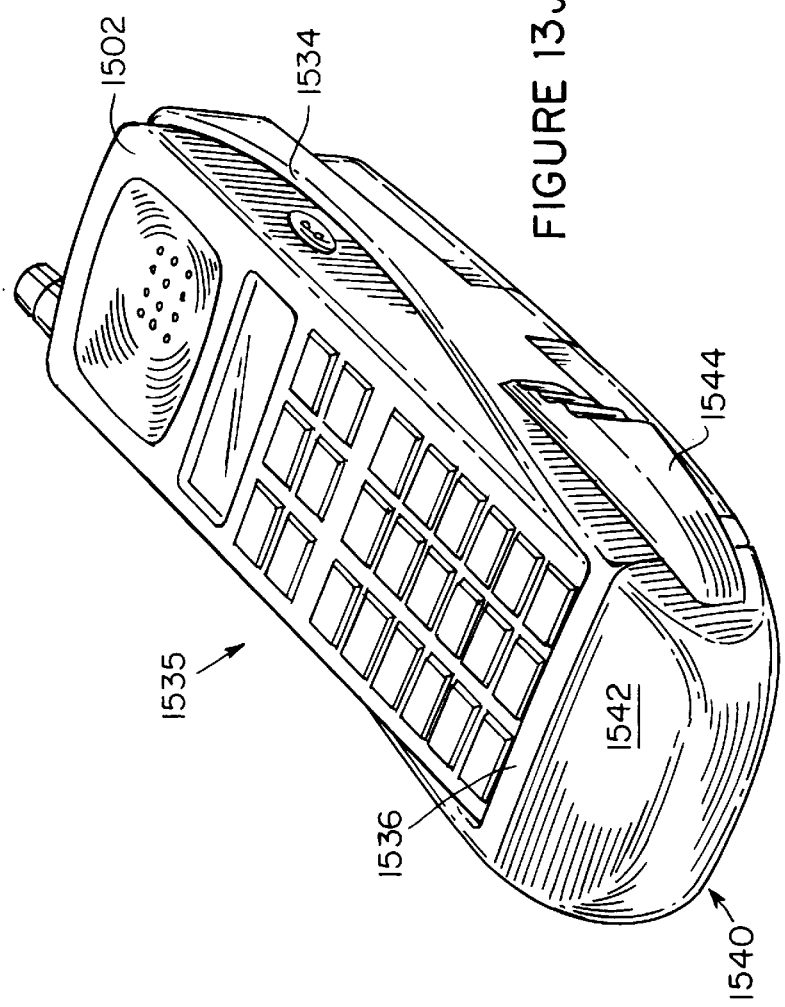
Figure 13K:
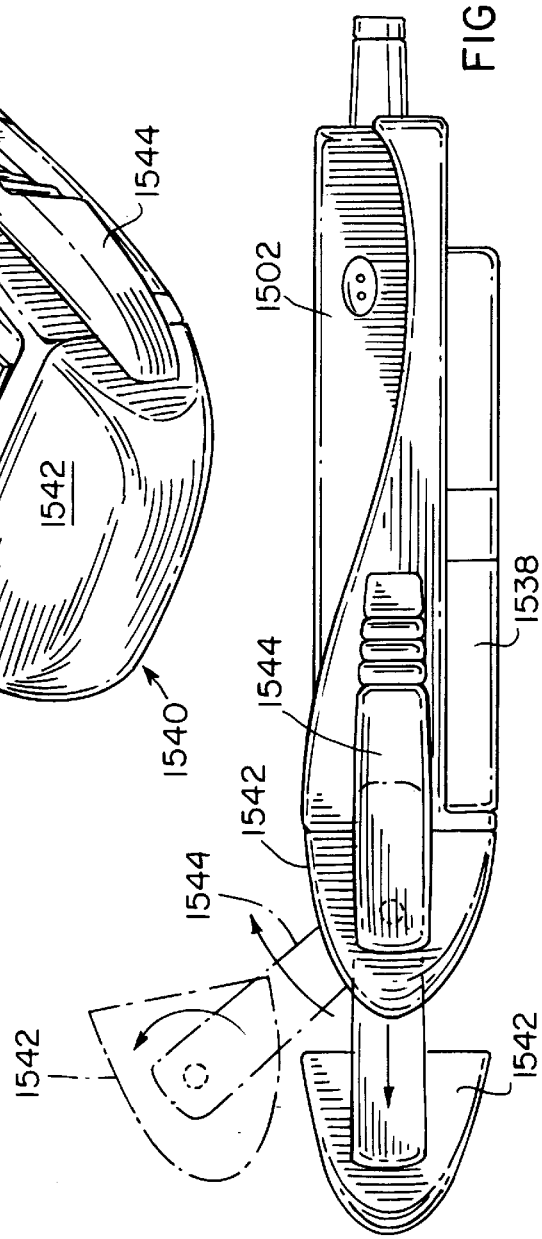

FIGS. 13J and 13K show another alternative display docking system 1530. The display docking system 1530 has a cradle 1534 on the docking station 1536 similar to the embodiment shown in FIGS. 13G–13I. The docking station 1536 likewise is adapted to receive a battery 1538 capable of powering both the docking station 1536 and the cellular phone 1502.

Still referring to FIGS. 13J and 13K, the docking system 1530 forms a handset and has a display subhousing 1540 which has a display pod 1542 and a pair of sliding arms 1544. The display subhousing 1540 moves relative to the docking station 1536 by the arms 1544 moving translation relative to the side rails of the station 1536 as represented in FIG. 13K. The arms 1544 then are capable of rotating relative to the docking station 1536 as illustrated in phantom in FIG. 13K. The display pod 1542, which houses the micro display and a lens, can rotate relative to the arms 1544 to position the micro display for viewing.

Figure 13L:
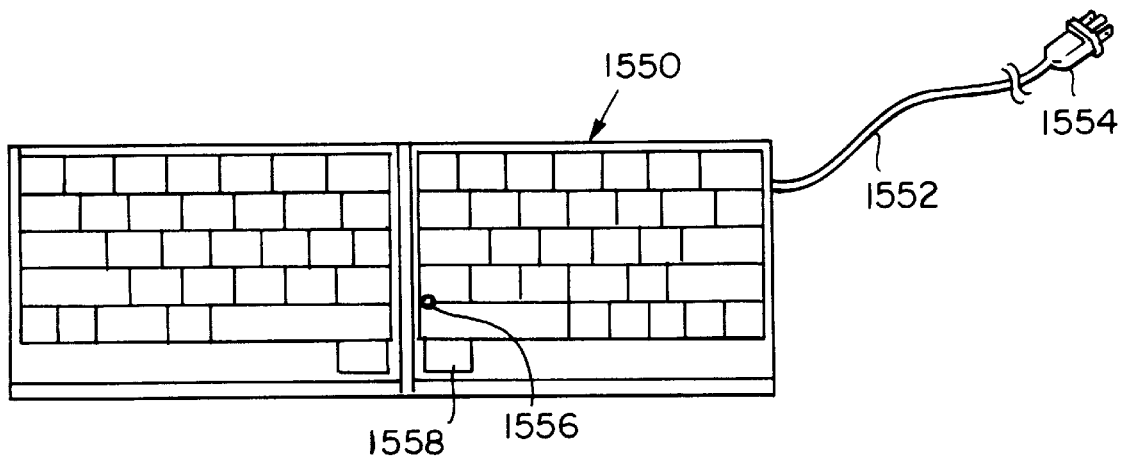
FIGS. 13L–13N illustrate a folding keyboard with a touchpad for uses with phone, display docking system, or pager.
Figure 13M:
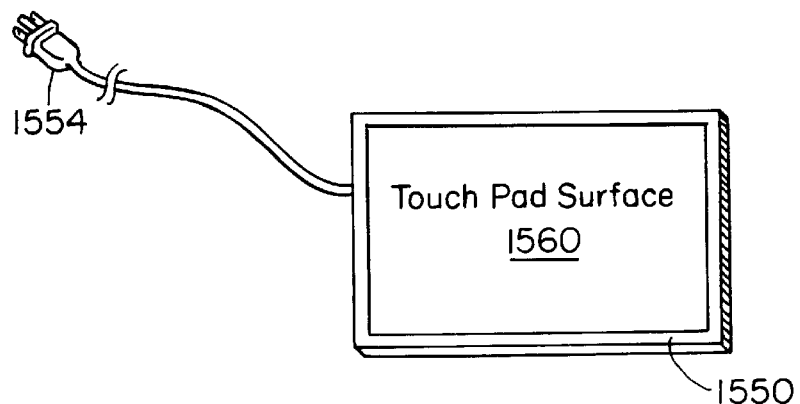
Figure 13N:
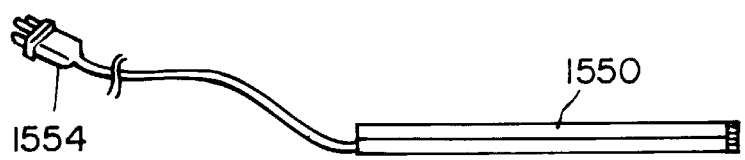

FIG. 13L illustrates a keyboard 1550 having a conventional key layout. The keyboard has a cord 1552 with a plug 1554 adapted to be received by a data transmission system, such as a docking station, a cellular telephone or a pager. The keyboard 1550 has a mouse track point joy stick 1556 and a pair of mouse buttons 1558. The keyboard 1550 is capable of folding such that its thickness is less than 15 millimeters as illustrated in FIG. 13N. The keyboard 1500 can have a touch pad 1560 on one side, such as shown in FIG. 13M, for taking notes or drawing inputs.

Illustrated in FIGS. 14A–14C is another preferred embodiment of a telephone system 600 incorporating the micro display of the present invention. In this desktop system a handset 602 is connected by cable or wireless connection to a base containing by cable or wireless connection to a base containing a standard telephone keypad 604. The display operates in a rear projection configuration within housing 610. The housing can pivot 620 or swivel 612 and includes a camera 608 so that a user viewing screen 606 can be seen by a person with a similar system. Further details regarding rear projection systems are described in U.S. Pat. No. 5,467,154, the contents of which is incorporated herein by reference.

Figure 15C:
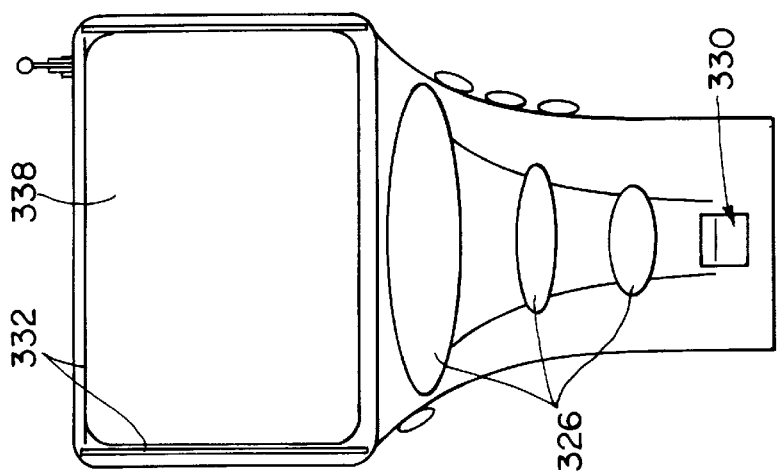
FIGS. 15A–C are side cross-sectional, front, and front cross-sectional views of a hand held rear projection display system in accordance with the invention.
Figure 15B:
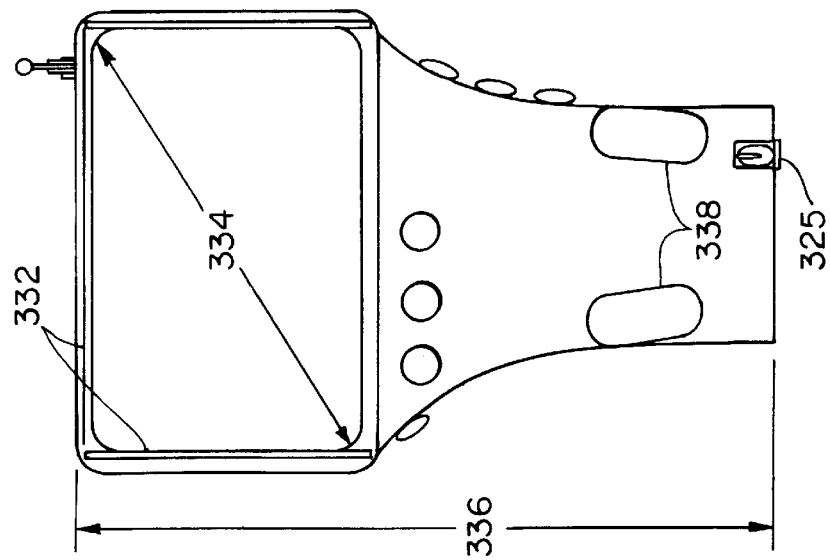
Figure 15A:
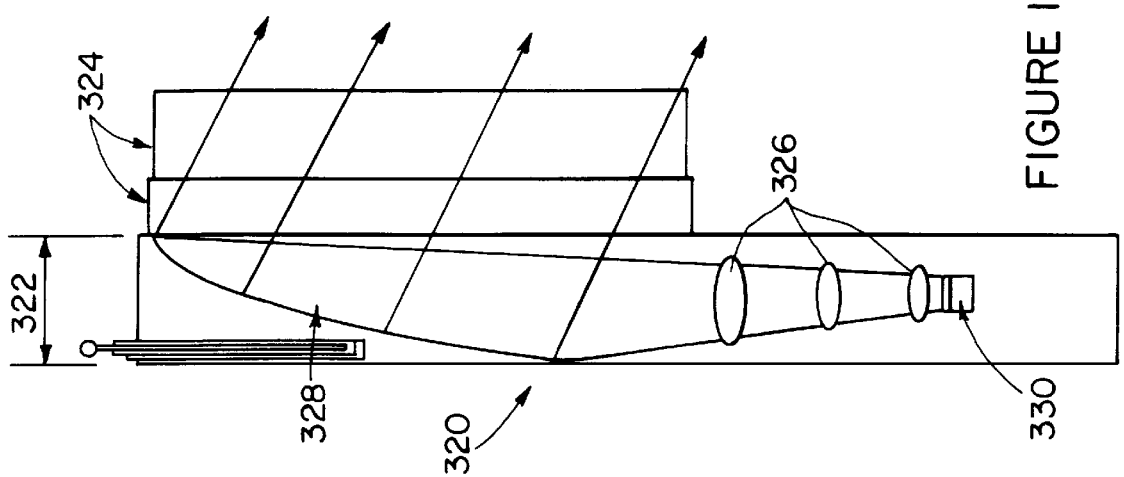

FIGS. 15A, 15B and 15C show side cross-sectional, front and front cross-sectional views of a hand-held rear projection system 320 using a micro display. The system 320 includes a micro display and back light assembly 330, a projection lens system 326, a reflective screen 328 and optional retractable sun screens 324. The device has a thickness 322 of less than 2 inches, preferably about 1 inch, a height 336 of less than 8 inches, preferably about 5–6 inches and a display diagonal 334 of 4 inches or less, preferably about 3 inches. This provides a system volume that is preferably less than about 40 inches. The rear reflective screen 328 is shown in the front view of FIG. 13C at 338 and are surrounded on 3 sides by retractable shades 332 (324). The handle portion can include speakers 338 and an earphone jack 325.

Figure 16C:
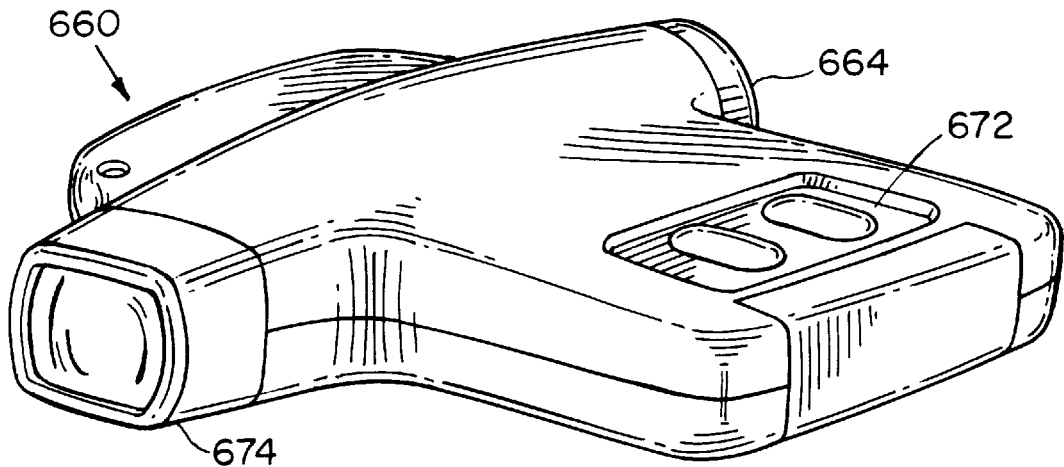
FIGS. 16C–16D illustrate the use of a micro display as a viewfinder for a camcorder in another preferred embodiment of the invention.
Figure 16D:
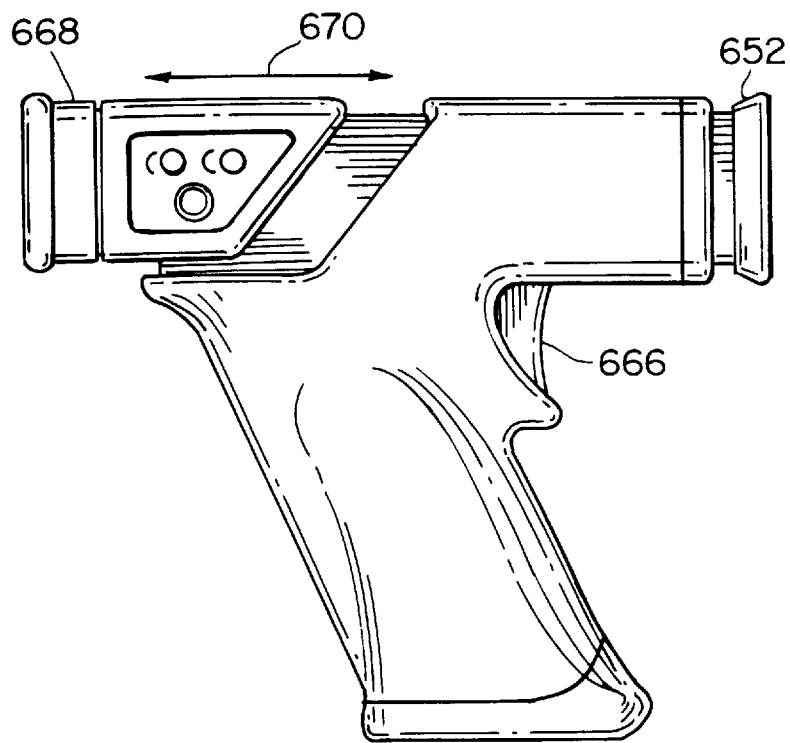

A body worn hand-held display system is shown in FIGS. 16A and 16B. The hand-held unit 350 includes a micro display viewed through port 352 that is controlled by control element 356 and connected by cable 354 to a body worn communications pod 340.

Another preferred embodiment of the invention relates to a card reader system. Such a system 700 is illustrated in connection with FIGS. 17A–17C and includes a housing 705 with a port or aperture 712 for insertion of a card 730, a display system 706 for presenting information to the user, a card reader 734, a control circuit 736, and a control panel 715 that controls reader operation. The display system 706 can include the color sequential display module as described previously herein.

The card 730 being read by the reader can be a so-called "Smart Card" or a PCMCIA card. Smart cards are commercially available and can include elements 738 such as a memory for storing data, a controller, a power source, and a coil antenna 732 to interface with the reader, all mounted on a piece of plastic. This type of card can be used to store personal financial information, personal medical history, insurance information, and/or many other types of data useful to the card user. More details regarding such cards can be found in U.S. Ser. No. 08/680,210 filed on Jul. 11, 1996, the entire contents of which is incorporated herein by reference. Alternatively, the card 730 can be a PCMCIA card such as a modem including a wireless receiver or data storage card.

The user is often interested in displaying information contained on the card and in controlling access to this information. The card reader of the present invention is used to provide access to this information by displaying selected information stored on the card. As shown in FIG. 17A, the reader housing 705 has a viewing window 702 and a slot or aperture 712 for insertion of at least that portion of the card containing the interface 732 to permit reading of information stored in card memory. The user manipulates control elements or buttons on a control panel 715 of the reader housing 705 to operate the system. The elements can include an on/off switch 708 and a four way element 710 to scroll the display up, down, left or right. An internal battery 720 provides power for all reader functions.

In an alternate embodiment of the invention, the reader 700 can also include an imaging device 718, including a CMOS or CCD imaging circuit 722 and imaging optics 724. Button 714 can operate the cameras 718 and select button 716 allows the user to select from a menu of reader 700 operations.

As shown in FIG. 17B, another preferred embodiment provides for detaching the display 706 and or the camera 718 from the housing 705. Either detachable element can be electrically connected to the housing 705 with a cable 726 from a socket 728 of either element 706, 718. The reader 734 is positioned in the housing 705 to be adjacent to the antenna 732 on the card 730 or can be any other suitable interface such as a magnetic strip reader.

Figure 18:
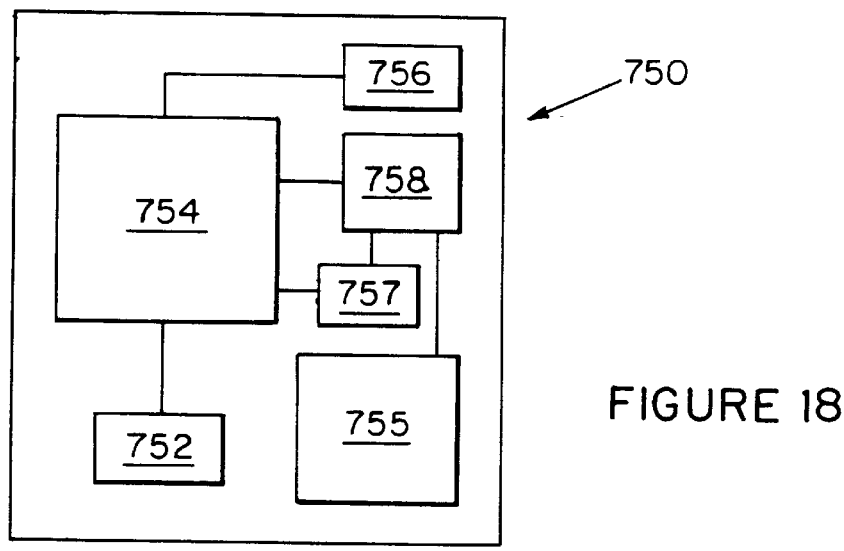
FIG. 18 is a schematic circuit diagram for a portable card reader system.

A schematic circuit diagram for a card reader system is illustrated in FIG. 18. The circuit includes an interface 752 that connects with the card being read, a controller 754 having a memory, a user control panel 756, a micro display circuit 758, as described previously herein, and a display 755. The interface 752 can be for cards with contacts or for contactless cards. A battery 757 provides power to the reader. The controller 754 and interface 752 and other physical characteristics of the card reader are preferably configured to comply with the guidelines set forth in the International Organization for Standardization (ISO) and the American National Standards Institute (ANSI) standards which are available from ANSI at 11 West 42nd Street, New York, N.Y. 10036. These standards, including ISO/IEC 7816-1 through 7816-7, and the amendments thereof, are incorporated herein by reference in their entirety.

Figure 19:
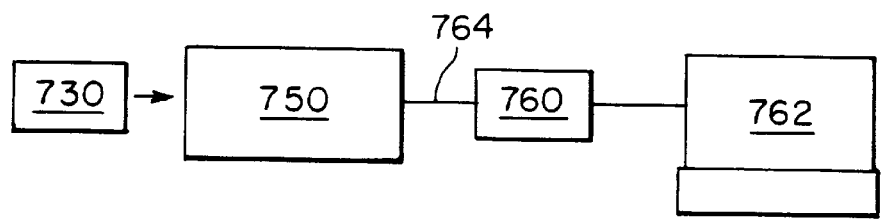
FIG. 19 illustrates another preferred embodiment of a card reader system.

As illustrated in FIG. 19, the card reader 750 can be connected by wireless modem, telephone or other cable link 764 to an interface 760 such as a personal computer (PC) card to a general purpose computer 762.

Figure 19A:
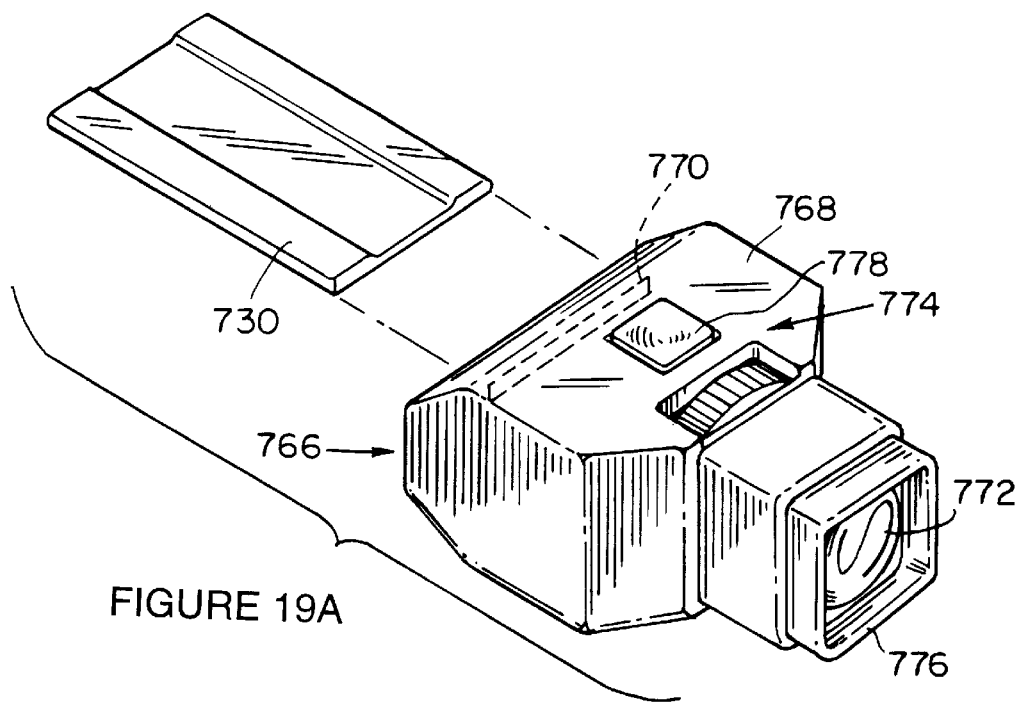
FIG. 19A shows another preferred embodiment of a card reader system.

Another embodiment of the card reader system 766 is illustrated in FIG. 19A. The system includes a housing 768 with a port or aperture 770, shown in hidden line, for insertion of the card 730, or at least that portion of the card that contains the interface, a display system 772 for presenting information to the user, and a control panel 774 that controls reader operation. Similar to the previous embodiment, the system 766 has a card reader, a control circuit, and a internal battery as described previously. The display system 772 can include the color sequential display module as described previously herein and is shown in actual size.

As shown in FIG. 19A, the reader housing 768 has a viewing window 776. The user manipulates control elements or buttons on a control panel 774 of the reader housing 768 to operate the system. The elements can include an on/off switch 778 and a four way element to scroll the display up, down, left or right.

The card reader system can be used to access or change the data stored on the card or select an option from choices provided through a PCMCIA modem. The user can change the data or make the selection using a four way element 710 and a select button 716, such as shown in FIG. 17A.

The display module shown in FIG. 19A can be equipped with an antenna and television receiver to provide a pocket size color television.

Head Mounted Display System

In yet another embodiment of the invention shown in FIG. 20A, the HDTV color active matrix display, as described in connection with FIG. 2A, is provided with suitable optics and incorporated into a housing 860 and pivotally attached to a headband frame 861 to provide a novel head mounted display system 864. In general, the system 864 is comprised of a unique headband frame 861 and adjustable strap 862 for attaching the system to the user's head, a side-mounted speaker system 866 connected by cable 868 to electronics console 870 attached to the front of the frame 862, a microphone 872 rotatably suspended from speaker frame 874, and the aforementioned display housing 860 dependent from console 870 and electronically connected thereto by cable 876.

Figure 20A:
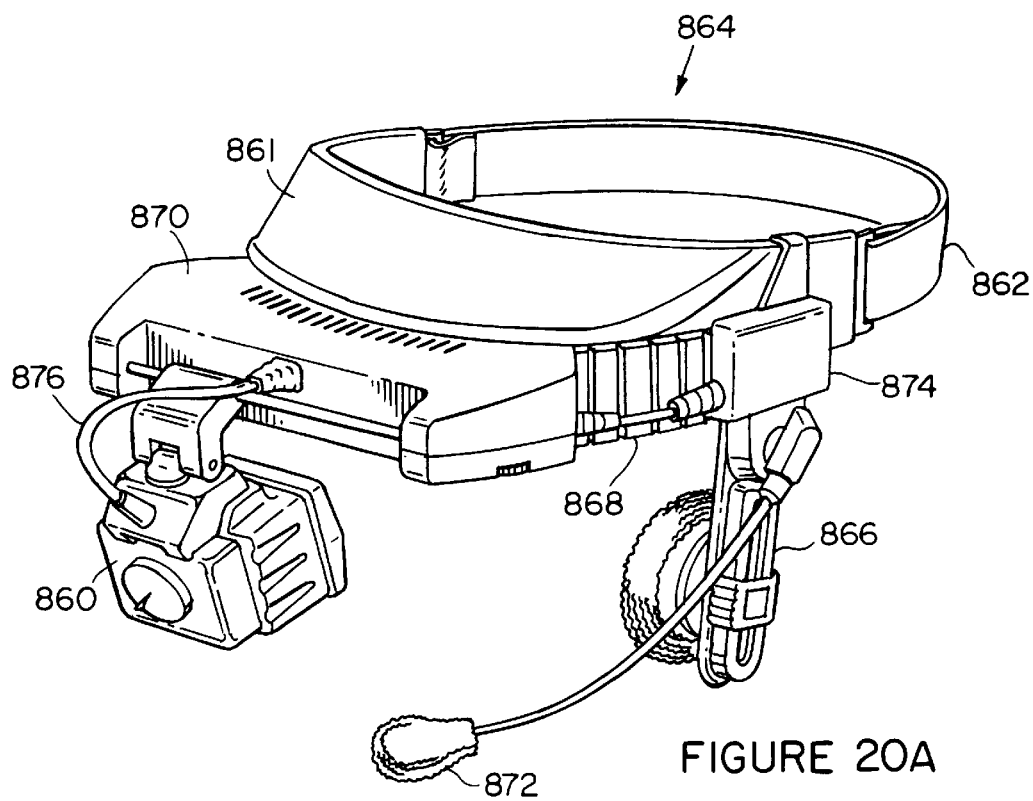
FIG. 20A is a perspective view of a head-mounted display system of the invention.
Figure 20B:
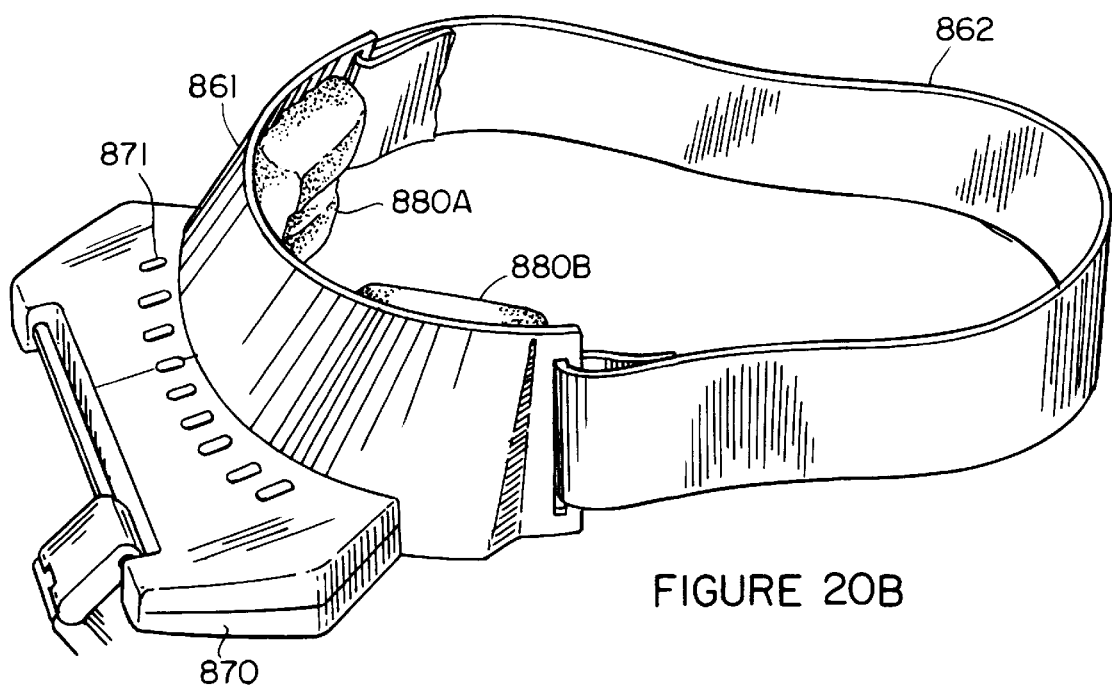
FIG. 20B is a partial schematic perspective view of the system of FIG. 20A emphasizing additional features of the invention.
Figure 20C:
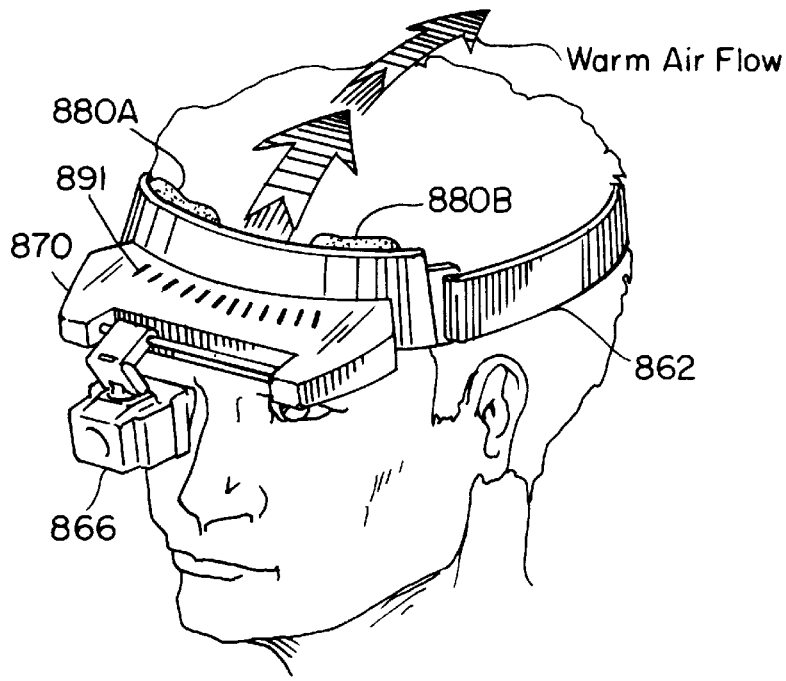
FIG. 20C is a schematic perspective view of the system of FIG. 20A which emphasizes certain aspects of the invention.
Figure 20D:
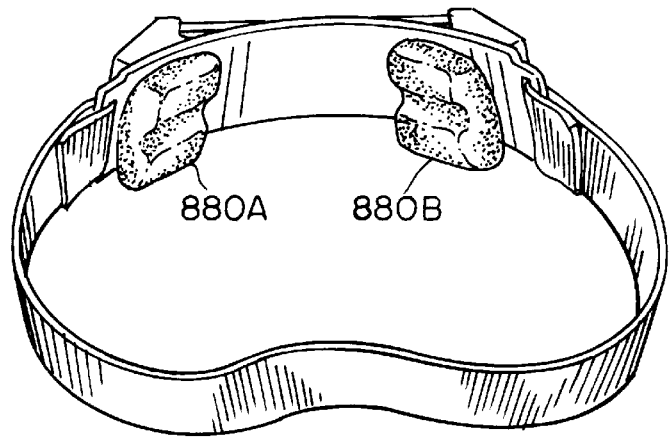
FIG. 20D is a schematic perspective view of the headband and pads of FIG. 20C.
Figure 20E:
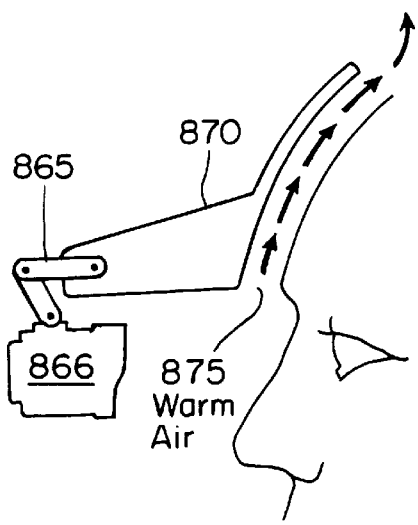
FIG. 20E is a partial schematic side view of the system of FIG. 20A.

Not shown in FIG. 20A is a headband system comprised of two or more pads 180A, 180B, as shown in FIGS. 20B–20E.

To allow for the broadest range of head sizes, the headband frame 861 utilizes two contoured foam pads 880A and 880B, angled, and spaced apart such that both small and large forehead curvature are accommodated. Each foam pad also has two primary contact areas 881 and 883, that act in the same way. When combined with a strap 862 placed below the ball formed at the rear of the head, the net effect is that the headband frame 861 is securely located on the wearer's forehead 887 whether child or adult.

When the electronics are used, there is some heat being generated in the main housing or console 870. Prior art headbands used wide forehead pads which effectively trapped this heat at the wearer's brow. This proved to be quite uncomfortable after extended wear.

The foam pads 880A and 880B displace the headband frame 861 from the user's forehead 887 leaving a gap there between which serves as a warm air vent 875 to dissipate warm air generated by the electronics in console 870.

This new embodiment provides a "chimney-like effect" that effectively vents the warm air away from the wearer's face. The foam pads are removably attached, as by Velcro® type fasteners, and covered with terrycloth 861 for improved comfort. Optional additional vents 871 are provided in the console 870.

Equivalents

While this invention has been particularly shown and described with reference to preferred embodiments thereof, it will be understood by those skilled in the art that various changes in form and details may be made therein without departing from the spirit and scope of the invention as defined by the appended claims.

We claim:

1. A wireless telephone having a display panel comprising:

a handset housing having a speaker and a microphone within the housing;

a transceiver system within the handset housing that receives audio and image data;

a display module housing that is connected to the handset housing and that houses a liquid crystal active matrix display, a backlight and a lens that magnifies a displayed image on the matrix display, the matrix display having at least 75,000 pixel electrodes defining an active area of less than 160 mm$^2$ and the backlight including a light emitting diode (LED); and a display control circuit connected to the transceiver system and the matrix display.

2. The wireless telephone of claim 1 wherein the display module housing moves relative to the handset.

3. The wireless telephone of claim 1 wherein the handset has a first display module port and a second display module port such that the display module can be electrically connected to the tranceiver at the first port or the second port.

4. The wireless telephone of claim 1 wherein the display module can be moved from a storage position within the handset to an operating position outside of the handset.

5. The wireless telephone of claim 1 wherein the handset housing comprises a first housing element and a second housing element that is rotatably attached to the first housing element, the display module being attached to the second housing element.

6. The wireless telephone of claim 1 wherein the backlight comprises a light emitting diode that is optically coupled to the display with the module housing having a reflective interior surface and a diffuser.

7. The wireless telephone of claim 1 wherein the backlight is optically coupled to the matrix display with a side illumination device.

8. The wireless telephone of claim 1 further comprising a second numeric display on the handset.

9. The wireless telephone of claim 1 further comprising a second numeric display on the handset.

10. A method of displaying an image on a wireless telephone having a display panel comprising:

providing a handset housing having a speaker and a microphone within the housing;

providing a transceiver system within the housing that receives audio and image data;

providing a display module having a liquid crystal active matrix display, a backlight and a lens that magnifies a displayed image on the matrix display, the matrix display having a plurality of pixel transistor circuits formed with a single crystal silicon material and at least 75,000 pixel electrodes defining an active area of the display of less than 160 mm² and the backlight including a plurality of light emitting diodes (LEDs); and operating a display control circuit connected to the transceiver and the matrix display to display an image on the display.

11. The method of claim 10 further comprising moving the display module relative to the housing.

12. The method of claim 10 further comprising providing the handset with a first display module port and a second display module port such that the display module can be electrically connected to the transceiver at the first port or second port.

13. The method of claim 10 further comprising moving the display module from a storage position within the handset to an operating position outside of the handset.

14. The method of claim 10 further comprising providing a handset having a first housing element and a second housing element that is rotatably attached to the first housing element, the display module being attached to the second housing element.

15. A wireless telephone having a display panel comprising:

a handset housing having a speaker and a microphone within the housing;

a transceiver system within the handset housing that receives audio and image data;

a display module housing having a liquid crystal active matrix display, a backlight, a diffuser between the backlight and the display, and a lens that magnifies a displayed image on the matrix display, the display having a plurality of pixel transistor circuits formed with a single crystal silicon material and at least 75,000 pixel electrodes defining an active area of the display of less than 160 mm², the backlight including a red light emitting diode (LED), a green LED and a blue LED.

16. The wireless telephone of claim 15 wherein the matrix display moves relative to the handset housing.

17. The wireless telephone of claim 15 wherein the matrix display can be moved from a storage position to an operating position.

18. The wireless telephone of claim 15 wherein the display module housing comprises a first housing element and a second housing element that is rotatably attached to the first housing element, the matrix display being within the second housing element.

19. The wireless telephone of claim 15 wherein the backlight comprises a light emitting diode that is optically coupled to the display with a reflective interior surface of the module housing.

20. The wireless telephone of claim 15 wherein the backlight is optically coupled to the matrix display with a side illumination device.

* * * * *